(12) United States Patent
Lim et al.

(10) Patent No.: US 12,250,645 B2
(45) Date of Patent: Mar. 11, 2025

(54) METHOD AND APPARATUS FOR PERFORMING POWER HEADROOM REPORTING IN WIRELESS COMMUNICATION SYSTEM

(71) Applicant: SAMSUNG ELECTRONICS CO., LTD., Suwon-si (KR)

(72) Inventors: Seongmok Lim, Suwon-si (KR); Youngrok Jang, Suwon-si (KR); Ameha Tsegaye Abebe, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 17/807,654

(22) Filed: Jun. 17, 2022

(65) Prior Publication Data

US 2023/0007599 A1    Jan. 5, 2023

(30) Foreign Application Priority Data

Jun. 17, 2021   (KR) .................. 10-2021-0078995

(51) Int. Cl.
  *H04W 52/36*   (2009.01)
  *H04W 52/54*   (2009.01)
  *H04W 72/23*   (2023.01)

(52) U.S. Cl.
  CPC ......... *H04W 52/365* (2013.01); *H04W 52/54* (2013.01); *H04W 72/23* (2023.01)

(58) Field of Classification Search
  CPC ... H04W 52/365; H04W 52/54; H04W 72/23; H04W 72/1268; H04W 52/40;
  (Continued)

(56) References Cited

U.S. PATENT DOCUMENTS

2019/0053226 A1   2/2019 Xiong et al.
2019/0268861 A1   8/2019 Takeda et al.
(Continued)

FOREIGN PATENT DOCUMENTS

CN   112788728 A   5/2021
WO   2020034571 A1   2/2020

OTHER PUBLICATIONS

International Search Report and Written Opinion of the International Searching Authority dated Sep. 2, 2022, in connection with International Application No. PCT/KR2022/007428, 9 pages.
(Continued)

*Primary Examiner* — Afshawn M Towfighi

(57) ABSTRACT

Provided is a method performed by a user equipment (UE) in a wireless communication system, including: receiving, from a base station, configuration information regarding a plurality of search spaces for a physical downlink control channel (PDCCH) repetition; monitoring a plurality of PDCCHs on at least one cell based on the configuration information; identifying a time at which a repetition of PDCCHs including a first downlink control information (DCI) format, from among the plurality of PDCCHs, ends; determining at least one power headroom report (PHR) for the plurality of PDCCHs, based on an actual transmission or a reference format configured from higher layer signaling according to the identified time; and transmitting the determined at least one PHR on a physical uplink shared channel (PUSCH) scheduled by the first DCI format.

14 Claims, 30 Drawing Sheets

(58) Field of Classification Search
CPC ..... H04B 7/0695; H04B 7/024; H04L 5/0048; H04L 5/0051; H04L 5/0053; H04L 5/001; H04L 1/08; H04L 5/0094
See application file for complete search history.

(56) References Cited

U.S. PATENT DOCUMENTS

| | | | |
|---|---|---|---|
| 2020/0015258 A1* | 1/2020 | Zhou | H04W 72/23 |
| 2021/0176761 A1 | 6/2021 | Nam et al. | |
| 2021/0391948 A1* | 12/2021 | Taherzadeh Boroujeni | H04L 5/0091 |
| 2021/0400567 A1* | 12/2021 | Sha | H04W 72/21 |
| 2022/0256571 A1* | 8/2022 | Lo | H04L 5/0094 |

OTHER PUBLICATIONS

Supplementary European Search Report dated Aug. 5, 2024, in connection with European Patent Application No. 22825384.5, 9 pages.

Spreadtrum Communications, "Discussion on enhancements on Multi-TRIP for PDCCH, PUCCH and PUSCH," 3GPP TSG RAN WG1 #104b-e, e-Meeting, Apr. 2021, R1-2102442, 12 pages.

Ericsson, "On PDCCH, PUCCH and PUSCH enhancements for multi-TRP," 3GPP TSG-RAN WG1 Meeting #104bis-e, eMeeting, Apr. 12-20, 2021, R1-2103550, 30 pages.

* cited by examiner

| C₇ | C₆ | C₅ | C₄ | C₃ | C₂ | C₁ | R |
|---|---|---|---|---|---|---|---|
| P | V | PH (Type 2, SpCell of the other MAC entity) ||||||
| MPE or R | $P_{CMAX, f, c}$ 1 |||||||
| P | V | PH (Type 1, PCell) ||||||
| MPE or R | $P_{CMAX, f, c}$ 2 |||||||
| P | V | PH (Type X, Serving Cell 1) ||||||
| MPE or R | $P_{CMAX, f, c}$ 3 |||||||
| P | V | PH (Type X, Serving Cell n) ||||||
| MPE or R | $P_{CMAX, f, c}$ m |||||||

1702:

| C₇ | C₆ | C₅ | C₄ | C₃ | C₂ | C₁ | R |
|---|---|---|---|---|---|---|---|
| C₁₅ | C₁₄ | C₁₃ | C₁₂ | C₁₁ | C₁₀ | C₉ | C₈ |
| C₂₃ | C₂₂ | C₂₁ | C₂₀ | C₁₉ | C₁₈ | C₁₇ | C₁₆ |
| C₃₁ | C₃₀ | C₂₉ | C₂₈ | C₂₇ | C₂₆ | C₂₅ | C₂₄ |
| P | V | PH (Type 2, SpCell of the other MAC entity) ||||||
| MPE or R | $P_{CMAX, f, c}$ 1 |||||||
| P | V | PH (Type 1, PCell) ||||||
| MPE or R | $P_{CMAX, f, c}$ 2 |||||||
| P | V | PH (Type X, Serving Cell 1) ||||||
| MPE or R | $P_{CMAX, f, c}$ 3 |||||||
| P | V | PH (Type X, Serving Cell n) ||||||
| MPE or R | $P_{CMAX, f, c}$ m |||||||

FIG. 24
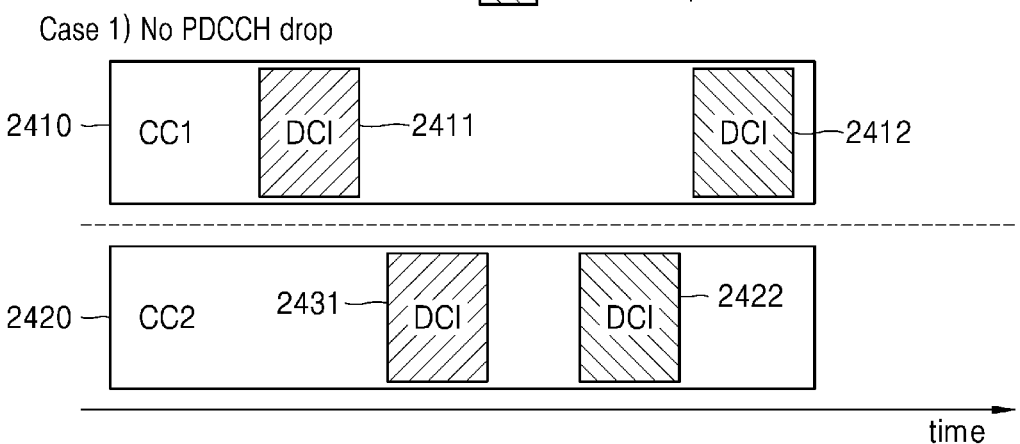
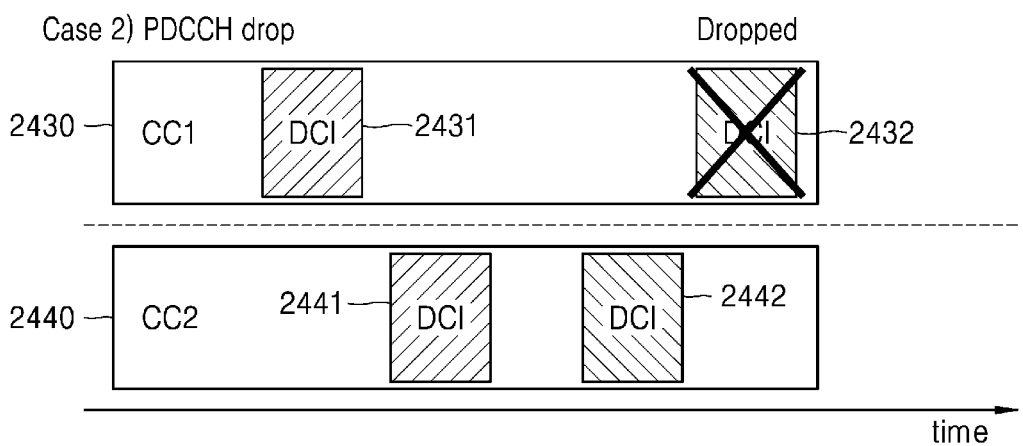

METHOD AND APPARATUS FOR PERFORMING POWER HEADROOM REPORTING IN WIRELESS COMMUNICATION SYSTEM

CROSS-REFERENCE TO RELATED APPLICATION

This application is based on and claims priority under 35 U.S.C. § 119 to Korean Patent Application No. 10-2021-0078995, filed on Jun. 17, 2021, in the Korean Intellectual Property Office, the disclosure of which is incorporated by reference herein in its entirety.

BACKGROUND

1. Field

The disclosure relates to operations of a user equipment (UE) and a base station in a wireless communication system. More particularly, the disclosure relates to a method and apparatus for performing power headroom reporting in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an embodiment of the disclosure, provided are a method and apparatus for efficiently performing power headroom reporting in a wireless communication system supporting cooperative communication.

According to an embodiment of the disclosure, provided are a method and apparatus for performing power headroom reporting in a wireless communication system using multiple transmission and reception points (TRPs).

According to an embodiment of the disclosure, provided are a method and apparatus for determining a method of calculating power headroom according to repetitive transmission of a downlink control signal in a wireless communication system using multi-TRP.

Additional aspects will be set forth in part in the description which follows and, in part, will be apparent from the description, or may be learned by practice of the presented embodiments of the disclosure.

According to an embodiment of the disclosure, a method performed by a user equipment (UE) in a wireless communication system, includes: receiving, from a base station, configuration information regarding a plurality of search spaces for a physical downlink control channel (PDCCH) repetition; monitoring a plurality of PDCCHs on at least one cell based on the configuration information; identifying a time at which a repetition of PDCCHs including a first downlink control information (DCI) format, from among the plurality of PDCCHs, ends; determining at least one power headroom report (PHR) for the plurality of PDCCHs, based on an actual transmission or a reference format configured from higher layer signaling according to the identified time; and transmitting the determined at least one PHR on a physical uplink shared channel (PUSCH) scheduled by the first DCI format.

According to another embodiment of the disclosure, a method performed by a base station in a wireless communication system, includes: transmitting, to a user equipment (UE), configuration information regarding a plurality of search spaces for a physical downlink control channel (PDCCH) repetition; and receiving at least one power headroom report (PHR) of the UE on a physical uplink shared channel (PUSCH) scheduled by a first downlink control information (DCI) format, wherein a plurality of PDCCHs on at least one cell are monitored at the UE based on the configuration information, a time at which a repetition of PDCCHs including the first DCI format, from among the plurality of PDCCHs, ends is identified at the UE, and the at least one PHR for the plurality of PDCCHs are determined based on an actual transmission or a reference format configured from higher layer signaling according to the identified time.

According to another embodiment of the disclosure, a user equipment (UE) in a wireless communication system, includes: a transceiver; and at least one processor configured to: receive, from a base station, configuration information regarding a plurality of search spaces for a physical downlink control channel (PDCCH) repetition; monitor a plurality of PDCCHs on at least one cell based on the configuration information; identify a time at which a repetition of PDCCHs including a first downlink control information (DCI) format, from among the plurality of PDCCHs, ends; determine at least one power headroom report (PHR) for the plurality of PDCCHs, based on an actual transmission or a reference format configured from higher layer signaling according to the identified time; and transmit the determined at least one PHR on a physical uplink shared channel (PUSCH) scheduled by the first DCI format.

According to another embodiment of the disclosure, a base station in a wireless communication system, includes: a transceiver; and at least one processor configured to: transmit, to a user equipment (UE), configuration information regarding a plurality of search spaces for a physical downlink control channel (PDCCH) repetition; and receive at least one power headroom report (PHR) of the UE on a physical uplink shared channel (PUSCH) scheduled by a first downlink control information (DCI) format, wherein a plurality of PDCCHs on at least one cell are monitored at the UE based on the configuration information, a time at which a repetition of PDCCHs including the first DCI format, from among the plurality of PDCCHs, ends is identified at the UE, and the at least one PHR for the plurality of PDCCHs are determined based on an actual transmission or a reference format configured from higher layer signaling according to the identified time.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates a diagram showing an MAC CE structure including a plurality of pieces of PHR information according to an embodiment of the disclosure;

FIG. 24 illustrates a diagram for describing a case where PDCCH repetitive transmission is performed on each of two carriers according to an embodiment of the disclosure;

DETAILED DESCRIPTION

Figure 1:
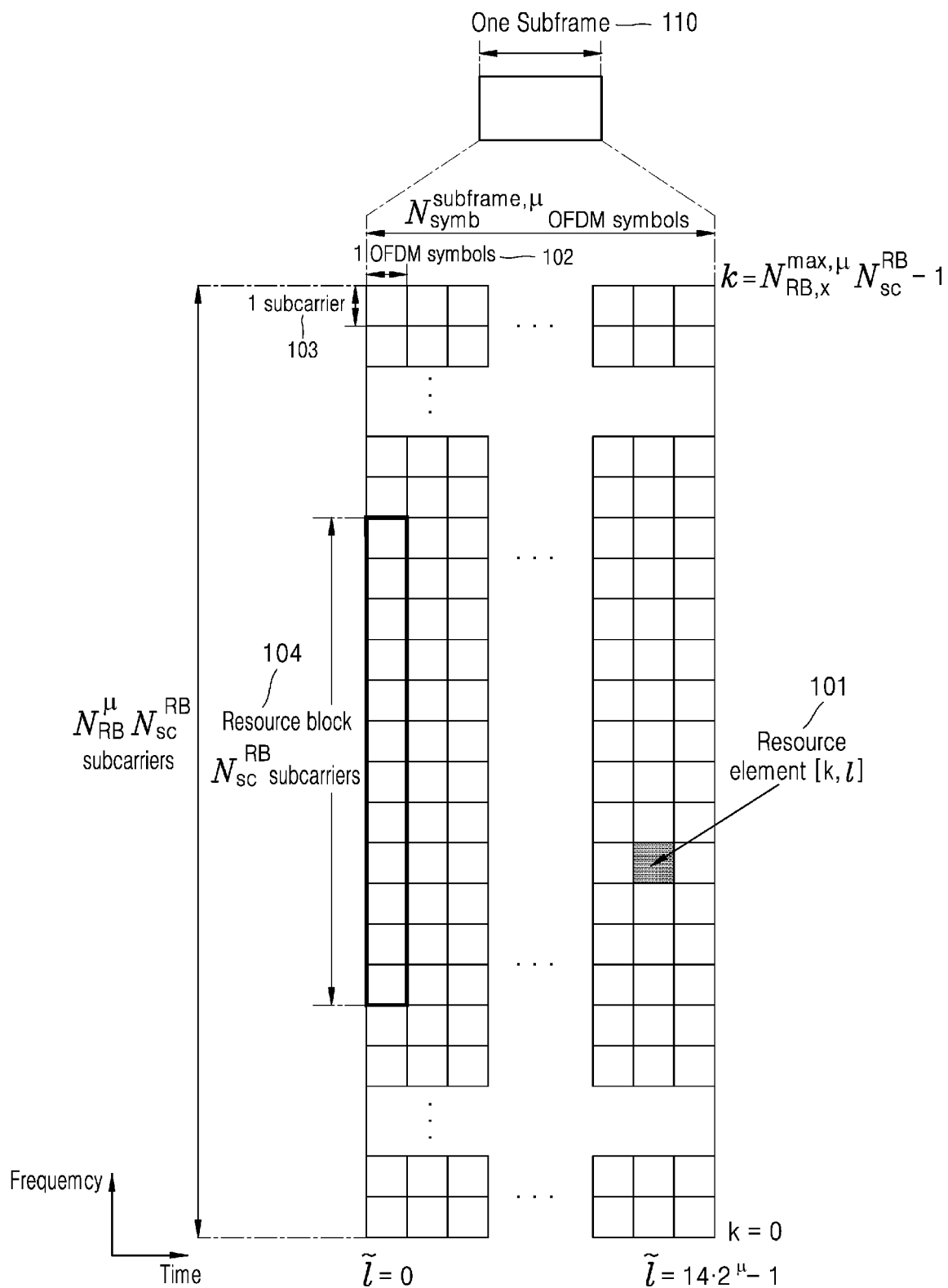
FIG. 1 illustrates a diagram of a base structure of a time-frequency domain in a wireless communication system according to an embodiment of the disclosure.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described with reference to accompanying drawings.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like or corresponding elements.

Advantages and features of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Hereinafter, a base station is an entity that allocates resources of a terminal, and may be at least one of a next generation node B (gNB), an evolved node B (eNB), a node B (NB), a base station (BS), a wireless access unit, a base station controller, or a node on a network. Also, the base station may be a network entity including at least one of an integrated access and backhaul (IAB)-donor that is a gNB providing a network access to a terminal(s) through a network of a backhaul and access links in a new radio (NR) system, or an IAB-node that is a radio access network (RAN) node supporting an NR access link(s) to a terminal(s) and supporting NR backhaul links to the IAB-donor or another IAB-node. A terminal may be wirelessly accessed through an IAB-node, and transmit or receive data to or from an IAB-donor connected to at least one IAB-node through a backhaul link. Examples of a terminal may include user equipment (UE), a mobile station (MS), a cellular phone, a smartphone, a computer, and a multimedia system capable of performing a communication function. In the disclosure, a downlink (DL) is a wireless transmission path of a signal transmitted from a base station to a terminal, and an uplink (UL) is a wireless transmission path of a signal transmitted from a terminal to a base station. Also, hereinbelow, a long-term evolution (LTE) or long-term evolution advanced (LTE-A) system may be described as an example, but an embodiment of the disclosure may also be applied to other communication systems having a similar technical background or channel form. An example of the other communication may include a $5^{th}$ generation wireless communication technology (5G or new radio (NR)) developed after LTE-A, and hereinafter, 5G may have a concept including existing LTE, LTE-A, and another similar service. Also, it will be understood by one of ordinary skill in the art that the disclosure may be applied to other communication systems through some modifications without departing from the scope of the disclosure.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units." Furthermore, the components and "units" may be embodied to reproduce one or more central processing units (CPUs) in a device or security multimedia card. Also, in the embodiments of the disclosure, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (BS) (e.g., eNode B), and the DL refers to a radio link through which a BS transmits data or a control signal to a terminal. In such a multiple access scheme, data or control information of each user is classified by generally allocating and managing the data or control information such that time-frequency resources for transmitting data or control information for each user do not overlap each other, that is, such that orthogonality is established.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra reliability low latency communication (hereinafter, URLLC), etc.

The eMBB aims to provide a higher data transfer rate than a data transfer rate supported by the LTE, LTE-A, or LTE-Pro system. For example, in the 5G communication system, the eMBB may be able to provide a peak data rate of 20 Gbps in a downlink and a peak data rate of 10 Gbps in an uplink from the viewpoint of one base station. In addition, the 5G communication system needs to provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as Internet of things (IoT) in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km') in a cell because the IoT is attached to various sensors and various devices to provide communication functions. In addition, the terminals supporting the mMTC are more likely to be positioned in shaded areas not covered by a cell, such as the underground of a building due to nature of services, and thus, the terminal may require a wider coverage than other services provided by the 5G communication system. The terminals that support the mMTC may be configured as inexpensive terminals and require very long battery lifetime, such as 10 to 15 years, because it is difficult to frequently replace batteries of the terminals.

Lastly, the URLLC is a cellular-based wireless communication system used for a specific purpose (mission-critical). For example, a service used in remote control for a robot or machinery, industrial automation, unmanned aerial vehicle, remote health care, or emergency alert may be considered. Accordingly, communication provided by the URLLC may provide very low latency and very high reliability. For example, a service supporting the URLLC may satisfy air interface latency smaller than 0.5 milliseconds and at the same time, has a packet error rate of $10^{-5}$ or less. Accordingly, for URLLC-supportive services, the 5G communication system may be required to provide a transmit time interval (TTI) shorter than those for other services while securing reliable communication links by allocating a broad resource in a frequency band.

The three services, that is, eMBB, URLLC, and mMTC, of the 5G system may be multiplexed in one system and may be transmitted. In this case, the services may use different transmission and reception methods and transmission and reception parameters in order to meet their different requirements. Obviously, the 5G system are not limited by the above three services.

Hereinafter, for convenience of description, some of terms and names defined by the 3GPP standard (standard of a 5G, NR, LTE, or similar system) may be used. However, the disclosure is not limited by such terms and names, and may be equally applied to systems conforming to other standards. Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

[NR Time-Frequency Resource]

Hereinafter, a frame structure of a 5G system will be described in detail with reference to accompanying drawings.

FIG. 1 illustrates a diagram showing a base structure of a time-frequency domain that is a radio resource region where data or a control channel is transmitted in a 5G system.

In FIG. 1, a horizontal axis represents a time domain and a vertical axis represents a frequency domain. In the time and frequency domains, a base unit of a resource is a resource element (RE) 101, and may be defined by one OFDM symbol 102 on a time axis and one subcarrier 103 on a frequency axis. In the frequency domain, $N_{sc}^{RB}$ (for example, 12) consecutive REs 101 may configure one resource block (RB) 104. In FIG. 1, $N_{symb}^{subframe,\mu}$ denotes the number of OFDM symbols 102 per subframe 110 for a subcarrier spacing configuration μ, and the TS 38.211 section 4 standard may be referred to for detailed descriptions about a resource structure in the 5G system.

Figure 2:
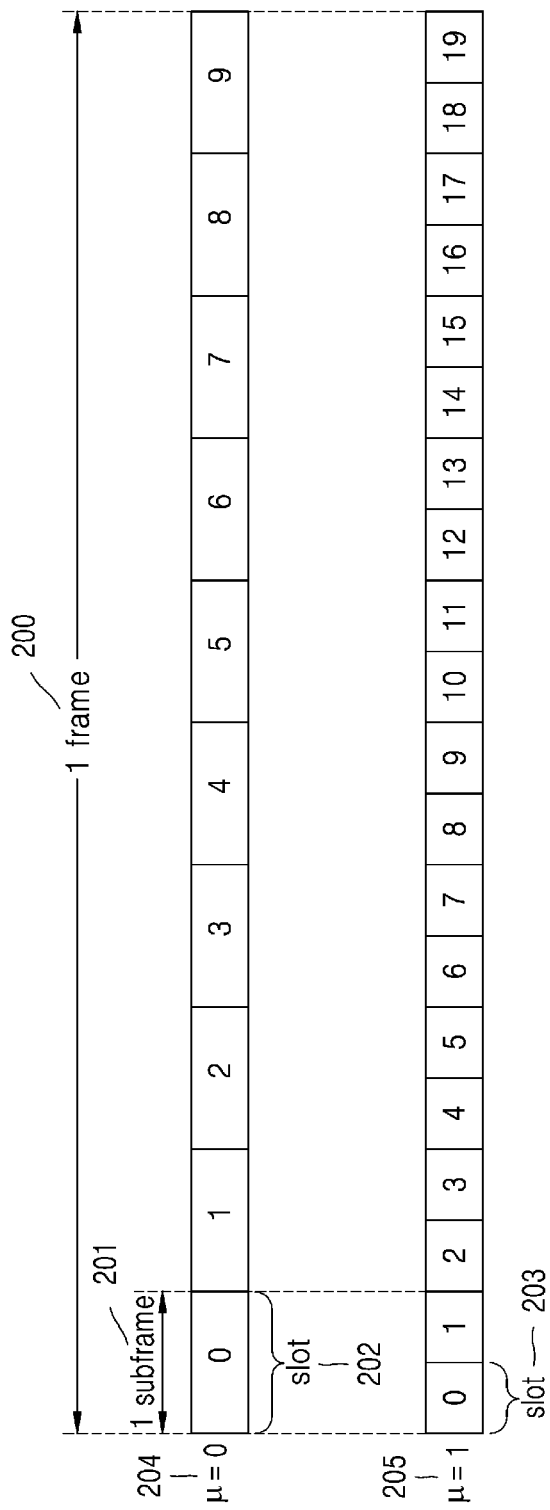
FIG. 2 illustrates a diagram of structures of a frame, subframe, and slot in a wireless communication system according to an embodiment of the disclosure.

FIG. 2 illustrates a diagram of structures of a frame 200, subframe 201, and slot 202 in a wireless communication system according to an embodiment of the disclosure.

FIG. 2 illustrates an example of the structures of the frame 200, the subframe 201, and the slot 202. One frame 200 may be defined to be 10 ms. One subframe 201 may be defined to be 1 ms, and accordingly, one frame 200 may include total 10 subframes 201. One slot 202 or 203 may be defined by 14 OFDM symbols (i.e., the number $N_{symb}^{slot}$ of symbols per slot=14). One subframe 201 may include one or more slots 202 and 203, and the number of slots 202 and 203 per subframe 201 may vary depending on configuration values μ 204 and 205 for subcarrier spacings. FIG. 2 illustrates cases where the configuration value μ 204 is 0 and the configuration value μ 205 is 1, as configuration values for subcarrier spacings. When the configuration value μ 204 is 0, one subframe 201 may include one slot 202, and when the configuration value μ 205 is 1, one subframe 201 may include two slots 203. In other words, the number $N_{symb}^{subframe,\mu}$ of slots per subframe may vary depending on a configuration value μ for a subcarrier spacing, and the number $N_{symb}^{frame,\mu}$ of slots per frame may vary accordingly. $N_{symb}^{subframe,\mu}$ and $N_{symb}^{frame,\mu}$ according to the configuration value μ for each subcarrier spacing may be defined as Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a BWP configuration in a 5G communication system will be described in detail with reference to the drawings.

Figure 3:
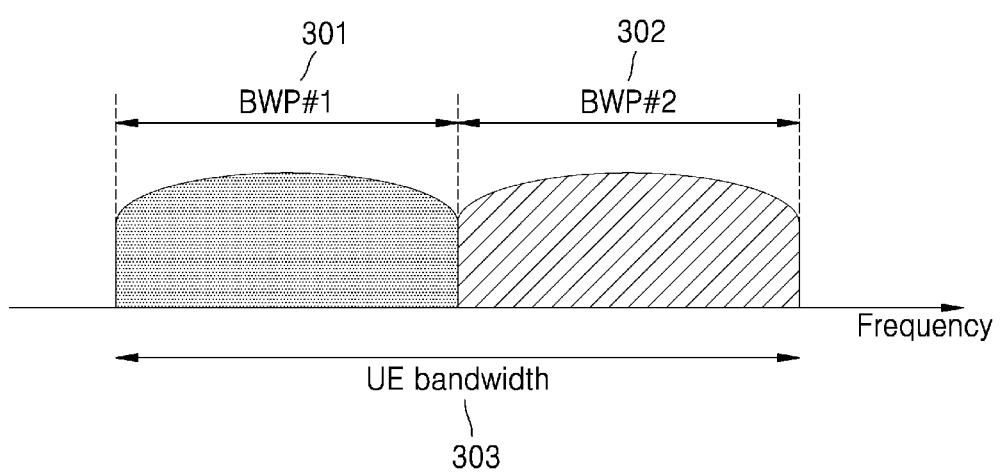
FIG. 3 illustrates a diagram of an example of a configuration of a bandwidth part in a wireless communication system according to an embodiment of the disclosure.

FIG. 3 illustrates a diagram of an example of a configuration of a BWP in a wireless communication system according to an embodiment of the disclosure.

FIG. 3 illustrates an example in which a UE bandwidth 303 is configured in two BWPs, that is, a BWP #1 301 and a BWP #2 302. A base station may configure a UE with one or a plurality of BWPs, and may configure following pieces of information for each BWP.

TABLE 2

| BWP ::= | SEQUENCE { |
|---|---|
| bwp-Id | BWP-Id, |
| (BWP ID) | |
| locationAndBandwidth | INTEGER (1..65536), |
| (Location of BWP) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

In Table 2, "locationAndBandwidth" denotes a location and bandwidth of a corresponding BWP in a frequency domain, "subcarrierSpacing" denotes a subcarrier spacing to be used in the BWP, and "cyclicPrefix" denotes whether an extended cyclic prefix (CP) is used for the BWP.

However, the disclosure is not limited to the above example, and in addition to the information configured as described above, various parameters related to a BWP may be configured for the UE. The information may be transmitted by the base station to the UE through higher layer signaling, for example, radio resource control (RRC) signaling. At least one BWP from among the configured one or plurality of BWPs may be activated. Whether to activate the configured BWP may be transmitted from the base station to the UE semi-statically through RRC signaling or dynamically through downlink control information (DCI).

According to some embodiments of the disclosure, an initial BWP for an initial access may be configured for the UE before an RRC connection by the base station through a master information block (MIB). More specifically, the UE may receive configuration information related to a control resource set (CORESET) and a search space, in which a physical downlink control channel (PDCCH) may be transmitted, the PDCCH being designed to receive system information (may correspond to remaining system information (RMSI) or system information block 1 (SIB1)) required for the initial access, through an MIB in an initial access stage. The CORESET and search space that are configured through the MIB may be assumed to be identities (IDs) 0, respectively. The CORESET and search space that are configured through the MIB may be respectively referred to as a common CORESET and a common search space. The base station may notify the UE of configuration information, such as frequency allocation information, time allocation information, or numerology, for a CORESET #0, through the MIB. Also, the base station may notify the UE of configuration information for a monitoring cycle and occasion for the CORESET #0, i.e., configuration information for a search space #0, through the MIB. The UE may consider a frequency domain configured by the CORESET #0 obtained from the MIB, as an initial BWP for the initial access. Here, an ID of the initial BWP may be considered to be 0. The CORESET may be referred to as a control region, a control resource region, or the like.

A configuration for the BWP supported in 5G may be used for various purposes.

According to some embodiments of the disclosure, when a bandwidth supported by the UE is smaller than a system bandwidth, the UE may be supported through the configuration of the BWP. For example, the base station may configure the UE with a frequency location of the BWP such that the UE may transmit or receive data at a specific frequency location within the system bandwidth.

Also, according to some embodiments of the disclosure, the base station may configure the UE with a plurality of BWPs for a purpose of supporting different numerologies. For example, to support data transmission/reception using both a subcarrier spacing of 15 kHz and a subcarrier spacing of 30 kHz for the UE, two BWPs respectively having the subcarrier spacings of 15 kHz and 30 kHz may be configured. Frequency division multiplexing may be performed on the different BWPs, and when data is to be transmitted/received in a specific subcarrier spacing, a BWP configured to have the corresponding subcarrier spacing may be activated.

According to some embodiments of the disclosure, the base station may configure the UE with BWPs, which have different sizes of bandwidths, for a purpose of reducing power consumption of the UE. For example, when the UE supports a very wide bandwidth, for example, a bandwidth of 100 MHz, and always transmits/receives data through the corresponding bandwidth, very large power consumption may occur. In particular, it may be very inefficient in terms of power consumption to monitor an unnecessary downlink control channel in a large bandwidth of 100 MHz in a situation where there is no traffic. Accordingly, the base station may configure the UE with BWP of a relatively small bandwidth, for example, a BWP of 20 MHz, for a purpose of reducing the power consumption of the UE. In a situation where there is no traffic, the UE may perform a monitoring operation in a BWP of 20 MHz, and when data is generated, the UE may transmit/receive the data through a BWP of 100 MHz according to an instruction of the base station.

In relation to a method of configuring the BWP, the UEs before RRC-connected may receive configuration information regarding the initial BWP through the MIB in the initial access stage. In detail, the UE may be configured with, from an MIB of a physical broadcast channel (PBCH), a CORESET for a downlink control channel through which DCI for scheduling a system information block (SIB) may be transmitted. A bandwidth of the CORESET configured by the MIB may be considered as the initial BWP, and the UE may receive a physical downlink shared channel (PDSCH) through which the SIB is transmitted, through the configured initial BWP. The initial BWP may be used for other system information (OSI), paging, and random access, in addition to the reception of the SIB.

[BWP Switch]

When the UE is configured with one or more BWPs, the base station may indicate the UE to change (or switch or transit) the BWP by using a BWP indicator field in the DCI. For example, in FIG. 3, when a currently activated BWP of the UE is the BWP #1 301, the base station may indicate the BWP #2 302 as a BWP indicator in the DCI to the UE, and the UE may perform a BWP switch to the BWP #2 302 indicated by the BWP indicator in the received DCI.

As described above, because the DCI-based BWP switch may be indicated by the DCI scheduling a PDSCH or physical uplink shared channel (PUSCH), when a BWP switch request is received, the UE needs to perform reception or transmission in the PDSCH or PUSCH scheduled by the DCI, at the switched BWP without any difficulty. In this regard, the standard has stipulated requirements on a delay time $T_{BWP}$ required during the BWP switch, and for example, the requirements may be defined as below.

TABLE 3

| $\mu$ | NR Slot length (ms) | BWP switch delay $T_{BWP}$ (slots) | |
|---|---|---|---|
| | | Type 1 Note 1 | Type 2 Note 1 |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements on the delay time $T_{BWP}$ for the BWP switch supports Type 1 or Type 2 depending on UE capability. The UE may report a supportable type of the delay time $T_{BWP}$ for the BWP switch to the base station.

According to the requirements on the delay time $T_{BWP}$ for the BWP switch, when the UE has received, from a slot n, the DCI including a BWP switch indicator, the UE may complete a switch to a new BWP indicated by the BWP switch indicator at a time point not later than a slot n+$T_{BWP}$, and perform transmission/reception for a data channel scheduled by the DCI at the switched new BWP. When the base station is to schedule the data channel in the new BWP, the base station may determine time domain resource allocation for the data channel, considering the delay time $T_{BWP}$ for the BWP switch of the UE. In other words, regarding a method of determining the time domain resource allocation for the data channel when scheduling the data channel in the new BWP, the base station may schedule the data channel after the delay time $T_{BWP}$ for the BWP switch. Accordingly, the UE may not expect the DCI indicating the BWP switch to indicate a value of a slot offset K0 ( ) or K2 smaller than the delay time $T_{BWP}$ for the BWP switch.

When the UE has received the DCI (for example, a DCI format 1_1 or 0_1) indicating the BWP switch, the UE may not perform any transmission or reception during a time period from a third symbol of a slot that received the PDCCH including the DCI to a starting point of a slot indicated by the value of the slot offset K0 or K2 indicated by a time domain resource allocation indicator field in the DCI. For example, when the UE has received the DCI indicating the BWP switch in the slot n, and a value of the slot offset indicated by the DCI is K, the UE may not perform any transmission or reception from a third symbol of the slot n to a symbol before a slot n+K (i.e., a last symbol of a slot n+K−1).

[Synchronization Signal (SS)/PBCH Block]

Next, an SS/PBCH block in 5G will be described.

The SS/PBCH block may denote a physical layer channel block including a primary SS (PSS), a secondary SS (SSS), and a PBCH. In detail, the SS/PBCH block is as below.

PSS: A PSS is a signal serving as a criterion of downlink time/frequency synchronization, and provides partial information of a cell ID.

SSS: An SSS is a signal serving as a criterion of the downlink time/frequency synchronization, and provides the remaining cell ID information which is not provided by the PSS. Additionally, the SSS may serve as a reference signal for demodulation of a PBCH.

PBCH: A PBCH provides essential system information required for transmission/reception for a data channel and a control channel of a UE. The essential system information may include search space-related control information indicating radio resource mapping information of the control channel, and scheduling control information regarding a separate data channel through which system information is transmitted.

SS/PBCH Block: An SS/PBCH block is configured by a combination of the PSS, the SSS, and the PBCH. One or a plurality of SS/PBCH blocks may be transmitted within a time of 5 ms, and each of the transmitted SS/PBCH blocks may be identified by an index.

The UE may detect the PSS and the SSS in an initial access stage, and may decode the PBCH. The UE may obtain an MIB from the PBCH, and may be configured with, from the MIB, a CORESET #0 (may correspond to a CORESET having a CORESET index of 0). The UE may monitor the CORESET #0 under the assumption that the SS/PBCH block selected by the UE and a demodulation reference signal (DMRS) transmitted in the CORESET #0 are at a quasi-co-location (QCL). The UE may receive system information through DCI transmitted in the CORESET #0. The UE may obtain random access channel (RACH)-related configuration information required for an initial access, from the received system information. The UE may transmit a physical RACH (PRACH) to a base station in consideration of a selected SS/PBCH index, and the base station that received the PRACH may obtain information regarding an index of the SS/PBCH block selected by the UE. The base station may identify which block from among the SS/PBCH blocks is selected by the UE, and that the UE is monitoring the CORESET #0 associated with the block.

[PDCCH: Regarding DCI]

Next, DCI in a 5G system will be described in detail.

In the 5G system, scheduling information for uplink data (or PUSCH) or downlink data (or PDSCH) is transmitted from a base station to a UE via DCI. The UE may monitor a fallback DCI format and a non-fallback DCI format for the PUSCH or PDSCH. The fallback DCI format may include a fixed field pre-defined between the base station and the UE, and the non-fallback DCI format may include a configurable field.

The DCI may be transmitted through a PDCCH through channel coding and modulating processes. A cyclic redundancy check (CRC) is attached to a DCI message payload, and the CRC may be scrambled to a radio network temporary identifier (RNTI) corresponding to an identity of the UE. Different RNTIs may be used depending on a purpose of a DCI message, for example, UE-specific data transmission, a power control command, or a random access response. In other words, the RNTI is not explicitly transmitted, but is transmitted by being included in a CRC calculation process. Upon receiving the DCI message transmitted on the PDCCH, the UE may check the CRC by using an allocated RNTI, and when a result of checking the CRC is correct, the UE may determine that the corresponding message is transmitted to the UE.

For example, the DCI scheduling the PDSCH for system information (SI) may be scrambled with an SI-RNTI. The DCI scheduling the PDSCH for a random access response (RAR) message may be scrambled with an RA-RNTI. The DCI scheduling the PDSCH for a paging message may be scrambled with a P-RNTI. The DCI notifying a slot format indicator (SFI) may be scrambled with an SFI-RNTI. The DCI notifying transmit power control (TPC) may be scrambled with a TPC-RNTI. The DCI for scheduling the UE-specific PDSCH or PUSCH may be scrambled with a cell RNTI (C-RNTI).

A DCI format 0_0 may be used as fallback DCI for scheduling the PUSCH and at this time, the CRC may be scrambled with the C-RNTI. The DCI format 0_0 of which the CRC is scrambled with the C-RNTI may include pieces of information as below.

TABLE 4

Identifier for DCI formats - [1] bit
Frequency domain resource assignment - 
$\lceil \log_2(N_{RB}^{UL, BWP} (N_{RB}^{UL, BWP} +1)/2) \rceil$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit A DCI format 0_1 may be used as non-fallback DCI for scheduling the PUSCH and at this time, the CRC may be scrambled with the C-RNTI. The DCI format 0_1 of which the CRC is scrambled to the C-RNTI may include pieces of information as below.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.

TABLE 5-continued

Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits
SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta offset indicator - 0 or 2 bits
DMRS sequence initialization - 0 or 1 bit

TABLE 6

Identifier for DCI formats - [1] bit
Frequency domain resource assignment - 
$\lceil \log 2 (N_{RB}^{DL,BWP} +1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits A DCI format 1_1 may be used as non-fallback DCI for scheduling the PDSCH and at this time, the CRC may be scrambled with the C-RNTI. The DCI format 1_1 of which the CRC is scrambled with the C-RNTI may include pieces of information as below.

TABLE 7

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP} / P \rceil$ bits
    or resource allocation type 1,
    $\lceil \log_2 (N_{RB}^{DL,BWP} (N_{RB}^{DL,BWP} +1)/2) \rceil$ bits
Time domain resource assignment −1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 0 or 1 bit
Rate matching indicator - 0, 1, or 2 bits
ZP CSI-RS trigger - 0, 1, or 2 bits
For transport block 1:
    Modulation and coding scheme - 5 bits
    New data indicator - 1 bit
    Redundancy version - 2 bits TABLE 7-continued For transport block 2:
  Modulation and coding scheme - 5 bits
  New data indicator - 1 bit
  Redundancy version - 2 bits
  HARQ process number - 4 bits
  Downlink assignment index - 0 or 2 or 4 bits
  TPC command for scheduled PUCCH - 2 bits
  PUCCH resource indicator - 3 bits
  PDSCH-to-HARQ_feedback timing indicator - 3 bits
  Antenna ports - 4, 5 or 6 bits
  Transmission configuration indication - 0 or 3 bits
  SRS request - 2 bits
  CBG transmission information - 0, 2, 4, 6, or 8 bits
  CBG flushing out information - 0 or 1 bit
  DMRS sequence initialization - 1 bit

[PDCCH: CORESET, Resource Element Group (REG), Control Channel Element (CCE), Search Space]

Hereinafter, a downlink control channel in a 5G communication system will be described in detail with reference to the drawings.

Figure 4:
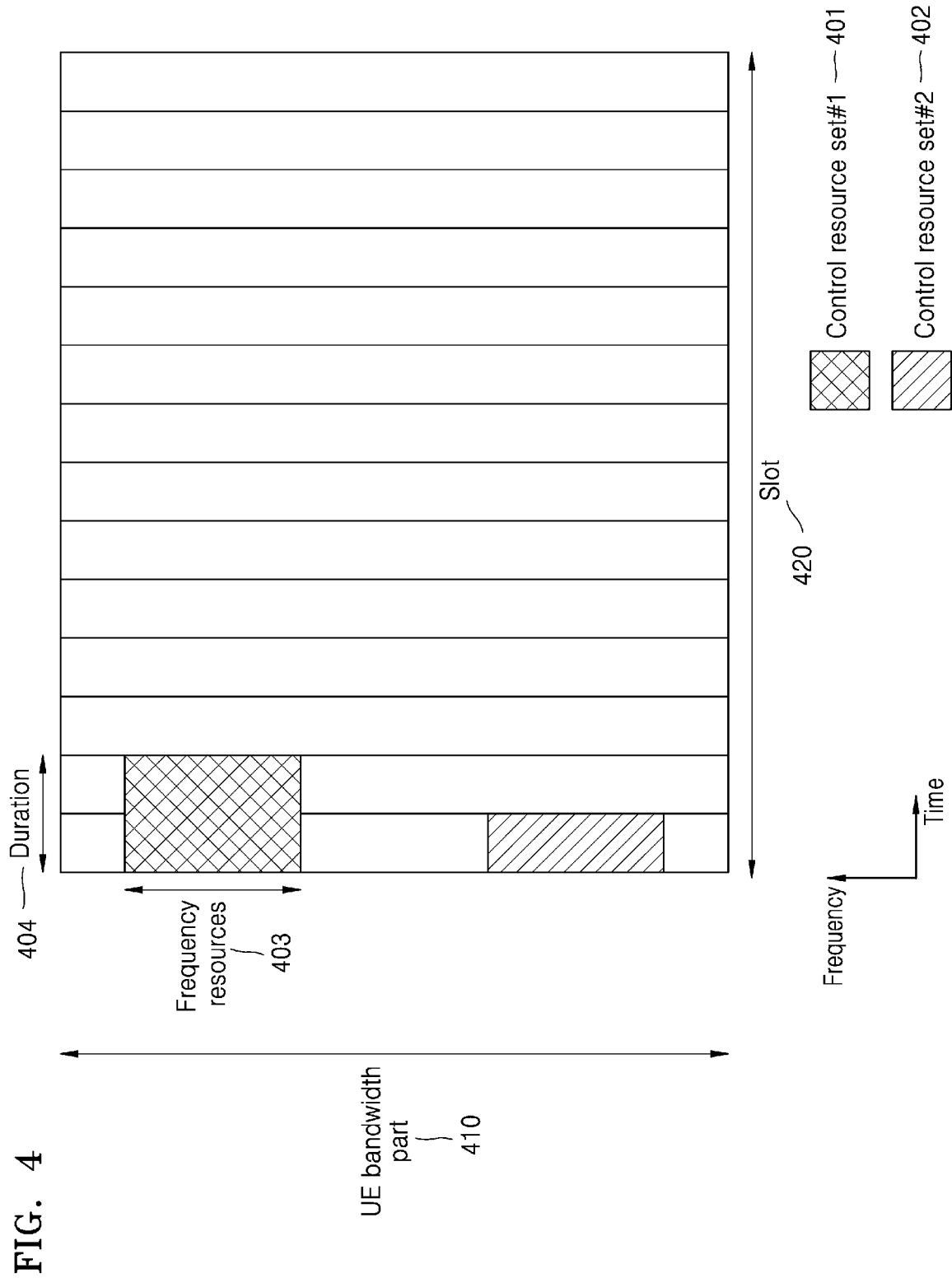
FIG. 4 illustrates a diagram of an example of a configuration of a control resource set (CORESET) of a downlink control channel in a wireless communication system according to an embodiment of the disclosure.

FIG. 4 illustrates an example of a CORESET through which a downlink control channel is transmitted in a 5G wireless communication system. FIG. 4 illustrates an example in which a UE BWP 410 is configured in a frequency axis and two CORESETs (a CORESET #1 401 and a CORESET #2 402) in one slot 420 are configured in a time axis. The CORESETs #1 and #2 401 and 402 may be configured on a specific frequency resource 403 within the entire UE BWP 410 on the frequency axis. In FIG. 4, the specific frequency resource 403 is an example of a frequency resource configured in the CORESET #1 401. A CORESET may be configured by one or a plurality of OFDM symbols in the time axis, and the one or plurality of OFDM symbols may be defined as a CORESET duration 404. With reference to the example illustrated in FIG. 4, the CORESET #1 401 is configured to have a CORESET duration of two symbols, and the CORESET #2 402 is configured to have a CORESET duration of one symbol.

In 5G described above, a CORESET may be configured to a UE by a base station through higher layer signaling (for example, system information, MIB, or RRC signaling). The configuring of the CORESET to the UE indicates providing information, such as a CORESET identity, a frequency location of the CORESET, and a symbol length of the CORESET. For example, configuration information regarding the CORESET may include following pieces of information.

TABLE 8

ControlResourceSet ::=       SEQUENCE{
  -- Corresponds to L1 parameter "CORESET-ID"
  controlResourceSetId       ControlResourceSetId,
  (CORESET Identity)
    frequencyDomainResources       BIT STRING (SIZE
(45)),
  (Frequency Axis Resource Allocation Information)
    duration       INTEGER
(1..maxCoReSetDuration),
  (Time Axis Resource Allocation Information)
  cce-REG-MappingType
    CHOICE {
  (CCE-to-REG Mapping Type)
    interleaved
    SEQUENCE {
      reg-BundleSize
    ENUMERATED {n2, n3, n6},
      (REG Bundle Size)
        PrecoderGranularity TABLE 8-continued ENUMERATED {sameAsREG-bundle,
    allContiguousRBs),
      interleaverSize
    ENUMERATED {n2, n3, n6}
      (Interleaver Size)
      ShiftIndex
    INTEGER(0..
    maxNrofPhysicalResourceBlocks-1)
      OPTIONAL
(Interleaver Shift)
  },
    nonInterleaved       NULL
  },
  tci-StatesPDCCH
  SEQUENCES(SIZE(1..maxNrofTCI-
  StatesPDCCH)) OF TCI-StateId
    OPTIONAL,
  (QCL Configuration Information)
    tci-PresentInDCI       ENUMERATED
{enabled}
      OPTIONAL, -- Need S
}

In Table 8, tci-StatesPDCCH (simply referred to as a transmission configuration indication (TCI) state) configuration information may include information about an index or indices of one or multiple SS/PBCH blocks having a QCL relationship with a DMRS transmitted on a corresponding CORESET, or information about an index of a channel state information reference signal (CSI-RS).

Figure 5:
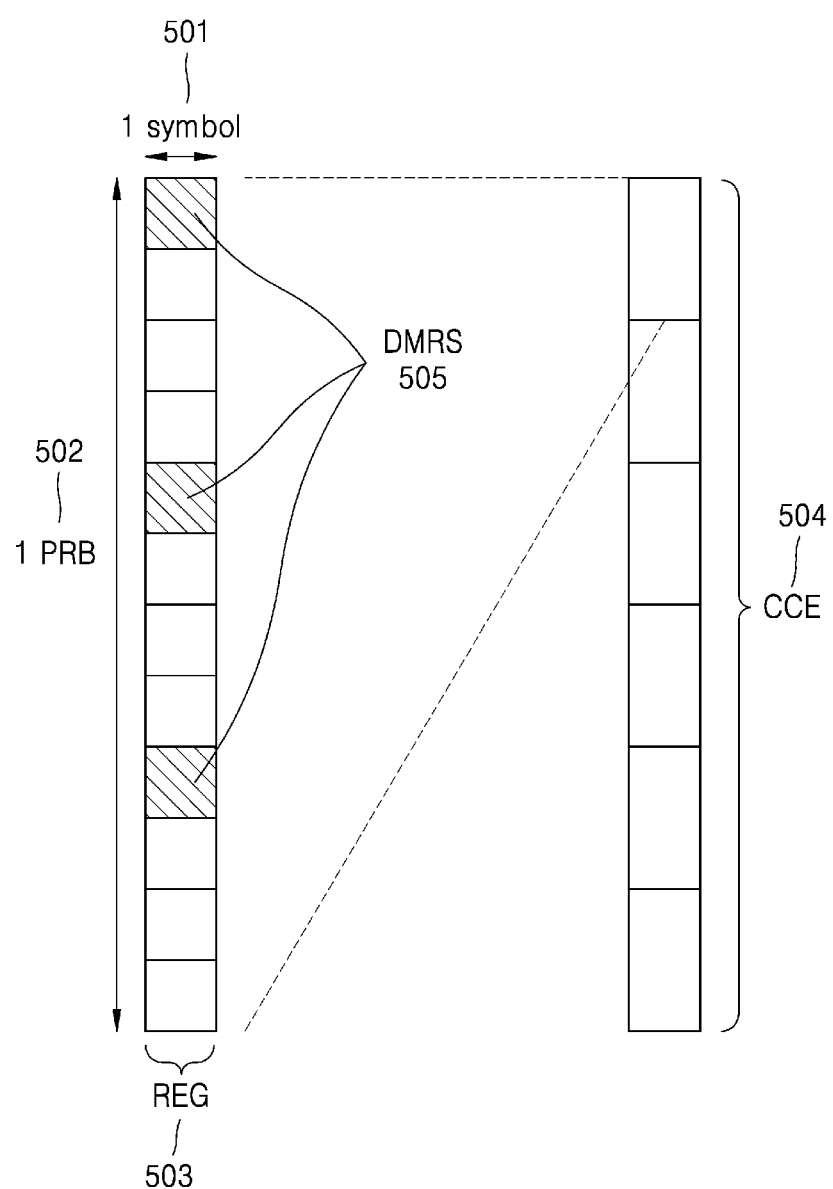
FIG. 5 illustrates a diagram of a structure of a downlink control channel in a wireless communication system according to an embodiment of the disclosure.

FIG. 5 illustrates a diagram showing an example of a base unit of time and frequency resources configuring a downlink control channel, which may be used in 5G. According to FIG. 5, the base unit of the time and frequency resources configuring the downlink control channel may be called an REG 503, and the REG 503 may be defined by one OFDM symbol 501 on a time axis and one physical resource block (PRB) 502 on a frequency axis, that is, may be defined by, 12 subcarriers. A base station connects and attaches REGs 503 to each other to configure a downlink control channel allocation unit.

As shown in FIG. 5, when a base unit for allocation for the downlink control channel in 5G is a control channel element (CCE) 504, one CCE 504 may be configured by a plurality of the REGs 503. For example, the REG 503 shown in FIG. 5 may be configured by 12 REs, and when one CCE 504 is configured by six REGs 503, the one CCE 504 may be configured by 72 REs. When a downlink CORESET is configured, the downlink CORESET may be configured by the plurality of CCEs 504, and a specific downlink control channel may be transmitted after being mapped to one or the plurality of CCEs 504, according to an aggregation level (AL) in the CORESET. The CCEs 504 in the CORESET are distinguished by numbers, and here, the numbers of CCEs 504 may be assigned according to a logical mapping scheme.

The base unit of the downlink control channel shown in FIG. 5, i.e., the REG 503, may include REs to which DCI is mapped and a region to which a DMRS 505 that is a reference signal for decoding the REs is mapped. As shown in FIG. 5, three DMRSs 505 may be transmitted in one REG 503. The number of CCEs required to transmit a PDCCH may be 1, 2, 4, 8, or 16 depending on an AL, and the different numbers of CCEs may be used to implement link adaptation of a downlink control channel. For example, when AL=L, one downlink control channel may be transmitted via L CCEs. A UE needs to detect a signal while information about a downlink control channel is unknown, and a search space indicating a group of CCEs is defined for blind decoding.

The search space is a group of downlink control channel candidates including CCEs that are attempted to be decoded by the UE on a given AL, and the UE may have a plurality of search spaces because there are several ALs forming one group by using 1, 2, 4, 8, or 16 CCEs. A search space set may be defined as a group of search spaces in all configured ALs.

The search spaces may be classified into a common search space and a UE-specific search space. UEs of a certain group or all UEs may inquire into a common search space of a PDCCH to receive cell-common control information, such as a paging message or dynamic scheduling for system information. For example, PDSCH scheduling allocation information for transmission of an SIB including cell operator information or the like may be received by inquiring into the common search space of the PDCCH. The common search space may be defined as a group of pre-promised CCEs because the certain group of UEs or all UEs need to receive the PDCCH. Scheduling allocation information for a UE-specific PDSCH or PUSCH may be received by inquiring into a UE-specific search space of the PDCCH. The UE-specific search space may be UE-specifically defined by a function of an identity of a UE and various system parameters.

In 5G, a parameter for a search space of the PDCCH may be configured to the UE by a base station through higher layer signaling (for example, SIB, MIB, or RRC signaling). For example, the base station may configure the UE with the number of PDCCH candidates in each of the L ALs, a monitoring cycle for the search space, a monitoring occasion of a symbol unit within a slot for the search space, a search space type (common search space or UE-specific search space), a combination of a DCI format and RNTI to be monitored in the search space, and a CORESET index for monitoring the search space. For example, the parameter for the search space of the PDCCH may include following pieces of information.

TABLE 9

```
SearchSpace ::=                                        SEQUENCE {
    -- Identity of the search space. SearchSpaceId = 0 identifies the SearchSpace
configured via PBCH (MIB) or ServingCellConfigCommon.
    searchSpaceId                                      SearchSpaceId,
(Search Space ID)
    controlResourceSetId                               ControlResourceSetId,
(CORESET ID)
    monitoringSlotPeriodicityAndOffset                 CHOICE {
(Monitoring Slot Level Period)
     sl1
    NULL,
     sl2
    INTEGER (0..1),
     sl4
    INTEGER (0..3),
     sl5
    INTEGER (0..4),
     sl8
    INTEGER (0..7),
     sl10
    INTEGER (0..9),
     sl16
    INTEGER (0..15),
     sl20
    INTEGER (0..19)
    }                                                  OPTIONAL,
duration(Monitoring Length) INTEGER (2..2559)
    monitoringSymbolsWithinSlot                        BIT STRING
(SIZE (14))
        OPTIONAL,
(Monitoring Symbol within Slot)
    nrofCandidates                                     SEQUENCE {
(Number of PDCCH Candidates for each AL)
     aggregationLevel1
    ENUMERATED {n0, n1, n2, n3, n4, n5, n6, n8},
     aggregationLevel2
    ENUMERATED {n0, n1, n2, n3, n4, n5, n6, n8},
     aggregationLevel4
    ENUMERATED {n0, n1, n2, n3, n4, n5, n6, n8},
     aggregationLevel8
    ENUMERATED {n0, n1, n2, n3, n4, n5, n6, n8},
     aggregationLevel16
    ENUMERATED {n0, n1, n2, n3, n4, n5, n6, n8}
    },
    searchSpaceType
    CHOICE {
    (Search Space Type)
        -- Configures this search space as common search space (CSS) and DCI
formats to monitor.
     common
    SEQUENCE {
    (Common Search Space)
    }
     ue-Specific
    SEQUENCE {
    (UE-specific Search Space)
```

TABLE 9-continued

-- Indicates whether the UE monitors in this USS for DCI formats
0-0 and 1-0 or for formats 0-1 and 1-1.
  formats
  ENUMERATED {formats0-0-And-1-0, formats0-1-And-1-1},
  ...
}

The base station may configure the UE with one or a plurality of search space sets, according to the configuration information. According to some embodiments of the disclosure, the base station may configure the UE with a search space set #1 and a search space set #2, configure a DCI format A scrambled with X-RNTI in the search space set #1 to be monitored in the common search space, and configure a DCI format B scrambled with Y-RNTI in the search space set #2 to be monitored in the UE-specific search space. X and Y in the X-RNTI and Y-RNTI may each correspond to one of various RNTIs described below.

According to the configuration information, there may be one or a plurality of search space sets in the common search space or the UE-specific search space. For example, a search space set #1 and a search space set #2 may be configured as the common search space, and a search space set #3 and a search space set #4 may be configured as the UE-specific search space.

In the common search space, a combination of a DCI format and RNTI, as below, may be monitored. However, the combination is not limited to the following examples:
  DCI format 0_0/1_0 with CRC scrambled with C-RNTI, CS-RNTI, SP-CSI-RNTI, RA-RNTI, TC-RNTI, P-RNTI, SI-RNTI;
  DCI format 2_0 with CRC scrambled with SFI-RNTI;
  DCI format 2_1 with CRC scrambled with INT-RNTI;
  DCI format 2_2 with CRC scrambled with TPC-PUSCH-RNTI, TPC-PUCCH-RNTI; and
  DCI format 2_3 with CRC scrambled with TPC-SRS-RNTI.

In the UE-specific search space, a combination of a DCI format and RNTI below may be monitored. However, the combination is not limited to the following examples:
  DCI format 0_0/1_0 with CRC scrambled with C-RNTI, CS-RNTI, TC-RNTI; and
  DCI format 1_0/1_1 with CRC scrambled with C-RNTI, CS-RNTI, TC-RNTI.

The specified RNTIs may follow the following definitions and usages:
  Cell RNTI (C-RNTI): For scheduling UE-specific PDSCH;
  Temporary cell RNTI (TC-RNTI): For scheduling UE-specific PDSCH;
  Configured scheduling RNTI (CS-RNTI): For scheduling quasi-statically configured UE-specific PDSCH;
  Random access RNTI (RA-RNTI): For scheduling PDSCH during random access;
  Paging RNTI (P-RNTI): For scheduling PDSCH on which paging is transmitted;
  System information RNTI (SI-RNTI): For scheduling PDSCH on which system information is transmitted;
  Interruption RNTI (INT-RNTI): For notifying about puncturing of PDSCH;
  Transmit power control for PUSCH RNTI (TPC-PUSCH-RNTI): For indicating power control command for PUSCH;
  Transmit power control for PUCCH RNTI (TPC-PUCCH-RNTI): For indicating power control command for PUCCH; and
  Transmit power control for SRS RNTI (TPC-SRS-RNTI): For indicating power control command for SRS.

The DCI formats specified above may follow definitions below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a CORESET p and a search space of an AL in a search space set s may be represented as Equation 1 below:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \left\lfloor \frac{N_{CCE,p}}{L} \right\rfloor \right\} + i \qquad \text{[Equation 1]}$$

L: AL
$n_{CI}$: Carrier Index
$N_{CCE,p}$: Total Number of CCEs present within CORESET p
$n_{s,f}^{\mu}$: Slot Index
$M_{s,max}^{(L)}$: Number of PDCCH Candidates of AL
$m_{s,n_{CI}} = 0, \ldots, M_{s,max}^{(L)} - 1$: Indexes of PDCCH Candidates of AL
$i = 0, \ldots, L-1$
$Y_{p,n_{s,f}^{\mu}} = A_p \cdot Y_{p,n_{s,f}^{\mu}-1}) \mod D$, $Y_{p,-1} = n_{RNTI} \neq 0$, $A_p = 39827$ for pmod3=0, $A_p = 39829$ for pmod3=1, $A_p = 39839$ for pmod3=2, D=65537
$n_{RNTI}$: UE ID.

A value of $Y_{p,n_{s,f}^{\mu}}$ may correspond to 0 in the common search space.

The value of $Y_{p,n_{s,f}^{\mu}}$ may be a value changing according to an identity (C-RNTI or ID configured to the UE by the base station) of the UE and a time index, in the UE-specific search space.

In 5G, a plurality of search space sets may be configured by different parameters (e.g., parameters in Table 9), and thus a group of search space sets monitored by the UE may be changed at every time point. For example, when the search space set #1 is configured to have an X-slot period, the search space set #2 is configured to have a Y-slot period, and X is different from Y, the UE may monitor both the search space set #1 and the search space set #2 in a specific slot, or may monitor one of the search space set #1 and the search space set #2 in a specific slot.

[PDCCH: Span]

A UE may perform UE capability reporting regarding a case where the UE has a plurality of PDCCH monitoring occasions in a slot, for each subcarrier spacing, and at this time, may use a concept of span. The span denotes consecutive symbols for the UE to monitor the PDCCH in the slot, and each PDCCH monitoring occasion is within one span. The span may be represented as (X,Y), and here, X denotes the minimum number of symbols between first symbols of two consecutive spans, and Y denotes the number of consecutive symbols for monitoring the PDCCH in one span. Here, the UE may monitor the PDCCH in a section of the span from a first symbol to a Y symbol, in the span.

Figure 6:
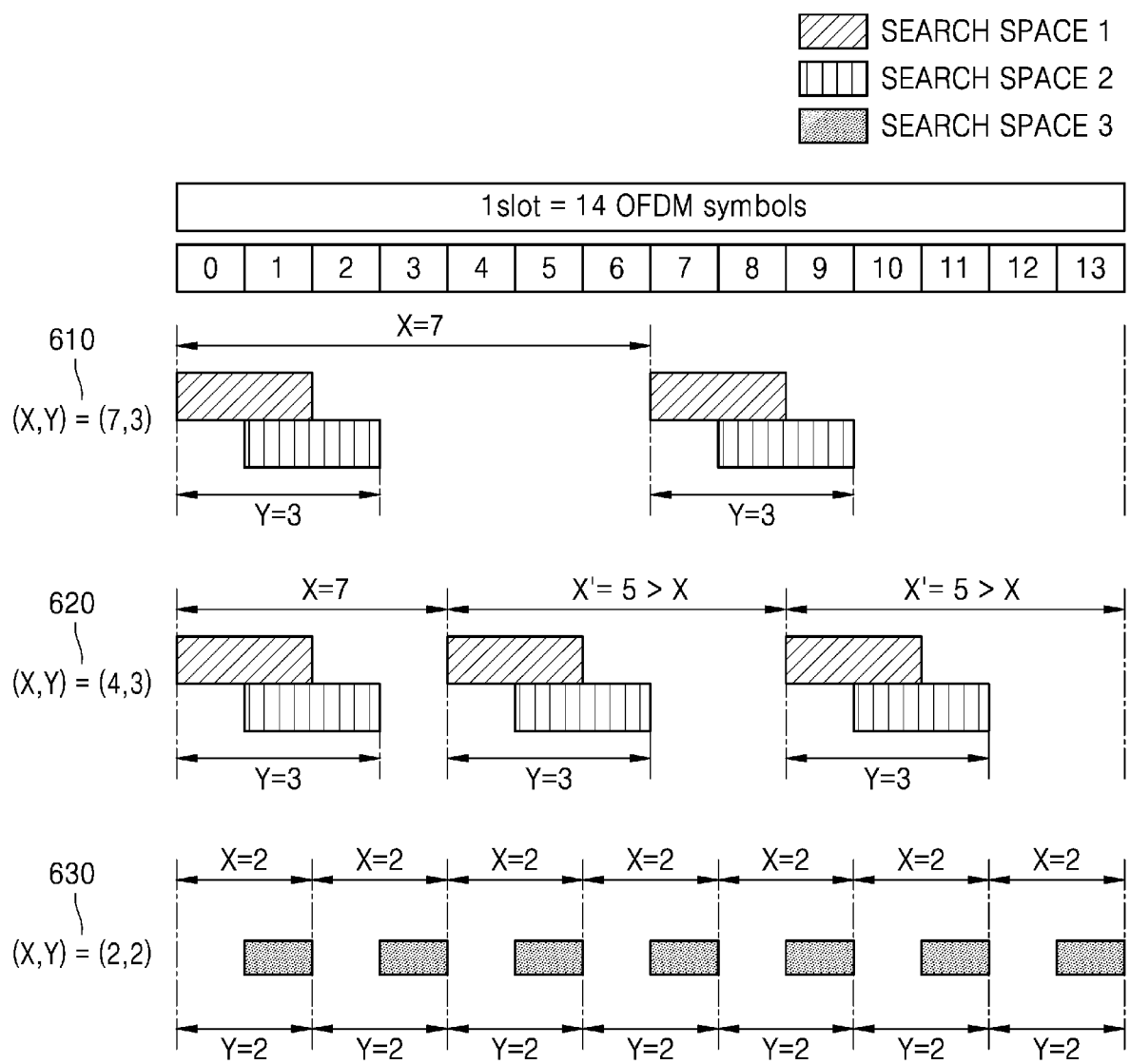
FIG. 6 illustrates a diagram showing, a case where a user equipment (UE) may have a plurality of physical downlink control channel (PDCCH) monitoring occasions in a slot in a wireless communication system in terms of spans, according to an embodiment of the disclosure.

FIG. 6 illustrates a diagram showing, through a span, a case where a UE may have a plurality of PDCCH monitoring occasions in a slot in a wireless communication system.

Referring to FIG. 6, the span includes, for example, three cases of (X,Y)=(7, 3), (4, 3), and (2, 2), which are respectively indicated by reference numerals 610, 620, and 630, respectively. For example, the case 610 shows a case where two spans representable by (7, 3) are present in a slot. An interval between first symbols of the two spans is represented by X=7, a PDCCH monitoring occasion may be present within total Y=3 symbols from a first symbol of each span, and search spaces 1 and 2 are each present within Y=3 symbols. As another example, the case 620 shows a case where total three spans representable by (4, 3) are present in a slot, and an interval between second and third spans is X'=5 symbols that is greater than X=4 symbols. The case 630 shows a case where total seven spans representable by (2, 2) are present in a slot, a PDCCH monitoring occasion may be present within total Y=2 symbols from a first symbol of each span, and a search space 3 is present within Y=2 symbols.

[PDCCH: UE Capability Reporting]

Slot locations where a common search space and UE-specific search space described above are located is indicated by a monitoringSlotPeriodicityAndOffset parameter of Table 9 indicating configuration information of a search space of a PDCCH, and a symbol location in a slot is indicated by a bitmap through a monitoringSymbolsWithinSlot parameter of Table 9. A symbol location in a slot on which a UE may perform search space monitoring may be reported to a base station through following UE capabilities.

UE Capability 1 (hereinafter, indicated as feature group (FG) 3-1). As in Table 11 below, the UE capability 1 denotes a capability capable of monitoring a monitoring occasion (MO) when the corresponding MO is within first 3 symbols in a slot, in a case where one MO for type 1 and type 3 common search spaces or UE-specific search spaces is present in the slot. The UE capability 1 is a mandatory capability to be supported by all UEs supporting NR, and whether the UE capability 1 is supported may not be explicitly reported to a base station.

TABLE 11

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

UE Capability 2 (hereinafter, indicated as FG 3-2). As in Table 12 below, the UE capability 2 denotes a capability capable of monitoring an MO regardless of a location of a starting symbol of the corresponding MO, in a case where one MO for a common search space or UE-specific search space is present in the slot. The UE capability 2 is optionally supportable by the UE and whether the UE capability 2 is explicitly reported to the base station.

TABLE 12

| Index | Feature group | Components | Field name in TS 38.331 [2] |
|---|---|---|---|
| 3-2 | PDCCH monitoring on any span of up to 3 consecutive | For a given UE, all search space configurations are within the same span of 3 | pdcchMonitoringSingleOccasion |

TABLE 12-continued

| Index | Feature group | Components | Field name in TS 38.331 [2] |
|---|---|---|---|
| | OFDM symbols of a slot | consecutive OFDM symbols in the slot | |

UE Capability 3 (hereinafter, indicated as FG 3-5, 3-5a, or 3-5b). As in Tables 13a and 13b below, the UE capability 3 indicates a pattern of an MO capable of being monitored by the UE, in a case where a plurality of MOs for a common search space or UE-specific search space are present in a slot. The pattern includes an interval X between starting symbols of different MOs, and a maximum symbol length Y for one MO. A combination of (X,Y) supported by the UE may be one or more of {(2, 2), (4, 3), (7, 3)}. The UE capability 3 is optionally supportable by the UE and whether the UE capability 3 is supported and the combination of (X,Y) are explicitly reported to the base station.

TABLE 13a

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {3-5. withoutDCI-Gap 3-5a. withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |

TABLE 13b

| | | |
|---|---|---|
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. |

The UE may report, to the base station, whether the UE capability 2 and/or the UE capability 3 are supported, and related parameters. Based on the reported UE capability 2 and/or 3, the base station may perform time axis resource allocation for the common search space and the UE-specific search space. During the resource allocation, the base station may not locate the MO at a location that is unable to be monitored by the UE.

[PDCCH: Blind Decoding (BD)/CCE Limit]

When a UE is configured with a plurality of search space sets, following conditions may be considered regarding a method of determining a search space set to be monitored by the UE.

When the UE is configured with r15monitoringcapability as a value of monitoringCapabilityConfig-r16 that is higher layer signaling, the UE defines, for each slot, a maximum value of the number of CCEs configuring the number of PDCCH candidates and an entire search space (here, the entire search space denotes entire CCE groups corresponding to a union region of a plurality of search space sets) capable of being monitored, and when the value of monitoringCapabilityConfig-r16 is configured as r16monitoringcapability, the UE defines, for each span, a maximum value of the number of CCEs configuring the number of PDCCH candidates and the entire search space (here, the entire search space denotes the entire CCE group corresponding to the union region of the plurality of search space sets) capable of being monitored. Configuration information of Tables 14a and 14b may be referred to for monitoringCapabilityConfig-r16.

TABLE 14a

```
PDCCH-Config information element
-- ASN1START
-- TAG-PDCCH-CONFIG-START
PDCCH-Config ::=                              SEQUENCE {
    controlResourceSetToAddModList                SEQUENCE(SIZE (1..3)) OF ControlResourceSet
OPTIONAL, -- Need N
    controlResourceSetToReleaseList               SEQUENCE(SIZE (1..3)) OF ControlResourceSetId
OPTIONAL, -- Need N
    searchSpacesToAddModList                      SEQUENCE(SIZE (1..10)) OF SearchSpace
OPTIONAL, -- Need N
    searchSpacesToReleaseList                     SEQUENCE(SIZE (1..10)) OF SearchSpaceId
OPTIONAL, -- Need N
    downlinkPreemption                            SetupRelease { DownlinkPreemption }
OPTIONAL, -- Need M
    tpc-PUSCH                                     SetupRelease { PUSCH-TPC-CommanConfig }
OPTIONAL, -- Need M
    tpc-PUCCH                                     SetupRelease { PUCCH-TPC-CommandConfig }
OPTIONAL, -- Need M
    tpc-SRS                                       SetupRelease { SRS-TPC-CommandConfig}
OPTIONAL, -- Need M
    ...,
    [[
    controlResourceSetToAddModList2-r16           SEQUENCE (SIZE (1..2)) OF ControlResourceSet
OPTIONAL, -- Need N
    controlResourceSetToReleaseList-r16 SEQUENCE (SIZE (1..5)) OF ControlResourceSetId-r16
OPTIONAL, -- Need N
    searchSpacesToAddModListExt-r16               SEQUENCE(Size (1..10)) OF SearchSpaceExt-r16
OPTIONAL, -- Need N
    uplinkCancellation-r16                        SetupRelease { UplinkCancellation-r16 }
OPTIONAL, -- Need M
    monitoringCapabilityConfig-r16                              ENUMERATED
{ r15monitoringcapability,r16monitoringcapability }    OPTIONAL, -- Need M
    searchSpaceSwitchConfig-r16                             SearchSpaceSwitchConfig-r16
OPTIONAL, -- Need R
    ]]
}
SearchSpaceSwitchConfig-r16 ::=    SEQUENCE {
    cellGroupsForSwitchList-r16                   SEQUENCE(SIZE (1..4)) OF CellGroupForSwitch-r16
OPTIONAL, -- Need R
    searchSPaceSwitchDelay-r16                              INTEGER (10..52)
OPTIONAL -- Need R
}
CellGroupForSwitch-r16 ::=                    SEQUENCE(SIZE (1..16)) OF ServCellIndex
-- TAG-PDCCH-CONFIG-STOP
-- ASN1STOP
```

40

TABLE 14b

PDCCH-Config field descriptions controlResourceSetToAddModList, controlResourceSetToAddModListSizeExt
List of UE specifically configured Control Resource Sets (CORESETs) to be used by the UE. The network configures at most 3 CORESETs per BWP per cell (including UE-specific and common CORESETs). The UE shall consider entries in controlResourceSetToAddModList and in controlResourceSetToAddModList2 as a single list, i.e. an entry created using controlResourceSetToAddModList can be modified using controlResourceSetToAddModList2 and vice-versa. In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon.
controlResourceSetToReleaseList, controlResourceSetToReleaseListSizeExt
List of UE specifically configured Control Resource Sets (CORESETs) to be released by the UE. This field only applies to CORESETs configured by controlResourceSetToAddModList and does not release the field commonControlResourceSet configured by PDCCH-ConfigCommon.
downlinkPreemption
Configuration of downlink preemption indications to be monitored in this cell (see TS 38.213 [13], clause 11.2).
monitoringCapabilityConfig
Configures either Rel-15 PDCCH monitoring capability or Rel-16 PDCCH monitoring capability for PDCCH monitoring on a serving cell. Value r15monltoringcapablity enables the Rel-15 monitoring capability, and value r16monitoringcapablity enables the Rel-16 PDCCH monitoring capability (see TS 38.213 [13], clause 10.1).
searchSpacesToAddModList, searchSpacesToAddModListExt
List of UE specifically configured Search Spaces. The network configures at most 10 Search Spaces per BWP per cell (including UE-specific and common Search Spaces). If the network includes searchSpaceToAddModListExt, it includes the same number of entries, and listed in the same order, as in searchSpacesToAddModList.

TABLE 14b-continued

PDCCH-Config field descriptions tpc-PUCCH
Enable and configure reception of group TPC commands for PUCCH.
tpc-PUSCH
Enable and configure reception of group TPC commands for PUSCH.
tpc-SRS
Enable and configure reception of group TPC commands forSRS.
uplinkcancellation
Configuration of uplink cancellation indications to be monitored in this cell (see TS 38.213 [131, clause 11.2A).

[Condition 1: Limitation on Maximum Number of PDCCH Candidates]

According to a configuration value of higher layer signaling, the maximum number AP of PDCCH candidates capable of being monitored by a UE may follow Table 15a when defined based on a slot in a cell configured to have a subcarrier spacing $15 \cdot 2^\mu$ kHz, and follow Table 15b when defined based on a span.

TABLE 15a

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 15b

Maximum number $M^\mu$ of monitored PDCCH candidates per span for combination (X, Y) and per serving cell

| $\mu$ | (2, 2) | (4, 3) | (7, 3) |
|---|---|---|---|
| 0 | 14 | 28 | 44 |
| 1 | 12 | 24 | 36 |

[Condition 2: Limitation on Maximum Number of CCEs]

According to the configuration value of the higher layer signaling, the maximum number $C^\mu$ of CCEs configuring an entire search space (here, the entire search space denotes all CCE groups corresponding to a union region of a plurality of search space sets) may follow Table 16a below when defined based on a slot in a cell configured to have a subcarrier spacing $15 \cdot 2^\mu$ kHz, and follow Table 16b when defined based on a span.

TABLE 16a

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 16b

Maximum number $C^\mu$ of non-overlapped CCEs per span for combination (X, Y) and per serving cell

| $\mu$ | (2, 2) | (4, 3) | (7, 3) |
|---|---|---|---|
| 0 | 18 | 36 | 56 |
| 1 | 18 | 36 | 56 |

For convenience of description, Condition A is defined as a situation satisfying both Conditions 1 and 2 at a specific time point. Therefore, non-satisfaction of Condition A may imply non-satisfaction of at least one of Condition 1 or Condition 2.

[PDCCH: Overbooking]

A case where Condition A is not satisfied at a specific time point may occur according to a configuration of search space sets of a base station. When Condition A is not satisfied at the specific time point, a UE may select and monitor only some of search space sets configured to satisfy Condition A at the time point, and the base station may transmit a PDCCH through the selected search space sets.

A method of selecting some search spaces from among all configured search space sets may follow a method below.

When Condition A for the PDCCH is not satisfied at the specific time point (slot), the UE (or base station) may first select, from among search space sets present at the time point, a search space set in which a search space type is configured to be a common search space, before a search space set configured as a UE-specific search space.

When all search space sets configured as a common search space are selected (i.e., when Condition A is satisfied even after all search spaces configured as a common search space are selected), the UE (or the base station) may select search space sets configured as a UE-specific search space. Here, when there are a plurality of search space sets configured as a UE-specific search space, the smaller an index of a search space set, the higher a priority of the search space set. The UE may select UE-specific search space sets within a range that Condition A is satisfied, in consideration of priorities.

[QCL, TCI State]

In a wireless communication system, one or more different antenna ports (may be replaced by one or more channels, signals, or combinations thereof, but for convenience of description, are integrally referred to as the different antenna ports) may be associated with each other through a QCL configuration as Table 17 below. A TCI state is for notifying/indicating a QCL relationship between a PDCCH (or PDCCH DMRS) and another RS or channel. When a reference antenna port A (reference RS #A) and another target antenna port B (target RS #B) are QCLed to each other, a UE is allowed to apply all or some of large-scale channel parameters estimated in the reference antenna port A to perform a channel measurement in the other target antenna port B. A QCL may require different parameters to be associated according to situations including 1) time tracking affected by average delay and delay spread, 2) frequency tracking affected by a Doppler shift and Doppler spread, 3) radio resource management (RRM) affected by an average gain, and 4) beam management (BM) affected by a spatial parameter. Accordingly, NR supports four types of QCL relationships shown in Table 17 below.

TABLE 17

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

A spatial RX parameter may be a generic term for some or all of various parameters including an angle of arrival (AoA), a power angular spectrum (PAS) of AoA, an angle of departure (AoD), a PAS of AoD, a transmit/receive channel correlation, transmit/receive beamforming, and a spatial channel correlation.

The QCL relationship may be configured to a UE through an RRC parameter TCI-State and QCL-Info as shown in Table 18 below. Referring to Table 18, a base station may configure the UE with at least one TCI state to notify the UE of a maximum of two QCL relationships (qcl-Type1 and qcl-Type2) regarding an RS referring to ID of the TCI state, that is, a target RS. Each of pieces of QCL information (QCL-Info) included in the TCI state includes a serving cell index and a BWP index of a reference RS indicated by a corresponding piece of QCL information, a type and ID of the reference RS, and a QCL type as shown in Table 17 above.

Figure 7:
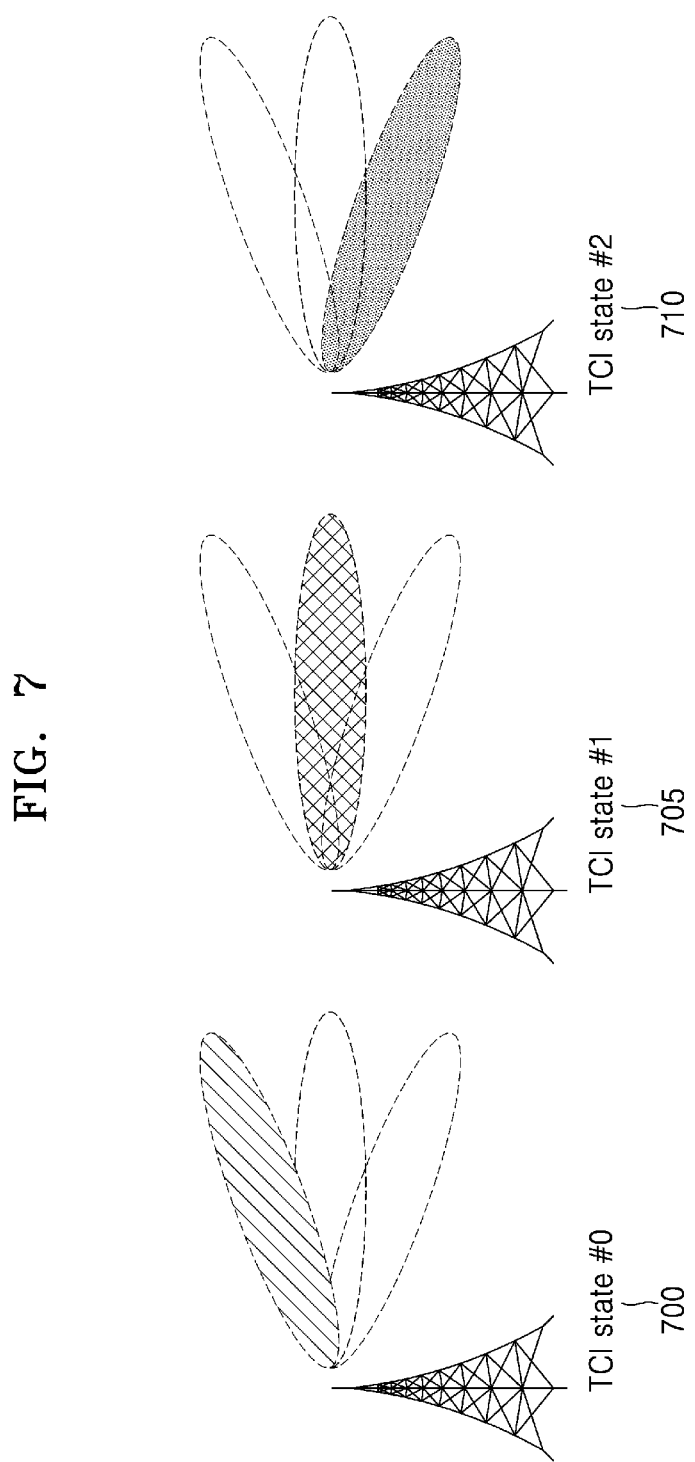
FIG. 7 illustrates a diagram of an example of beam allocation by a base station according to a transmission configuration indication (TCI) state configuration in a wireless communication system according to an embodiment of the disclosure.

FIG. 7 illustrates a diagram showing an example of base station beam allocation according to a TCI state configuration. Referring to FIG. 7, a base station may transmit, to a UE, pieces of information regarding N different beams through N different TCI states. For example, as illustrated in FIG. 7, when N is 3, the base station may allow a qcl-Type 2 parameter included in each of three TCI states 700, 705, and 710 to be associated with a CSI-RS or SSB corresponding to different beams and to be configured to be of QCL type D, so as to notify/indicate that antenna ports referring to the different TCI states 700, 705, and 710 are associated with different spatial Rx parameters, that is, different beams.

Tables 19a through 19e indicate valid TCI state configurations according to target antenna port types.

Table 19a indicates valid TCI state configurations when a target antenna port is CSI-RS for tracking (TRS). The TRS denotes, from among CSI-RSs, a non-zero-power (NZP) CSI-RS in which a repetition parameter is not configured and trs-Info is configured to be true in configuration information shown in Tables 20a and 20b. A configuration 3 in Table 19a may be used for aperiodic TRS.

TABLE 19a

Valid TCI state configuration when target antenna port is TRS.

| Valid TCI state Configuration | DL RS 1 | qcl-Type 1 | DL RS 2 (if configured) | qcl-Type2 (if configured) |
| --- | --- | --- | --- | --- |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 19b indicates valid TCI state configurations when a target antenna port is CSI-RS for CSI. The CSI-RS for CSI denotes, from among CSI-RSs, an NZP CSI-RS in which a

TABLE 18

```
TCI-State::=              SEQUENCE {
   tci-StateId            TCI-StateId,
   (ID of TCI State)
   qcl-Type1              QCL-Info,
   (QCL Information of First Reference RS of RS (Target RS) referring to TCI State ID)
   qcl-Type2              QCL-Info
                          OPTIONAL, -- Need R
   (QCL Information of Second Refererences RS of RS (Target RS) referring to TCI state
ID)
   ...
}
QCL-Info ::=             SEQUENCE {
   cell                   ServCellIndex
                          OPTIONAL, -- Need R
   (Serving Cell Index of References RS indictaed by QCL Information)
   bwp-Id                 BWP-Id
                          OPTIONAL, -- Cond-RS-Indictated
   (BWP Index of References RS indicated by QCL Information)
   referenceSignal        CHOICE {
      csi-rs              NZP-CSI
RS-ResourceId,
      ssb
SSB-Index
      (One of CSI-RS ID or SSB ID indicated by QCL Information)
   },
   qcl-Type               ENUMERATED
{typeA, typeB, typeC, typeD},
   ...
}
``` parameter indicating repetition (for example, a repetition parameter) is not configured and trs-Info is also not configured to be true.

TABLE 19b

Valid TCI state configuration when target antenna port is CSI-RS for CSI

| Valid TCI state Configuration | DL RS1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 19c indicates valid TCI state configurations when a target antenna port is CSI-RS for BM (has same meaning as CSI-RS for L1 reference signal received power (RSRP) reporting). The CSI-RS for BM denotes, from among CSI-RSs, an NZP CSI-RS in which a repetition parameter is configured to have a value of on or off, and trs-Info is not configured to be true.

TABLE 19c

Valid TCI state configuration when a target antenna port is CSI-RS for BM (for L1 RSRP reporting).

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS(BM) | QCL-TypeD |
| 3 | SS/PBCH Block | QCL-TypeC | SS/PBCH Block | QCL-TypeD |

Table 19d indicates valid TCI state configurations when a target antenna port is PDCCH DMRS.

TABLE 19d

Valid TCI state configuration when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 19e indicates valid TCI state configurations when a target antenna port is PDSCH DMRS.

TABLE 19e

Valid TCI state configuration when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method by Tables 19a through 19e includes managing a target antenna port and reference antenna port for each stage by configuring "SSB"→"TRS"→"CSI-RS for CSI, CSI-RS for BM, PDCCH DMRS, or PDSCH DMRS." Accordingly, it is possible to aid a reception operation of a UE by associating statistical characteristics measurable from an SSB and TRS with each antenna port.

Tables 20a and 20b may be referred to for the configuration information of trs-Info related to the NZP CSI-RS.

TABLE 20a

NZP-CSI-RS-ResourceSet information element

```
-- ASN1START
-- TAG-NXP-CSI-RS-RESOURCESET-START
NZP-CSI-RS-ResourceSet ::=        SEQUENCE {
  nzp-CSI-ResourceSetId            NZP-CSI-RS-ResourcesSetId,
  nzp-CSI-RS-Resource              SEQUENCE (SIZE (1..maxNrofNZP-CSI-RS-
ResourcesPerSet)) OF NZP-CSI-S-ResourceId,
  repetition                       ENUMERATED { on, off }
OPTIONAL, -- Need S
  aperiodicTriggeringOffset        INTEGER {true}
OPTIONAL, -- Need S
  trs-Info                         ENUMERATED {true}
OPTIONAL, -- Need R
  ...,
  [[
  aperiodicTriggeringOffset-r16    INTEGER(0..31)
OPTIONAL --Need S
  ]]
}
-- TAG-NZP-SCI-RS-RESOURCESET-STOP
-- ASN1STOP
```

TABLE 20b

NZP-CSI-RS-ResourceSet field descriptions aperiodicTriggeringOffset, aperiodicTriggeringOffset-r16
Offset X between the slot containing the DCI that triggers a set of aperiodic
NZP CSI-RS resources and the slot in which the CSI-RS resource set is transmitted.
For aperiodicTriggeringOffset, the value 0 corresponds to 0 slots,
value 1 corresponds to 1 slot, value 2 corresponds to 2 slots, value 3 corresponds to 3 slots, value 4 corresponds
to 4 slots, value 5 corresponds to 16 slots, value 6 corresponds to 24 slots. For aperiodicTriggeringOffset-r16, the
value indicates the number of slots. The network configures only one of the fields. When neither field is included,
the UE applies the value 0.
nzp-CSI-RS-Resources
NZP-CSI-RS-Resources associated with this NZP-CSI-RS resource set (see TS 38.214 [19], clause 5.2). For CSI,
there are at most 8 NZP CSI RS resources per resource set.
repetition
Indicates whether repetition is on/off. If the field is set to off or if the field is absent, the UE may not assume that
the NZP-CSI-RS resources within the resource set are transmitted with the same downlink spatial domain
transmission filter (see TS 38.214 [19], clauses 5.2.2.3.1 and 5.1.6.1.2). It can only be configured for CSI-RS
resource sets which are associated with CSI-ReportConfig with report of L1 RSRP, L1 SINR or "no report".
trs-Info
Indicates that the antenna port for all NZP-CSI-RS resources in the CSI-RS resource set is same. If the field is
absent or released the UE applies the value false (see TS 38.214 [19], clause 5.2.2.3.1).

[PDCCH: Regarding TCI State]

In detail, a combination of TCI states applicable to a PDCCH DMRS antenna port is as Table 21 below. A fourth row in Table 21 is a combination assumed by a UE before an RRC configuration, and a configuration after the RRC configuration is not possible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
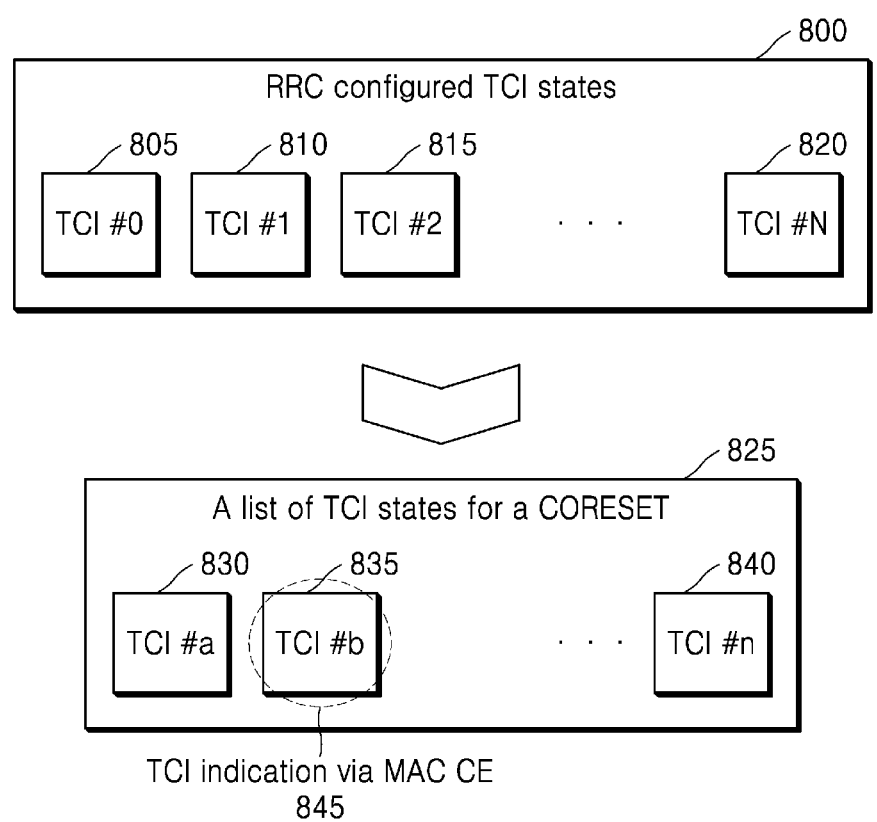
FIG. 8 illustrates a diagram of an example of a TCI state allocation method regarding a PDCCH in a wireless communication system according to an embodiment of the disclosure.

In NR, a hierarchical signaling method as shown in FIG. 8 is supported for dynamic allocation regarding PDCCH beams.

FIG. 8 illustrates a diagram of an example of a TCI state allocation method regarding a PDCCH in a wireless communication system according to an embodiment of the disclosure.

Referring to FIG. 8, a base station may configure a UE with N TCI states 805 through 820 through RRC signaling 800, and may configure some of the TCI states 805 through 820 as TCI states 825 for a CORESET. Then, the base station may indicate one of TCI states 830 through 840 for the CORESET to the UE through MAC control element (CE) signaling as indicated by a reference numeral 845. Then, the UE receives a PDCCH, based on beam information included in a TCI state indicated by the MAC CE signaling.

Figure 9:
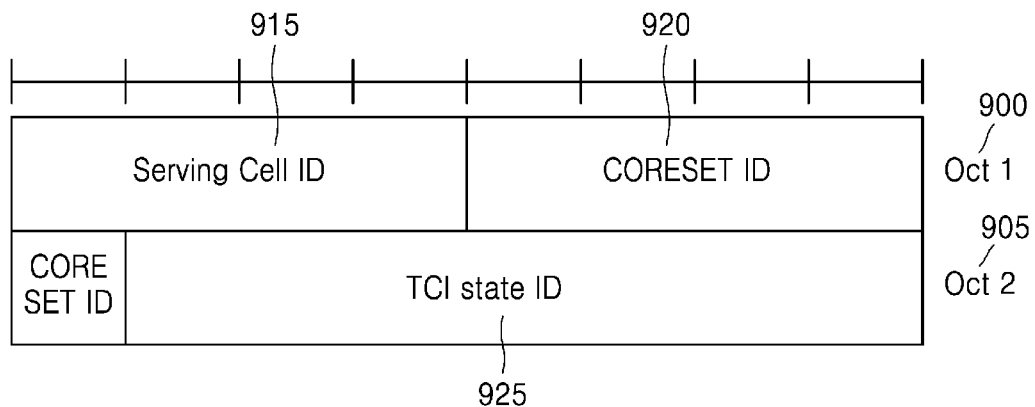
FIG. 9 illustrates a diagram of a TCI indication media access control (MAC) control element (CE) signaling structure for a PDCCH demodulation reference signal (DMRS) in a wireless communication system according to an embodiment of the disclosure.

FIG. 9 illustrates a diagram of a TCI indication MAC CE signaling structure for a PDCCH DMRS in a wireless communication system according to an embodiment of the disclosure.

Referring to FIG. 9, TCI indication MAC CE signaling for the PDCCH DMRS includes, for example, 2 bytes (16 bits) Oct1 900 and Oct2 905, and includes a serving cell ID 915 of 5 bits, a CORESET ID 920 of 4 bits, and a TCI state ID 925 of 7 bits.

Figure 10:
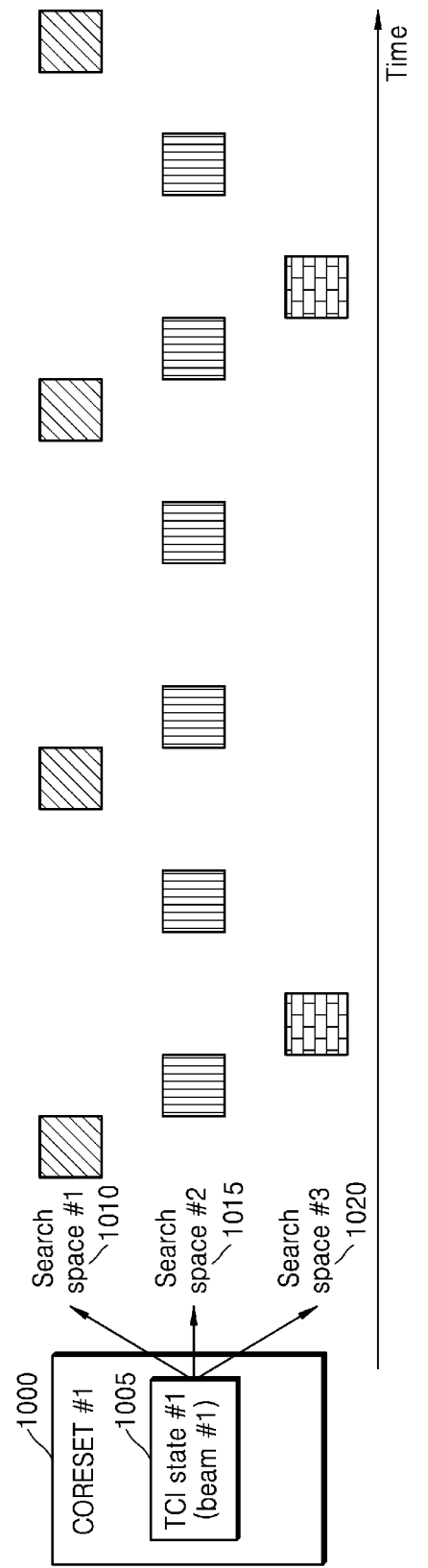
FIG. 10 illustrates a diagram of an example of a beam configuration for a CORESET and a search space in a wireless communication system according to an embodiment of the disclosure.

FIG. 10 illustrates a diagram of an example of a beam configuration for a CORESET and a search space in a wireless communication system according to an embodiment of the disclosure.

Referring to FIG. 10, a base station may indicate, to a UE, one TCI state #1 1005 in a TCI state list included in a configuration of a CORESET #1 1000 through MAC CE signaling. Then, until another TCI state is indicated to the CORESET #1 1000 through another MAC CE signaling, the UE assumes that same QCL information (TCI state #1 1005, beam #1) is applied to, for example, one or more search spaces #1, #2, and #3 1010, 1015, and 1020 connected to the CORESET #1 1000. According to the PDCCH beam allocation method described above, it is difficult to indicate a beam change quicker than an MAC CE signaling delay, and in addition, a flexible PDCCH beam management may be difficult because a same beam is collectively applied to all CORESETs regardless of characteristics of a search space.

Hereinafter, embodiments of the disclosure provide a more flexible PDCCH beam configuration and management method. In describing embodiments of the disclosure below, some distinguishable examples are provided for convenience of description, but the examples are not mutually exclusive, and two or more examples may be appropriately combined according to a situation for application.

A base station may configure a UE with one or a plurality of TCI states with respect to a specific CORESET, and may activate one of the configured TCI states through an MAC CE activation command. For example, {TCI state #0, TCI state #1, TCI state #2} is configured to CORESET #1 as TCI states, and the base station may transmit, to the UE, a command for activating the TCI state #0 as a TCI state for the CORESET #1 through an MAC CE. Based on the activation command regarding the TCI state, received through the MAC CE, the UE may correctly receive a DMRS of the CORESET #1, based on QCL information in the activated TCI state.

With respect to a CORESET (CORESET #0) configured to have an index of 0, when the UE has failed to receive an MAC CE activation command regarding a TCI state of the CORESET #0, it may be assumed that the UE is QCLed (QCL assumption) with an SS/PBCH block (SSB) identified during an initial access process or a non-contention-based random access process that is not triggered by a PDCCH command, with respect to a DMRS transmitted in the CORESET #0.

With respect to a CORESET (CORESET #X) configured to have an index of a value other than zero, when the UE has failed to receive a configuration of a TCI state regarding the CORESET #X, or when the UE is configured with one or more TCI states but has failed to receive an MAC CE activation command for activating one of the TCI states, it may be assumed that the UE is QCLed with an SS/PBCH block identified in an initial access process, with respect to a DMRS transmitted in the CORESET #X.

[PDCCH: Regarding QCL Prioritization Rule]

Hereinafter, a QCL prioritization operation for a PDCCH will be described in detail.

When a plurality of CORESETs operating in carrier aggregation within a cell or band and present within an activated BWP in a single or plurality of cells are the same in a specific PDCCH monitoring occasion or overlap in time while having same or different QCL-TypeD characteristics, a UE may select a specific CORESET according to the QCL prioritization operation and monitor CORESETs having the same QCL-TypeD characteristics as the specific CORESET. In other words, when the plurality of CORESETs overlap in time, the UE may receive only one QCL-TypeD characteristic. Here, a criterion for determining a QCL priority may be as follows:

Criterion 1. A CORESET connected to a common search space having a lowest index, within a cell corresponding to a lowest index from among cells including the common search space; and Criterion 2. A CORESET connected to a UE-specific search space having a lowest index, within a cell corresponding to a lowest index from among cells including the UE-specific search space.

As described above, a following criterion may be applied when one criterion is not satisfied. For example, in a case where the CORESETs overlap in time in the specific PDCCH monitoring occasion, when all CORESETs are not connected to the common search space but are connected to the UE-specific search space, i.e., when Criterion 1 is not satisfied, the UE may omit Criterion 1 and apply Criterion 2.

When selecting a CORESET according to Criteria 1 and 2, the UE may additionally consider two matters below for QCL information configured in the CORESET. First, when CORESET 1 contains CSI-RS 1 as a reference signal having a relationship of QCL-TypeD, the reference signal having the relationship of QCL-TypeD with CSI-RS 1 is SSB 1, and a reference signal having the relationship of QCL-TypeD with another CORESET 2 is SSB 1, the UE may consider that the CORESET 1 and CORESET 2 have different QCL-TypeD characteristics. Second, when CORESET 1 contains CSI-RS 1 configured in a cell 1, as a reference signal having a relationship of QCL-TypeD, the reference signal having the relationship of QCL-TypeD with CSI-RS 1 is SSB 1, CORESET 2 contains CSI-RS 2 configured in a cell 2, as a reference signal having a relationship of QCL-TypeD, and the reference signal having the relationship of QCL-TypeD with CSI-RS 2 is also SSB 1, the UE may consider that the CORESET 1 and CORESET 2 have same QCL-TypeD characteristics.

Figure 11:
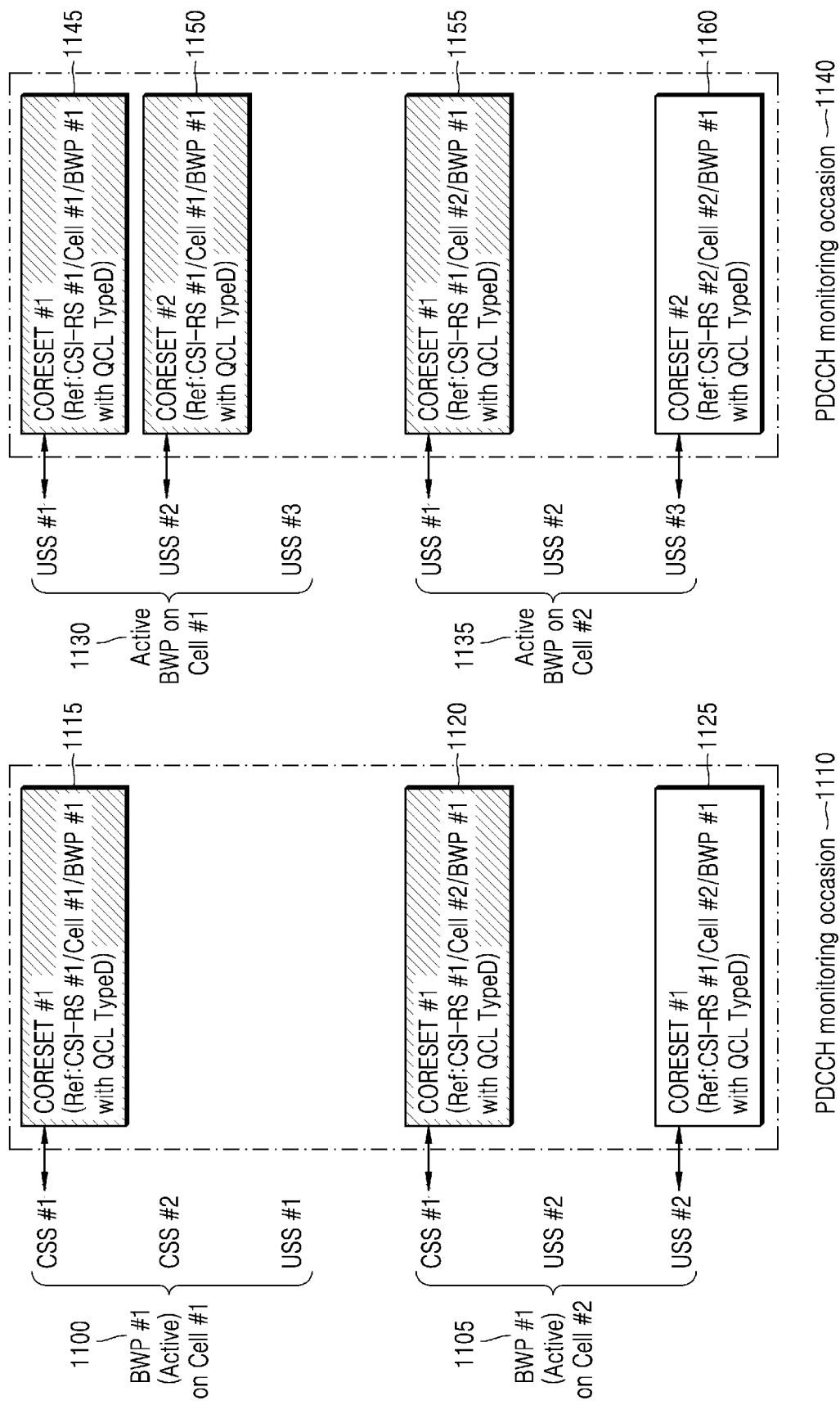
FIG. 11 illustrates a diagram for describing a method of selecting a receivable CORESET, considering a priority when a UE receives a downlink control channel in a wireless communication system according to an embodiment of the disclosure.

FIG. 11 illustrates a diagram for describing a method of selecting a receivable CORESET, considering a priority when a UE receives a downlink control channel, in a wireless communication system according to an embodiment of the disclosure.

For example, a UE may be configured with reception for a plurality of CORESETs overlapping in time in a specific PDCCH monitoring occasion 1110, and the plurality of CORESETs may be connected to a common search space or UE-specific search space for a plurality of cells. In the PDCCH monitoring occasion 1110, a CORESET #1 1115 connected to a common search space #1 may be present in a BWP #1 1100 of a cell #1, and a CORESET #1 1120 connected to a common search space #1 and a CORESET #2 1125 connected to a UE-specific search space #2 may be present in a BWP #1 1105 of a cell #2. The CORESET #1 1115 and CORESET #1 1120 may have a relationship of QCL-TypeD with a CSI-RS resource #1 configured in the BWP #1 1100 of the cell #1, and the CORESET #2 1125 may have a relationship of QCL-TypeD with a CSI-RS resource #1 configured in the BWP #1 1105 of the cell #2.

Accordingly, when Criterion 1 is applied to the PDCCH monitoring occasion 1110, the UE may be able to receive all other CORESETs having a reference signal of same QCL-TypeD as the CORESET #1 1115. Thus, the UE may receive the CORESET #1 1115 and CORESET #1 1120 in the PDCCH monitoring occasion 1110. As another example, the UE may be configured with reception for a plurality of CORESETs overlapping in time in a specific PDCCH monitoring occasion 1140, and the plurality of CORESETs may be connected to a common search space or UE-specific search space for a plurality of cells. In the PDCCH monitoring occasion 1140, a CORESET #1 1145 connected to a UE-specific search space #1 and a CORESET #2 1150 connected to a UE-specific search space #2 may be present in a BWP #1 1130 of a cell #1, and a CORESET #1 1155 connected to a UE-specific search space #1 and a CORESET #2 1160 connected to a UE-specific search space #3 may be present in a BWP #1 1135 of a cell #2. The CORESET #1 1145 and CORESET #2 1150 may have a relationship of QCL-TypeD with CSI-RS resource #1 configured in the BWP #1 1130 of the cell #1, the CORESET #1 1155 may have a relationship of QCL-TypeD with CSI-RS resource #1 configured in the BWP #1 1135 of the cell #2, and the CORESET #2 1160 may have a relationship of QCL-TypeD with CSI-RS resource #2 configured in the BWP #1 1135 of the cell #2.

However, because there is no common search space when Criterion 1 is applied to the PDCCH monitoring occasion 1140, the UE may apply Criterion 2 that is a next criterion. When Criterion 2 is applied to the PDCCH monitoring occasion 1140, the UE may be able to receive all other CORESETs having a reference signal of same QCL-TypeD as the CORESET #1 1145. Accordingly, the UE may receive the CORESET #1 1145 and CORESET #2 1150 in the PDCCH monitoring occasion 1140.

Figure 12:
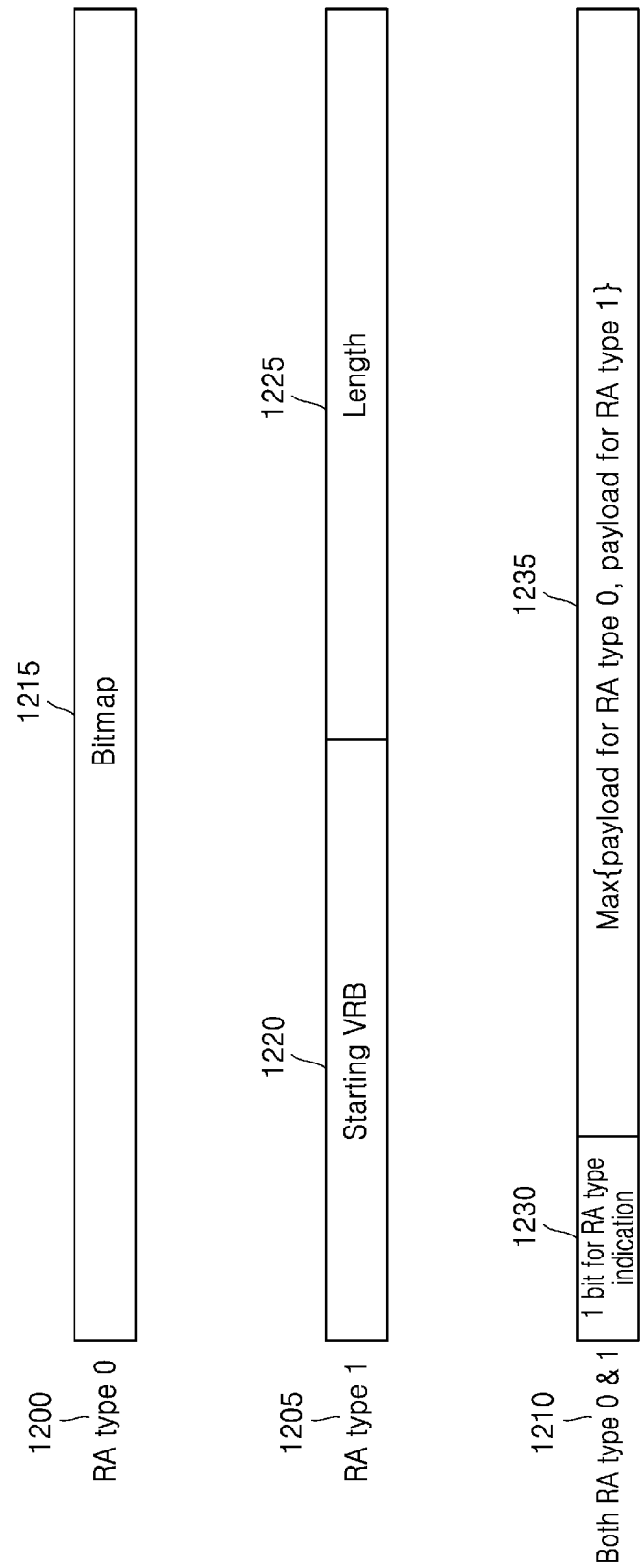
FIG. 12 illustrates a diagram showing an example of a frequency axis resource allocation for a physical downlink shared channel (PDSCH) in a wireless communication system according to an embodiment of the disclosure.

FIG. 12 illustrates a diagram showing an example of a frequency axis resource allocation for a PDSCH in a wireless communication system according to an embodiment of the disclosure.

Referring to FIG. 12, three frequency axis resource allocation methods, i.e., a resource allocation (RA) type 0 1200, an RA type 1 1205, and an RA dynamic switch 1210 (RA type 0 and RA type 1), which are configurable through higher layer signaling, are illustrated. When a UE is configured to use only the RA type 0 1200 through higher layer signaling, a part of DCI allocating a PDSCH to the UE may include a bitmap 1215 consisting of $N_{RBG}$ bits. Here, $N_{RBG}$ denotes the number of resource block groups (RBGs) determined as Table 22 below according to a BWP size allocated by a BWP indicator and a higher layer parameter rbg-Size, and data is transmitted to an RBG indicated by 1 by the bitmap 1215.

TABLE 22

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the UE is configured to use only the RA type 1 1205 through higher layer signaling, the part of DCI allocating the PDSCH to the UE may include frequency axis resource allocation information consisting of $\lceil \log_2(N_{RB}^{DL,BWP}(N_{RB}^{DL,BWP}+1)/2 \rceil$ bits. $N_{RB}^{DL,BWP}$ is the number of RBs of a downlink BWP. Accordingly, a base station may configure a starting virtual resource block (VRB) 1220 and a length 1225 of frequency axis resources allocated continuously therefrom.

When the UE is configured to use both an RA type 0 and an RA type 1 through higher layer signaling, i.e., configured with the RA dynamic switch 1210, the part of DCI allocating the PDSCH to the UE may include frequency axis resource allocation information consisting of bits of a greater value 1235 from among a payload for configuring the RA type 0 and a payload for configuring the RA type 1. Here, the use of RA type 0 or RA type 1 may be indicated through one bit 1230 added to the most significant bit (MSB) of the frequency axis resource allocation information in the DCI. For example, when a value of the bit 1230 is 0, the RA type 0 may be used, and when the value thereof is 1, the RA type 1 may be used.

[PDSCH/PUSCH: Regarding Time Resource Allocation]

Hereinafter, a time domain resource allocation method regarding a data channel in a next-generation wireless communication system (5G or NR system) will be described.

A base station may configure a UE with Table regarding time domain resource allocation information for a PDSCH and a PUSCH, through higher layer signaling (for example, RRC signaling). For the PDSCH, Table consisting of up to maxNrofDL-Allocations=16 entries may be configured, and for the PUSCH, Table consisting of up to maxNrofUL-Allocations=16 entries may be configured. According to an embodiment of the disclosure, the time domain resource allocation information may include a PDCCH-to-PDSCH slot timing (corresponds to a time interval in a slot unit between a time point when the PDCCH is received and a time point when the PDSCH scheduled by the received PDCCH is transmitted, indicated by K0), a PDCCH-to-PUSCH slot timing (corresponds to a time interval in a slot unit between a time point when the PDCCH is received and a time point when the PUSCH scheduled by the received PDCCH is transmitted, indicated by K2), information about a location and length of a starting symbol where the PDSCH or PUSCH is scheduled within a slot, and a mapping type of the PDSCH or PUSCH. For example, information such as Table 23 or 24 below may be transmitted from the base station to the UE.

TABLE 23

| PDSCH-TimeDominResourceAllocationList information element |
| --- |
| PDSCH-TimeDomainResourceAllocationList ::= SEQUENCE (SIZE(1..maxNrofDL-Allocation)) OF PDSCH-TimeDomainResourceAllocation<br>PDSCH-TimeDomainResourceAllocation ::= SEQUENCE {<br>  k0                                      INTEGER(0..32) OPTIONAL, -- Need S<br>    (PDCCH-to-PDSCH Timing. Slot Unit)<br>  mappingType                    ENUMERATED (typeA, typeB),<br>    (PDSCH Mapping Type)<br>  startSymbolAndLength           INTEGER (0..127)<br>    (Starting Symbol and Length of PDSCH)<br>} |

TABLE 24

| PUSCH-TimeDominResourceAllocation information element |
| --- |
| PUSCH-TimeDomainResourceAllocationList ::=<br>SEQUENCE (SIZE(1..maxNrofUL-Allocations)) of<br>PUSCH-TimeDomainResourceAllocation<br>PUSCH-TimeDomaininResourceAllocation ::= SEQUENCE {<br>  k2                                      INTEGER (0..32) OPTIONAL, -- Need S<br>    (PDCCH-to-PUSCH Timing. Slot Unit)<br>  mappingType                    ENUMERATED (typeA, typeB),<br>    (PUSCH Mapping Type)<br>  startSymbolAndLength           INTEGER (0..127)<br>    (Starting Symbol and Length of PUSCH)<br>} |

The base station may notify the UE about one of entries in Table of the time domain resource allocation information, through L1 signaling (for example, DCI) (for example, indicated through a "time domain resource allocation" field within DCI). The UE may obtain the time domain resource allocation information regarding the PDSCH or PUSCH, based on the DCI received from the base station.

Figure 13:
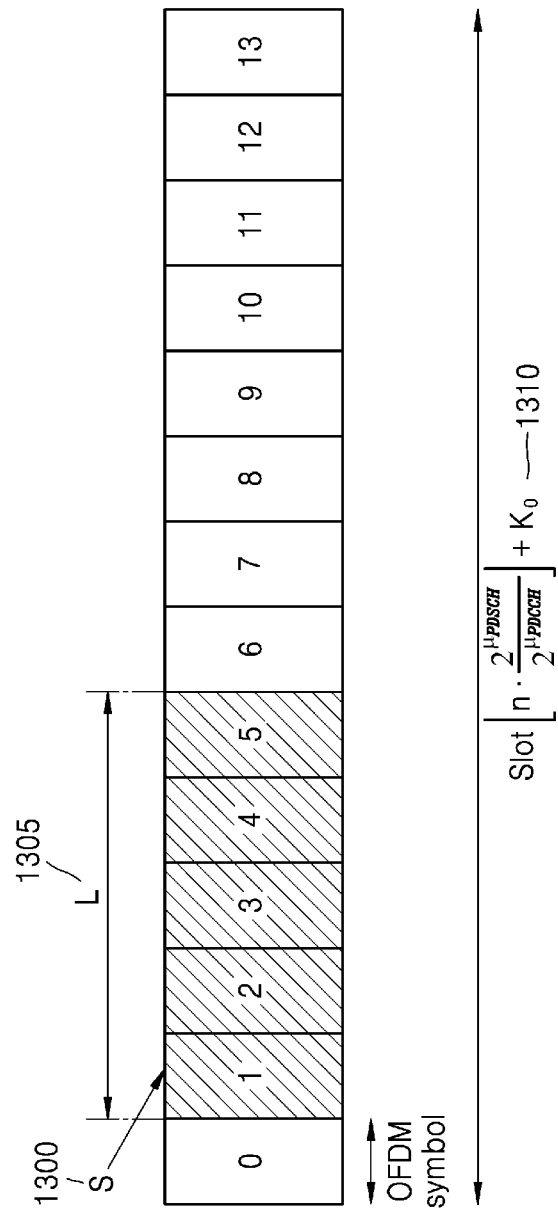
FIG. 13 illustrates a diagram showing an example of a time axis resource allocation for a PDSCH in a wireless communication system according to an embodiment of the disclosure.

FIG. 13 illustrates a diagram showing an example of a time axis resource allocation for a PDSCH in a wireless communication system according to an embodiment of the disclosure.

Referring to FIG. 13, a base station may indicate a time axis location of a PDSCH resource, according to subcarrier spacings (SCSs) ($\mu_{PDSCH}$ and $\mu_{PDCCH}$) of a data channel and control channel configured by using higher layer signaling, a value of a scheduling offset K0 and an OFDM symbol starting location S 1300 and length L 1305 in one slot 1310 dynamically indicated through DCI.

Figure 14:
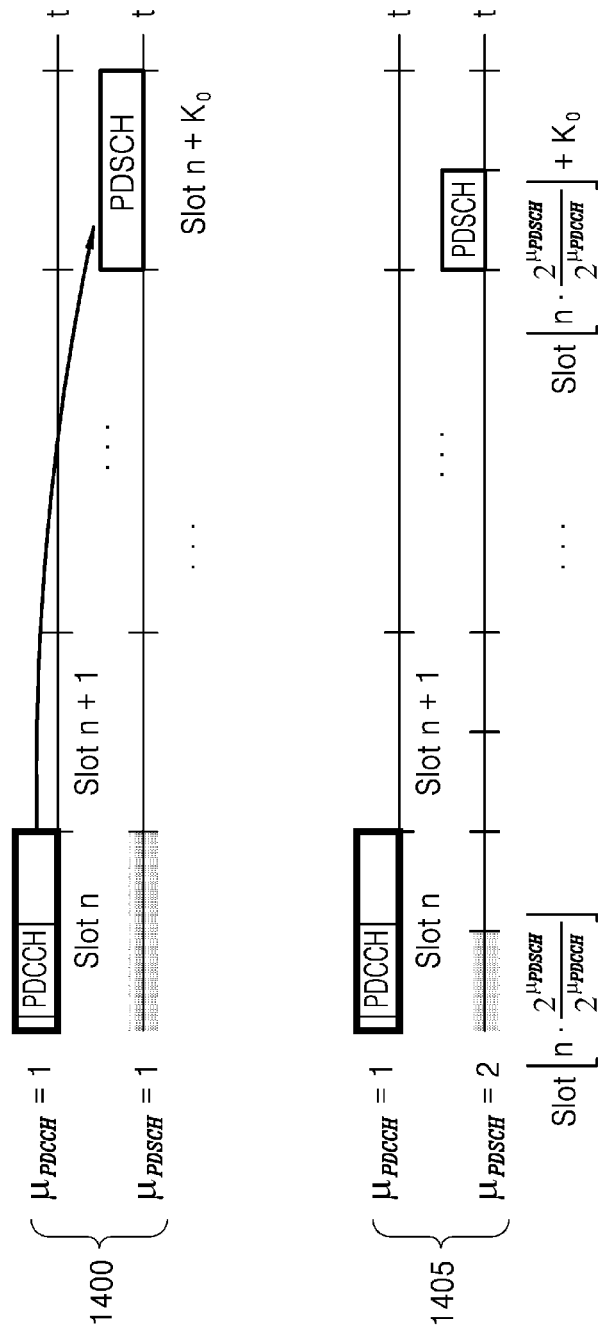
FIG. 14 illustrates a diagram of an example of a time axis resource allocation according to subcarrier spacings of a data channel and control channel in a wireless communication system according to an embodiment of the disclosure.

FIG. 14 illustrates a diagram of an example of a time axis resource allocation according to subcarrier spacings of a data channel and control channel in a wireless communication system according to an embodiment of the disclosure.

Referring to FIG. 14, in a case 1400 where the subcarrier spacings (SCSs) ($\mu_{PDSCH}$ and $\mu_{PDCCH}$) of the data channel and control channel are the same ($\mu_{PDSCH}=\mu_{PDCCH}$), slot numbers for data and control are the same, and thus a base station and a UE may generate a scheduling offset according to a pre-determined slot offset K0. On the other hand, in a case 1405 where the subcarrier spacings of the data channel and control channel are different ($\mu_{PDSCH}\neq\mu_{PDCCH}$), the slot numbers for data and control are different, and thus the base station and the UE may generate the scheduling offset according to the pre-determined slot offset K0, based on a subcarrier spacing of a PDCCH. For example, when the UE has received DCI indicating a BWP switch in a slot n, and a slot offset value indicated by the DCI is K0, the UE may receive data from a PDSCH scheduled in a slot n+K0.

[Regarding Sounding Reference Signal (SRS)]

Next, an uplink channel estimation method using SRS transmission of a UE will be described. A base station may configure the UE with at least one SRS configuration for each uplink BWP and at least one SRS resource set for each SRS configuration, so as to transmit configuration information for the SRS transmission. For example, the base station and the UE may exchange higher layer signaling information as below so as to transfer information about the SRS resource set:

srs-ResourceSetId: An SRS resource set index;
srs-ResourceIdList: A group of SRS resource indexes referred to by an SRS resource set;
resourceType: A time axis transmission configuration of an SRS resource referred to by an SRS resource set, and may be configured to be one of periodic, semi-persistent, and aperiodic. When configured to be periodic or semi-persistent, associated CSI-RS information may be provided depending on where the SRS resource set is used. When configured to be aperiodic, an aperiodic SRS resource trigger list and slot offset information may be provided, and the associated CSI-RS information may be provided depending on where the SRS resource set is used;
usage: A configuration regarding where an SRS resource referred to by an SRS resource set is used, and may be configured to be one of beamManagement, codebook, nonCodebook, and antennaSwitching; and
alpha, p0, pathlossReferenceRS, srs-PowerControlAdjustmentStates: Provides a parameter configuration for transmit power control of an SRS resource referred to by an SRS resource set.

The UE may interpret that an SRS resource included in a group of SRS resource indexes referred to by an SRS resource set follows information configured in the SRS resource set.

Also, the base station and the UE may transmit and receive higher layer signaling information to transfer individual configuration information regarding the SRS resource. For example, the individual configuration information regarding the SRS resource may include time-frequency axis mapping information in a slot of the SRS resource, and the time-frequency axis mapping information may include information about frequency hopping within a slot or between slots of the SRS resource. Also, the individual configuration information regarding the SRS resource may include a time axis transmission configuration of the SRS resource, and may be configured to be one of periodic, semi-persistent, and aperiodic. The individual configuration information may be limited to have a same time axis transmission configuration as the SRS resource set including the SRS resource. When the time axis transmission configuration of the SRS resource is configured to be periodic or semi-persistent, an SRS resource transmission period and a slot offset (for example, periodicityAndOffset) may be additionally included in the time axis transmission configuration.

The base station may activate, deactivate, or trigger the SRS transmission in the UE through higher layer signaling including RRS signaling or MAC CE signaling, or through L1 signaling (for example, DCI). For example, the base station may activate or deactivate periodic SRS transmission in the UE through higher layer signaling. The base station may indicate an SRS resource set in which resourceType is configured to be periodic to be activated through higher layer signaling, and the UE may transmit an SRS resource referred to by the activated SRS resource set. Time-frequency axis resource mapping in a slot of the transmitted SRS resource follows resource mapping information configured in the SRS resource, and slot mapping including a transmission period and slot offset follows periodicityAndOffset configured in the SRS resource. Also, a spatial domain transmission filter applied to the transmitted SRS resource may refer to spatial relation information configured in the SRS resource or to associated CSI-RS information configured in the SRS resource set including the SRS resource. The UE may transmit the SRS resource in an uplink BWP activated regarding the periodic SRS resource activated through the higher layer signaling.

For example, the base station may activate or deactivate semi-persistent SRS transmission in the UE through higher layer signaling. The base station may indicate an SRS resource set to be activated through MAC CE signaling, and the UE may transmit an SRS resource referred to by the activated SRS resource set. The SRS resource set activated through the MAC CE signaling may be limited to an SRS resource set in which resourceType is configured to be semi-persistent. Time-frequency axis resource mapping in a slot of the transmitted SRS resource follows resource mapping information configured in the SRS resource, and slot mapping including a transmission period and slot offset follows periodicityAndOffset configured in the SRS resource.

Also, a spatial domain transmission filter applied to the transmitted SRS resource may refer to spatial relation information configured in the SRS resource or to associated CSI-RS information configured in the SRS resource set including the SRS resource. When the spatial relation information is configured in the SRS resource, the spatial domain transmission filter may be determined by referring to configuration information regarding the spatial relation information transmitted through MAC CE signaling for activating semi-persistent SRS transmission, without following the spatial relation information configured in the SRS resource. The UE may transmit the SRS resource in an uplink BWP activated regarding the semi-persistent SRS resource activated through the higher layer signaling.

For example, the base station may trigger aperiodic SRS transmission in the UE through DCI. The base station may indicate one of aperiodic SRS resource triggers (aperiodicSRS-ResourceTrigger) through an SRS request field of the DCI. The UE may interpret that an SRS resource set including an aperiodic SRS resource trigger indicated by the DCI has been triggered from an aperiodic SRS resource trigger list from among configuration information of the SRS resource set. The UE may transmit an SRS resource referred to by the triggered SRS resource set. A time-frequency axis resource mapping in a slot of the transmitted SRS resource may follow resource mapping information configured in the SRS resource.

Also, slot mapping of the transmitted SRS resource may be determined through a slot offset between the SRS resource and a PDCCH including the DCI, and the slot offset may refer to a value (or values) included in a slot offset group configured in the SRS resource set. In detail, the slot offset between the SRS resource and the PDCCH including the DCI may be applied with a value indicated by a time domain resource assignment field of the DCI among an offset value (or offset values) included in the slot offset group configured in the SRS resource set. Also, a spatial domain transmission filter applied to the transmitted SRS resource may refer to spatial relation information configured in the SRS resource or to associated CSI-RS information configured in the SRS resource set including the SRS resource. The UE may transmit the SRS resource in an uplink BWP activated regarding the aperiodic SRS resource triggered through the DCI.

When the base station triggers aperiodic SRS transmission in the UE through DCI, a minimum time interval between a PDCCH including the DCI triggering the aperiodic SRS transmission and a transmitted SRS may be required for the UE transmit the SRS by applying configuration information regarding the SRS resource. A time interval for SRS transmission of the UE may be defined by the number of symbols between a last symbol of the PDCCH including the DCI triggering the aperiodic SRS transmission and a first symbol to which an SRS resource transmitted the earliest from among transmitted SRS resource(s) is mapped. The minimum time interval may be determined by referring to a PUSCH preparation procedure time required for the UE to prepare for PUSCH transmission.

Also, the minimum time interval may have different values according to whether an SRS resource set including the transmitted SRS resource is used. For example, the minimum time interval may refer to the PUSCH preparation procedure time of the UE and may be determined to be N2 symbols defined in consideration of UE processing capability according to capability of the UE. Also, when the SRS resource set is configured to be used for codebook or antennaSwitching, considering where the SRS resource set including the transmitted SRS resource is used, the minimum time interval may be determined to be N2 symbols, and when the SRS resource set is configured to be used for nonCodebook or beamManagement, the minimum time interval may be determined to be N2+14 symbols. When the time interval for aperiodic SRS transmission is equal to or greater than the minimum time interval, the UE may transmit aperiodic SRS, and when the time interval for aperiodic SRS transmission is smaller than the minimum time interval, the UE may ignore the DCI triggering the aperiodic SRS.

TABLE 25

```
SRS-Resource ::=                 SEQUENCE {
    srs-ResourceId                   SRS-ResourceId,
    nrofSRS-Ports                    ENUMERATED {port1, ports2, ports4),
    ptrs-PortIndex                   ENUMERATED {n0, n1 }
OPTIONAL, -- Need R
    transmissionComb                 CHOICE {
        n2                               SEQUENCE {
            combOffset-n2                    INTEGER (0..1),
            cyclicShift-n2                   INTEGER (0..7)
        },
        n4                               SEQUENCE {
            combOffset-n4                    INTEGER (0..3),
            cyclicShift-n4                   INTEGER (0..11)
        }
    },
    ResourceMapping                  SEQUENCE {
        StartPosition                    INTEGER (0..5),
        NrofSymbols                      ENUMERATED {n1, n2, n4},
        repetitionFactor                 ENUMERATED {n1, n2, n4}
    },
    freqDomainPosition               INTEGER (0..67),
    freqDomainShift                  INTEGER (0..268),
    freqHopping                      SEQUENCE {
        c-SRS                            INTEGER (0..63),
        b-SRS                            INTEGER (0..3),
        b-hop                            INTEGER (0..3)
    },
    groupOrSequenceHopping           ENUMERATED
                                     { neither, groupHopping, sequenceHopping },
    resourceType                     CHOICE {
        aperiodic                        SEQUENCE {
            ...
        },
```

TABLE 25-continued

```
  semi-persistent              SEQUENCE {
    periodicityAndOffset-sp        SRS-PeriodicityAndOffset,
    ...
  },
  periodic                     SEQUENCE {
    periodicityAndOffset-p         SRS-PeriodicityAndOffset,
    ...
  }
},
sequenceId                     INTEGER (0..1023),
spatialRelationInfo            SRS-SpatialRelationInfo
OPTIONAL, -- Need R
  ...
}
``` spatialRelationInfo configuration information in Table 25 above may be applied to a beam used for SRS transmission corresponding to beam information of a reference signal. For example, a spatialRelationInfo configuration may include information as in Table 26 below.

TABLE 26

```
SRS-SpatialRelationInfo :: = SEQUENCE {
  servingCellId         ServCellIndex            OPTONAL, --
Need S
  referenceSignal       CHOICE {
    ssb-Index              SSB-Index,
    csi-RS-Index           NZP-CSI-RS-ResourceId,
    srs                    SEQUENCE {
      resourceId             SRS-ResourceId,
      uplinkBWP              BWP-Id
    }
  }
}
```

Referring to the spatialRelationInfo configuration, an SS/PBCH block index, a CSI-RS index, or an SRS index may be configured as an index of a reference signal to be referred to, so as to use beam information of a specific reference signal. Higher layer signaling referenceSignal is configuration information indicating beam information of which reference signal is to be referred to for SRS transmission, and ssb-Index denotes an index of a SS/PBCH block, csi-RS-Index denotes an index of CSI-RS, and srs denotes an index of SRS. When a value of the higher layer signaling referenceSignal is configured to be ssb-Index, the UE may apply a reception beam used when an SS/PBCH block corresponding to the ssb-Index is received, as a transmission beam of the SRS transmission. When the value of the higher layer signaling referenceSignal is configured to be csi-RS-Index, the UE may apply a reception beam used when CSI-RS corresponding to the csi-RS-Index is received, as a transmission beam of the SRS transmission. When the value of the higher layer signaling referenceSignal is configured to be srs, the UE may apply a reception beam used when SRS corresponding to the srs is received, as a transmission beam of the SRS transmission.

[PUSCH: Regarding Transmission Scheme]

Next, a scheduling scheme of PUSCH transmission will be described. The PUSCH transmission may be dynamically scheduled by UL grant in DCI or may operate by configured grant Type 1 or Type 2. A dynamic scheduling indication regarding the PUSCH transmission is enabled by a DCI format 0_0 or 0_1.

The configured grant Type 1 PUSCH transmission may be quasi-statically configured through reception of configuredGrantConfig including rrc-ConfiguredUplinkGrant of Table 27 below through higher layer signaling, without receiving the UL grant in the DCI. The configured grant Type 2 PUSCH transmission may be semi-persistently scheduled by the UL grant in the DCI after reception of configuredGrantConfig not including rrc-ConfiguredUplinkGrant of Table 27, through higher layer signaling. When the PUSCH transmission operates by configured grant, parameters applied to the PUSCH transmission are applied through configuredGrantConfig that is higher layer signaling of Table 28 below, except for dataScramblingIdentityPUSCH, txConfig, codebookSubset, maxRank, and scaling of UCI-OnPUSCH provided through pusch-Config of Table 27 that is higher layer signaling. When the UE is provided with transformPrecoder in the configuredGrantConfig that is higher layer signaling of Table 24, the UE applies tp-pi2BPSK in the pusch-Config of Table 28 with respect to the PUSCH transmission operating by the configured grant.

TABLE 27

```
ConfiguredGrantConfig ::=           SEQUENCE {
  frequencyHopping                    ENUMERATED (intraSlot, interSlot )
OPTIONAL, -- Need S,
  cg-DMRS-Configuration               DMRS-UplinkConfig,
  mcs-Table                           ENUMERATED {qam256, qam64LowSE}
OPTIONAL, -- Need S
  mcs-TableTransformPrecoder          ENUMERATED {qam256, qam64LowSE}
OPTIONAL, -- Need S
  uci-OnPUSCH                         SetupRelease { CG-UCI-OnPUSCH }
OPTIONAL, -- Need M
  resourceAllocation                  ENUMERATED { resourceAllocationType0,
resourceAllocationType1, dynamicSwitch },
  rbg-Size                            ENUMERATED {config2}
OPTIONAL, -- Need S
  powerControlLoopToUse               ENUMERATED {n0, n1},
  p0-PUSCH-Alpha                      P0-PUSCH-AlphaSet Id,
```

TABLE 27-continued

| | |
|---|---|
| transformPrecoder OPTIONAL, -- Need S | ENUMERATED {enabled, disabled} |
| nrofHARQ-Processes | INTEGER(1..16), |
| repK | ENUMERATED {n1, n2, n4, n8}, |
| repK-RV OPTIONAL, -- Need K | ENUMERATED {s1-0231, s2-0303, s3-0000} |
| periodicity | ENUMERATED { sym2, sym7, sym1x14, sym2x14, sym4x14, sym5x14, sym8x14, sym10x14, sym16x14, sym20x14, sym32x14, sym40x14, sym64x14, sym80x14, sym128x14 sym16x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12 }, |
| configuredGrantTimer OPTIONAL, -- Need R | INTEGER (1..64) |
| rrc-ConfiguredUplinkGrant | SEQUENCE { |
| timeDomainOffset | INTEGER (0..5119), |
| timeDomainAllocation | INTEGER (0.15), |
| frequencyDomainAllocation | BIT STRING (SIZE(18)), |
| antennaPort | INTEGER (0..31), |
| dmrs-SeqInitialization OPTIONAL, -- Need R | INTEGER (0..1) |
| precodingAndNumberOfLayers | INTEGER (0..63), |
| srs-ResourceIndicator OPTIONAL, -- Need R | INTEGER (0..15) |
| mcsAndTBS | INTEGER (0..31), |
| frequencyHoppingOffset OPTIONAL, -- Need R | INTEGER (1.. maxNrofPhysicalResourceBlocks-1) |
| pathlossReferenceIndex ... } OPTIONAL, -- Need R ... } | INTEGER (0..NrofPUSCH-PathlossReferenceRSs-1), |

Next, a PUSCH transmission method will be described. A DMRS antenna port for PUSCH transmission is the same as an antenna port for SRS transmission. The PUSCH transmission may follow a codebook-based transmission method or a non-codebook-based transmission method, depending on whether a value of txConfig in the pusch-Config of Table 28 that is higher layer signaling is codebook or nonCodebook.

As described above, the PUSCH transmission may be dynamically scheduled through the DCI format 0_0 or 0_1, and may be configured quasi-statically by the configured grant. When scheduling regarding the PUSCH transmission is indicated to the UE through the DCI format 0_0, the UE may perform beam configuration for the PUSCH transmission by using pucch-spatialRelationInfoID corresponding to a UE-specific PUCCH resource corresponding to a minimum ID in an uplink BWP activated in a serving cell, and in this case, the PUSCH transmission is based on a single antenna port. The UE does not expect the scheduling regarding the PUSCH transmission through the DCI format 0_0, in a BWP in which a PUCCH resource including pucch-spatialRelationInfo is not configured. When the UE is not configured with txConfig in the pusch-Config of Table 28 below, the UE does not expect scheduling through the DCI format 0_1.

TABLE 28

| | |
|---|---|
| PUSCH-Config ::= | SEQUENCE { |
| dataScramblingIdentityPUSCH OPTIONAL, -- Need S | INTEGER (0..1023) |
| txConfig OPTIONAL, -- Need S | ENUMERATED {codebook, nonCodebook} |
| dmrs-UplinkForPUSCH-MappingTypeA OPTIONAL, -- Need M | SetupRelease { DMRS-Upl inkConfig ) |
| dmrs-UplinkForPUSCH-MappingTypeB OPTIONAL, -- Need M | SetupRelease { DMRS-UplinkConfig } |
| pusch-PowerControl OPTIONAL, -- Need M | PUSCH-PowerControl |
| frequencyHopping | ENUMERATED (intraSlot, interSlot } |

TABLE 28-continued

```
OPTIONAL, -- Need S
    frequencyHoppingOffsetLists        SEQUENCE (SIZE (1..4)) OF INTEGER (1..
maxNrofPhysicalResourceBlocks-1)
OPTIONAL, -- Need M
    resourceAllocation                 ENUMERATED { resourceAllocationType0,
resourceAllocationType1, dynamicSwitch},
    pusch-TimeDomainAllocationList     SetupRelease { PUSCH-
TimeDomainResourceAllocationList }        OPTIONAL, -- Need M
    pusch-AggregationFactor            ENUMERATED { n2, n4, n8 }
OPTIONAL, -- Need S
    mcs-Table                          ENUMERATED {qam256, qam64LowSE}
OPTIONAL, -- Need S
    mcs-TableTransformPrecoder         ENUMERATED {qam256, qam64LowSE}
OPTIONAL, -- Need S
    transformPrecoder                  ENUMERATED {enabled, disabled}
OPTIONAL, -- Need S
    codebookSubset                     ENUMERATED
{fullyAndPartialAndNonCoherent, partialAndNonCoherent, nonCoherent }
OPTIONAL, -- Cond codebookBased
    maxRank                            INTEGER (1..4)
OPTIONAL, -- Cond codebookBased
    rbg-Size                           ENUMERATED { config2}
OPTIONAL, -- Need S
    uci-OnPUSCH                        SetupRelease { UCI-OnPUSCH}
OPTIONAL, -- Need M
    tp-pi2BPSK                         ENUMERATED {enabled}
OPTIONAL, -- Need S
    ...
}
```

Next, codebook-based PUSCH transmission will be described. The codebook-based PUSCH transmission may be dynamically scheduled through the DCI format 0_0 or 0_1, or may quasi-statically operate by the configured grant. When the codebook-based PUSCH transmission is dynamically scheduled by the DCI format 0_1 or quasi-statically configured by the configured grant, the UE determines a precoder for the PUSCH transmission, based on an SRS resource indicator (SRI), a transmission precoding matrix indicator (TPMI), and a transmission rank (the number of PUSCH transmission layers).

Here, the SRI may be provided through a field SRS resource indicator in the DCI or via srs-ResourceIndicator that is higher layer signaling. The UE is configured with at least one SRS resource, and may be configured up to two SRS resources, during the codebook-based PUSCH transmission. When the UE is provided with the SRI through the DCI, an SRS resource indicated by the SRI denotes an SRS resource corresponding to the SRI, from among SRS resources transmitted before a PDCCH including the SRI. Also, the TPMI and transmission rank may be provided through field precoding information and number of layers in the DCI or may be configured via precodingAndNumberOfLayers that is higher layer signaling. The TPMI is used to indicate a precoder applied to the PUSCH transmission. When the UE is configured with one SRS resource, the TPMI is used to indicate the precoder to be applied to the one configured SRS resource. When the UE is configured with a plurality of SRS resources, the TPMI is used to indicate the precoder to be applied to the SRS resource indicated through the SRI.

The precoder to be used for the PUSCH transmission is selected from an uplink codebook having the number of antenna ports equal to a value of nrofSRS-Ports in SRS-Config that is higher layer signaling. In the codebook-based PUSCH transmission, the UE determines a codebook subset, based on the TPMI and the codebookSubset in the pusch-Config that is higher layer signaling. The codebookSubset in the pusch-Config that is higher layer signaling may be configured to be one of fullyAndPartialAndNonCoherent, partialAndNonCoherent, and nonCoherent, based on UE capability reported by the UE to the base station. When the UE reported partialAndNonCoherent as the UE capability, the UE does not expect a value of codebookSub set that is higher layer signaling to be configured to fullyAndPartialAndNonCoherent. Also, when the UE reported nonCoherent as the UE capability, the UE does not expect the value of codebookSubset that is higher layer signaling to be configured to fullyAndPartialAndNonCoherent or partialAndNonCoherent. When nrofSRS-Ports in SRS-ResourceSet that is higher layer signaling indicates two SRS antenna ports, the UE does not expect the value of codebookSubset that is higher layer signaling to be configured to partialAndNonCoherent.

The UE may be configured with one SRS resource set in which a value of usage in SRS-ResourceSet that is higher layer signaling is configured to codebook, and one SRS resource in the SRS resource set may be indicated through SRI. When several SRS resources are configured in the SRS resource set in which the value of usage in SRS-ResourceSet that is higher layer signaling is configured to codebook, the UE expects a value of nrofSRS-Ports in SRS-Resource that is higher layer signaling to be the same for all SRS resources.

The UE transmits, to the base station, one or a plurality of SRS resources included in the SRS resource set in which the value of usage is configured to codebook according to higher layer signaling, and the base station selects one of the SRS resources transmitted by the UE and instructs the UE to perform the PUSCH transmission, by using transmission beam information of the selected SRS resource. Here, in the codebook-based PUSCH transmission, SRI is used as information for selecting an index of one SRS resource, and is included in the DCI. In addition, the base station includes, to the DCI, information indicating the TPMI and rank to be used by the UE for the PUSCH transmission. The UE performs the PUSCH transmission by applying the precoder indicated by the rank and TPMI indicated based on a transmission beam of the SRS resource, by using the SRS resource indicated by the SRI.

Next, non-codebook-based PUSCH transmission will be described. The non-codebook-based PUSCH transmission may be dynamically scheduled through the DCI format 0_0 or 0_1, or may quasi-statically operate by the configured grant. When at least one SRS resource is configured in the SRS resource set in which a value of usage in SRS-ResourceSet that is higher layer signaling is configured to nonCodebook, the UE may receive scheduling of the non-codebook-based PUSCH transmission through the DCI format 0_1.

Regarding the SRS resource set in which the value of usage in SRS-ResourceSet that is higher layer signaling is configured to nonCodebook, the UE may receive configuration of one connected non-zero power (NZP) CSI-RS resource. The UE may perform calculation regarding a precoder for SRS transmission through measurement on the NZP CSI-RS resource connected to the SRS resource set. When a difference between a last reception symbol of an aperiodic NZP CSI-RS resource connected to the SRS resource set and a first symbol of aperiodic SRS transmission is less than 42 symbols, the UE does not expect information regarding the precoder for SRS transmission to be updated.

When a value of resourceType in SRS-ResourceSet that is higher layer signaling is configured to be aperiodic, the connected NZP CSI-RS is indicated by an SRS request that is a field in the DCI format 0_1 or 1_1. Here, when the connected NZP CSI-RS resource is an aperiodic NZP CSI-RS resource, it is indicated that the connected NZP CSI-RS is present regarding a case where a value of SRS request that is the field in the DCI format 0_1 or 1_1 is not 00. In this case, corresponding DCI does not indicate cross carrier or cross BWP scheduling. Also, when the value of SRS request indicates the presence of NZP CSI-RS, the NZP CSI-RS is located at a slot on which PDCCH including an SRS request field is transmitted. Here, TCI states configured in a scheduled subcarrier are not configured to be QCL-TypeD.

When a periodic or semi-persistent SRS resource set is configured, the connected NZP CSI-RS may be indicated through associatedCSI-RS in the SRS-ResourceSet that is higher layer signaling. Regarding the non-codebook-based transmission, the UE does not expect spatialRelationInfo that is higher layer signaling for the SRS resource and associatedCSI-RS in SRS-ResourceSet that is higher layer signaling to be configured together.

When a plurality of SRS resources are configured, the UE may determine the precoder and a transmission rank to be applied to the PUSCH transmission, based on SRI indicated by the base station. Here, the SRI may be indicated through a field SRS resource indicator in the DCI or configured through srs-ResourceIndicator that is higher layer signaling. Like the codebook-based PUSCH transmission, when the UE receives the SRI through the DCI, the SRS resource indicated by the SRI denotes an SRS resource corresponding to the SRI from among SRS resources transmitted prior to the PDCCH including the SRI. The UE may use one or a plurality of SRS resources for SRS transmission, and the maximum number of SRS resources capable of being simultaneously transmitted from a same symbol in one SRS resource set is determined by UE capability reported by the UE to the base station. Here, the SRS resources simultaneously transmitted by the UE occupy a same RB. The UE configures one SRS port for each SRS resource. Only one SRS resource set, in which the value of usage in SRS-ResourceSet that is higher layer signaling is configured to be nonCodebook, may be configured, and up to 4 SRS resources for the non-codebook-based PUSCH transmission may be configured.

The base station transmits, to the UE, one NZP-CSI-RS connected to an SRS resource set, and the UE calculates a precoder to be used to transmit one or a plurality of SRS resources in the SRS resource set, based on a result measured when receiving the NZP-CSI-RS. The UE applies the calculated precoder when transmitting, to the base station, one or plurality of SRS resources in the SRS resource set, in which the usage is configured to be nonCodebook, and the base station selects one or plurality of SRS resources from among the received one or plurality of SRS resources. Here, in the non-codebook-based PUSCH transmission, the SRI denotes an index capable of representing one SRS resource or a combination of a plurality of SRS resources, and the SRI is included in the DCI. At this time, the number of SRS resources indicated by the SRI transmitted by the base station may be the number of transmission layers of the PUSCH, and the UE transmits the PUSCH by applying, to each layer, the precoder applied for the SRS resource transmission.

[PUSCH: Preparation Procedure Time]

Next, a PUSCH preparation procedure time will be described. When a base station schedules a UE to transmit a PUSCH by using a DCI format 0_0, 0_1, or 0_2, the UE may require the PUSCH preparation procedure time for transmitting the PUSCH by applying a transmission method (a transmission precoding method of an SRS resource, the number of transmission layers, and a spatial domain transmission filter) indicated through DCI. The PUSCH preparation procedure time is defined in NR, in consideration of the above. The PUSCH preparation procedure time of the UE may follow Equation 2 below:

$$T_{proc,2} = \max((N_2 + d_{2,1} + d_2)(2048 + 144)\kappa 2^{-\mu} T_c + T_{ext} + T_{switch}, d_{2,2})$$ [Equation 2]

Each variable in $T_{proc,2}$ of Equation 2 may have a meaning below.

$N_2$: The number of symbols determined according to numerology μ and UE processing capability 1 or 2 according to capability of the UE. $N_2$ may have a value of Table 29 below when UE processing capability 1 is reported according to capability reporting of the UE, and may have a value of Table 30 below when UE processing capability 2 is reported and availability of the UE processing capability 2 is configured through higher layer signaling.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 |

$d_{2,1}$: The number of symbols determined to be 0 when resource elements of a first OFDM symbol of PUSCH transmission are all DM-RS, and to be 1 otherwise.

k: 64.

μ: One of $\mu_{DL}$ or $\mu_{UL}$, which increases $T_{proc,2}$, is used. $\mu_{DL}$ denotes numerology of a downlink on which a PDCCH including DCI for scheduling the PUSCH is transmitted, and $\mu_{UL}$ denotes numerology of an uplink on which the PUSCH is transmitted.

$T_c$: $1/(\Delta f_{max} \cdot N_f)$, $\Delta f_{max} = 480 \cdot 10^3$ Hz, and $N_f = 4096$.

$d_{2,2}$: Follows a BWP switching time when the DCI for scheduling the PUSCH indicates BWP switching, and is 0 otherwise.

$d_2$: When OFDM symbols of a PUSCH having a high priority index and a PUCCH having a low priority index overlap in time, a value of $d_2$ of the PUSCH having the high priority index is used. Otherwise, $d_2$ is 0.

$T_{ext}$: When the UE uses a shared spectrum channel access scheme, the UE calculates $T_{ext}$ to apply the same to PUSCH preparation procedure time. Other words, $T_{ext}$ is assumed to be 0.

$T_{switch}$: When an uplink switching interval is triggered, $T_{switch}$ is assumed to be a switching interval time. Otherwise, $T_{switch}$ is assumed to be 0.

The base station and the UE determine that the PUSCH preparation procedure time is not sufficient when a first symbol of the PUSCH starts before a first uplink symbol where CP starts after $T_{proc,2}$ from a last symbol of the PDCCH including the DCI for scheduling the PUSCH, considering time axis resource mapping information of the PUSCH scheduled through the DCI and a timing advance effect between the uplink and the downlink. Otherwise, the base station and the UE determines that the PUSCH preparation procedure time is sufficient. When the PUSCH preparation procedure time is sufficient, the UE transmits the PUSCH, and when the PUSCH preparation procedure time is not sufficient, the UE may ignore the DCI scheduling the PUSCH.

[PUSCH: Regarding Repetitive Transmission]

Hereinafter, repetitive transmission of an uplink data channel in a 5G system will be described in detail. The 5G system supports, as a repetitive transmission method of the uplink data channel, two types, i.e., a PUSCH repetitive transmission type A and a PUSCH repetitive transmission type B. The UE may be configured with one of the PUSCH repetitive transmission type A and B via higher layer signaling.

PUSCH Repetitive Transmission Type A

As described above, a location of a starting symbol and a symbol length of an uplink data channel may be determined via a time domain resource allocation method in one slot, and the base station may notify the UE about the number of repetitive transmissions through higher layer signaling (for example, RRC signaling) or L1 signaling (for example, DCI).

Based on the number of repetitive transmissions received from the base station, the UE may repetitively transmit, on consecutive slots, the uplink data channel having a starting symbol and length identical to a starting symbol and length of the configured uplink data channel. Here, when a slot configured to be downlink by the base station to the UE or at least one symbol among symbols of the uplink data channel configured to the UE is set to be downlink, the UE omits uplink data channel transmission but counts the number of repetitive transmissions of the uplink data channel.

PUSCH Repetitive Transmission Type B

As described above, the starting symbol and length of the uplink data channel may be determined via the time domain resource allocation method in one slot, and the base station may notify the UE about the number of repetitive transmissions numberofrepetitions through higher layer signaling (for example, RRC signaling) or L1 signaling (for example, DCI).

First, based on the starting symbol and length of the configured uplink data channel, nominal repetition of the uplink data channel is determined as below. A slot on which n-th nominal repetition starts is provided by $$K_s + \left\lfloor \frac{S + n \cdot L}{N_{symb}^{slot}} \right\rfloor$$

and a symbol starting from the slot is provided by $\mathrm{mod}(S+n \cdot L, N_{symb}^{slot})$. A slot on which the n-th nominal repetition ends is provided by $$K_s + \left\lfloor \frac{S + (n+1) \cdot L - 1}{N_{symb}^{slot}} \right\rfloor$$

and a symbol ending at the slot is provided by $\mathrm{mod}(S+(n+1) \cdot L-1, N_{symb}^{slot})$. Here, n is 0 to numberofrepetitions−1, S denotes the starting symbol of the configured uplink data channel and L denotes the symbol length of the configured uplink data channel $K_s$ denotes a slot on which PUSCH transmission starts, and $N_{symb}^{slot}$ denotes the number of symbols per slot.

The UE determines an invalid symbol for the PUSCH repetitive transmission type B. The symbol configured to be downlink by tdd-UL-DL-ConfigurationCommon or tdd-UL-DL-ConfigurationDedicated is determined to be the invalid symbol for the PUSCH repetitive transmission type B. In addition, the invalid symbol may be configured by a higher layer parameter (for example, InvalidSymbolPattern). The higher layer parameter (for example, InvalidSymbolPattern) may provide a symbol level bitmap over one slot or two slots to configure the invalid symbol. In the bitmap, 1 denotes the invalid symbol. In addition, a cycle and pattern of the bitmap may be configured through a higher layer parameter (for example, periodicityAndPattern).

When the higher layer parameter (for example, InvalidSymbolPattern) is configured and a InvalidSymbolPatternIndicator-ForDCIFormat0_1 or InvalidSymbolPatternIndicator-ForDCIFormat0_2 parameter indicates 1, the UE may apply an invalid symbol pattern, and when the InvalidSymbolPatternIndicator-ForDCIFormat0_1 or InvalidSymbolPatternIndicator-ForDCIFormat0_2 parameter indicates 0, the UE does not apply the invalid symbol pattern. When the higher layer parameter (for example, InvalidSymbolPattern) is configured and the InvalidSymbolPatternIndicator-ForDCIFormat0_1 or InvalidSymbolPatternIndicator-ForDCIFormat0_2 parameter is not configured, the UE applies the invalid symbol pattern.

After the invalid symbol is determined, the UE may consider symbols other than the invalid symbol as valid symbols, for each nominal repetition. When each nominal repetition includes at least one valid symbol, the nominal repetition may include one or more actual repetitions. Here, each actual repetition may include consecutive sets of valid symbols that may be used for the PUSCH repetitive transmission type B in one slot.

Figure 15:
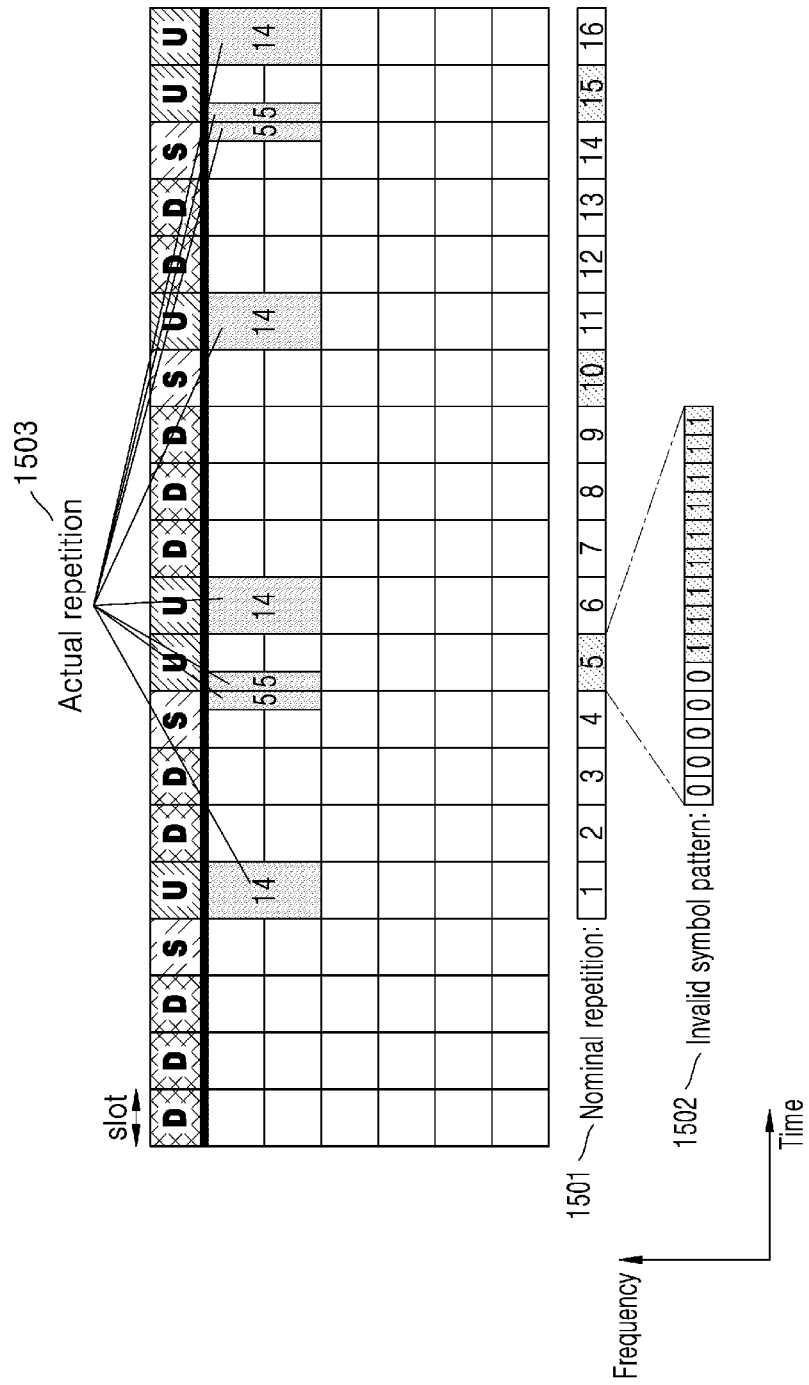
FIG. 15 illustrates an example of a physical uplink shared channel (PUSCH) repetitive transmission type B in a wireless communication system, according to an embodiment of the disclosure.

FIG. 15 illustrates an example of a PUSCH repetitive transmission type B in a wireless communication system according to an embodiment of the disclosure.

Referring to the example of FIG. 15, a UE may be configured with 0 for a starting symbol S of an uplink data channel and 14 for a length L of the uplink data channel, and configured with 16 for the number of repetitive transmissions. In this case, a nominal repetition 1501 is indicated in 16 consecutive slots. Then, the UE may determine, as an invalid symbol, a symbol configured to be a downlink symbol in each nominal repetition 1501. Also, the UE determines, as the invalid symbols, symbols configured to be 1 in an invalid symbol pattern 1502. When valid symbols, rather than the invalid symbols, are configured to be one or more consecutive symbols in one slot in each nominal repetition 1501, the valid symbols may be transmitted by being configured as actual repetition 1503.

Also, regarding PUSCH repetitive transmission, NR Release 16 may define following additional methods for configured grant-based PUSCH transmission and UL grant-based PUSCH transmission exceeding a slot boundary.

Method 1 (mini-slot level repetition): At least two PUSCH repetitive transmissions in one slot or exceeding a boundary of consecutive slots are scheduled through one UL grant. Also, regarding Method 1, time domain resource allocation information in DCI indicates a resource of first repetitive transmission. Time domain resource information of remaining repetitive transmissions may be determined according to time domain resource information of the first repetitive transmission and an uplink or downlink direction determined for each symbol of each slot. Each repetitive transmission occupies consecutive symbols.

Method 2 (multi-segment transmission): At least two PUSCH repetitive transmissions in consecutive slots are scheduled through one UL grant. Here, one transmission is assigned for each slot, and starting points or repeated lengths may be different for each transmission. In Method 2, the time domain resource allocation information in the DCI indicates the starting points and repeated lengths of all repetitive transmissions. Also, in a case where the repetitive transmission is performed in a single slot through Method 2, when there are several sets of consecutive uplink symbols in the slot, each repetitive transmission is performed for each set of uplink symbols. When there is only one group of consecutive uplink symbols in the slot, one PUSCH repetitive transmission is performed according to a method of NR Release 15.

Method 3: At least two PUSCH repetitive transmissions in consecutive slots are scheduled through at least two UL grants. Here, one transmission is assigned for each slot, and an n-th UL grant may be received before PUSCH transmission scheduled by an n−1-th UL grant is over.

Method 4: One or more PUSCH repetitive transmissions in a single slot or two or more PUSCH repetitive transmissions over a boundary of consecutive slots may be supported through one UL grant or one configured grant. The number of repetitions indicated by a base station to the UE is only a nominal value, and the number of PUSCH repetitive transmissions actually performed by the UE may be greater than the nominal number of repetitions. The time domain resource allocation information in the DCI or configured grant denotes a resource of a first repetitive transmission indicated by the base station. The time domain resource information of the remaining repetitive transmissions may be determined by referring to resource information of the first repetitive transmission and an uplink or downlink direction of symbols. When the time domain resource information of the repetitive transmission indicated by the base station spans a slot boundary or includes an uplink/downlink switching point, the repetitive transmission may be divided into a plurality of repetitive transmissions. Here, one repetitive transmission may be included for each uplink period in one slot.

[PUSCH: Frequency Hopping Process]

Hereinafter, frequency hopping of a PUSCH in a 5G system will be described in detail.

In 5G, two methods are supported for each PUSCH repetitive transmission type, as a frequency hopping method of the PUSCH. First, in the PUSCH repetitive transmission type A, intra-slot frequency hopping and inter-slot frequency hopping are supported, and in the PUSCH repetitive transmission type B, inter-repetition frequency hopping and inter-slot frequency hopping are supported.

An intra-slot frequency hopping method supported in the PUSCH repetitive transmission type A is a method of transmitting an allocated resource of a frequency domain by changing the resource by a configured frequency offset in two hops in one slot. A starting RB of each hop in the intra-slot frequency hopping may be indicated by Equation 3 below:

$$RB_{start} = \begin{cases} RB_{start} & i = 0 \\ (RB_{start} + RB_{offset}) \bmod N_{BWP}^{size} & i = 1. \end{cases} \quad \text{[Equation 3]}$$

In Equation 3, i=0 and i=1 respectively indicate a first hop and a second hop, and $RB_{start}$ indicates a starting RB in a UL BWP and is calculated from a frequency resource allocation method. $RB_{offset}$ denotes a frequency offset between two hops via a higher layer parameter. The number of symbols of the first hop may be indicated by $\lfloor N_{symb}^{PUSCH,s}/2 \rfloor$, and the number of symbols of the second hop may be indicated by $N_{symb}^{PUSCH,s} - \lfloor N_{symb}^{PUSCH,s}/2 \rfloor$. $N_{symb}^{PUSCH,s}$ denotes a length of PUSCH transmission in one slot, and is indicated by the number of OFDM symbols.

Next, an inter-slot frequency hopping method supported in the PUSCH repetitive transmission types A and B is a method of transmitting an allocated resource of a frequency domain by changing the resource by a configured frequency offset for each slot. In the inter-slot frequency hopping, a starting RB during a $n_s^\mu$ slot may be indicated by Equation 4 below:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1. \end{cases} \quad \text{[Equation 4]}$$

In Equation 4, $n_s^\mu$ denotes a current slot number regarding the multi-slot PUSCH transmission, and $RB_{start}$ denotes a starting RB in a UL BWP and is calculated from a frequency resource allocation method. $RB_{offset}$ denotes a frequency offset between two hops via a higher layer parameter.

Next, an inter-repetition frequency hopping method supported by the PUSCH repetitive transmission type B is a method of transmitting a resource allocated on a frequency domain regarding one or a plurality of actual repetitions in each nominal repetition by moving the resource by a configured frequency offset. $RB_{start}(n)$ that is an index of a starting RB on a frequency domain regarding the one or plurality of actual repetitions in an n-th nominal repetition may follow Equation 5 below:

$$RB_{start}(n) = \begin{cases} RB_{start} & n\bmod 2 = 0 \\ (RB_{start} + RB_{offset}) \bmod N_{BWP}^{size} & n\bmod 2 = 1. \end{cases} \quad \text{[Equation 5]}$$

In Equation 5, n denotes an index of the nominal repetition, and $RB_{offset}$ denotes an RB offset between two hops via a higher layer parameter.

[Regarding PUSCH Transmit Power]

Hereinafter, a method of determining transmit power of an uplink data channel in a 5G system will be described in detail.

In the 5G system, the transmit power of the uplink data channel may be determined according to Equation 6 below:

$$P_{PUSCH,b,f,c}(i, j, q_d, l) = \min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} \text{[dBm]}. \quad \text{[Equation 6]}$$

In Equation 6, j denotes a grant type of a PUSCH, and in particular, j=0 denotes a PUSCH grant for a random access response, j=1 denotes a configured grant, and j∈{2, 3, ..., J−1} denotes a dynamic grant $P_{CMAX,f,c}(i)$ denotes maximum output power configured in a UE for a carrier wave f of a supporting cell c, regarding a PUSCH transmission occasion i. $P_{O\_PUSCHA,b,f,c}(j)$ is a parameter configured by adding $P_{O\_NOMINAL\_PUSCH,f,c}(j)$ that is configured through a higher layer parameter to $P_{O\_UE\_PUSCH,b,f,c}(j)$ that may be determined through a higher layer configuration and SRI (in case of a dynamic grant PUSCH). $M_{RB,b,f,c}^{PUSCH}(i)$ denotes a bandwidth for resource application represented by the number of resource blocks, regarding the PUSCH transmission occasion i, and $\Delta_{TF,b,f,c}(i)$ denotes a value determined according to a modulation coding scheme (MCS) and a type of information transmitted to the PUSCH (for example, whether UL-SCH is included or whether CSI is included). $\alpha_{b,f,c}(j)$ is a value for compensating for a pathloss, and may be determined through a higher layer configuration and an SRI (in case of a dynamic grant PUSCH).

$PL_{b,f,c}(q_d)$ denotes a downlink pathloss estimation value estimated by a UE through a reference signal having a reference signal index of $q_d$, and the reference signal index may be determined by the UE through a higher layer configuration and SRI (in a case of dynamic grant PUSCH or ConfiguredGrantConfig-based configured grant PUSCH (type 2 configured grant PUSCH) not including or higher layer configuration rrc-ConfiguredUplinkGrant) or through a higher layer configuration. $f_{b,f,c}(i,l)$ is a closed loop power adjustment value, and may be supported in an accumulation manner and an absolute manner.

When a higher layer parameter tpc-Accumulation is not configured in the UE, the closed loop power adjustment value may be determined in the accumulation manner. Here, $f_{b,f,c}(i,l)$ is determined to be $$f_{b,f,c}(i-i_0, l) + \sum_{m=0}^{C(D_i)-1} \delta_{PUSCH,b,f,c}(m, l)$$

obtained by adding a closed loop power adjustment value for a previous PUSCH transmission occasion i−i₀ to TPC command values for a closed loop index l received through DCI between a $K_{PUSCH}(i-i_0)-1$ symbol for transmitting the PUSCH transmission occasion i−i₀ to a $K_{PUSCH}(i)$ symbol for transmitting the PUSCH transmission occasion i. When the higher layer parameter tpc-Accumulation is configured in the UE, $f_{b,f,c}(i,l)$ is determined to be a TPC command value $\delta_{PUSCH,b,f,c}(i,l)$ for the closed loop index l received through the DCI. The closed loop index l may be configured to be 0 or 1 when a higher layer parameter twoPUSCH-PC-AdjustementStates is configured in the UE, and a value thereof may be determined through a higher layer configuration and SRI (in a case of dynamic grant PUSCH). A mapping relationship of a TPC command field in the DCI and a TPC value $\delta_{PUSCH,b,f,c}$ according to the accumulation manner and the absolute manner may be defined as Table 31 below.

TABLE 31

| TPC command field | Accumulated $\delta_{PUSCH,b,f,c}$ [dB] | Absolute $\delta_{PUSCH,b,f,c}$ [dB] |
|---|---|---|
| 0 | −1 | −4 |
| 1 | 0 | −1 |
| 2 | 1 | 1 |
| 3 | 3 | 4 |

[Regarding Power Headroom Report (PHR)]

PHR indicates that a UE measures a difference (i.e., available transmit power of the UE) between nominal UE maximum transmit power and estimated power for uplink transmission, and transmits the difference to a base station. The PHR may be used to support power aware packet scheduling. The estimated power for the uplink transmission may be estimated power for UL-SCH (PUSCH) per activated serving cell, estimated power for UL-SCH and PUCCH transmissions in a special cell (SpCell) of another MAC entity (for example, an E-UTRA MAC entity in EN-DC, NE-DC, and NGEN-DC cases in the 3GPP standard), or estimated power for SRS transmission per activated serving cell. The UE triggers the PHR when one of following trigger events is satisfied.

[Trigger Event 1] A higher layer parameter phr-Prohibit-Timer is expired, and a pathloss for at least one activated supporting cell, in which a downlink BWP activated when an MAC entity includes an uplink resource for new transmission is not a dormant BWP, changes greater than a higher layer parameter phr-Tx-PowerFactorChange dB after a latest PHR transmission. Here, a change in a pathloss for one cell is determined by comparing a pathloss currently measured for a current pathloss reference with a pathloss measured at a time point of a latest PHR transmission for a pathloss reference at the corresponding time point.

[Trigger Event 2] A higher layer parameter phr-Periodic-Timer is expired.

[Trigger Event 3] A configuration or reconfiguration of a PHR function is performed by a higher layer, instead of a configuration or reconfiguration of not supporting PHR.

[Trigger Event 4] A secondary cell (SCell) for an MAC entity including an uplink in which firstActiveDownlinkBWP-Id is not configured as a dormant BWP is activated. The firstActiveDownlinkBWP-Id denotes an identifier of a DL BWP to be activated when RRC (re)configuration is performed (when configured for an SpCell), or an identifier of a DL BWP to be used when an SCell is activated (when configured for an SCell).

[Trigger Event 5] A primary secondary cell group cell (PSCell) is added. (That is, a PSCell is newly added or changed).

[Trigger Event 6] A higher layer parameter phr-ProhibitTimer is expired, and a) and b) below are both satisfied for activated supporting cells of an MAC entity including an uplink configured when the MAC entity includes an uplink resource for new transmission:
a) There is an uplink resource allocated for transmission, or a PUCCH is transmitted to a corresponding cell; and
b) When an MAC entity includes an uplink resource for transmission or a PUCCH is transmitted to a corresponding cell, power backoff required due to power management for the cell is greater than a higher layer parameter phr-TxPowerFactorChange dB after a latest PHR transmission.

[Trigger Event 7] An activated BWP of an SCell for an MAC entity including a configured uplink is changed from a dormant BWP to a non-dormant downlink BWP.

[Trigger Event 8] When a UE is configured with a higher layer parameter mpe-Reporting-FR2 for indicating whether to report maximum permissible exposure (MPE) maximum allowed UE output power reduction (P-MPR) for satisfying MPE in FR2, and mpe-ProhibitTimer is not running, measured P-MPR applied to satisfy an FR2 MPE requirement condition for at least one activated FR2 supporting cell after latest PHR when the PHR is referred to as "MPE P-MPR reporting" is equal to or greater than a higher layer parameter mpe-Threshold.

The PHR may be triggered according to the above trigger events, and the UE may determine the PHR according to additional conditions below.

[Additional Condition according to Temporary Required Power Backoff] When required power backoff is temporarily reduced (i.e., up to tens of milliseconds) due to power management, an MAC entity does not trigger a PHR. When the required power backoff is temporarily reduced and the PHR is triggered by other trigger events, it is required not to temporarily decrease a value of $P_{CMAX,f,c}$/PH indicating a ratio of maximum power to remaining (available) power. In other words, the PHR is not triggered by temporary power backoff. For example, a condition is added such that, when the PHR is triggered by another trigger event (expiration of periodictimer or the like), power headroom reflecting temporary power reduction caused by the required power backoff is not reported, but a power headroom excluding an effect of the required power backoff is reported.

[PHR Condition according to UE Implementation] When one HARQ process is configured with cg-RetransmissionTimer, and a PHR is already included in an MAC PDU for transmission by the HARQ process but not yet transmitted through a lower layer, a method of processing the PHR is determined according to UE implementation.

When the PHR is triggered according to occurrence of at least one of the trigger events, and an uplink resource allocated through DCI is able to accommodate an MAC entity for the PHR and a subheader therefor, a UE performs the PHR through the uplink resource. Here, the uplink resource denotes a resource for an uplink transmission scheduled by a first uplink grant or first DCI format scheduling an initial transmission of a transport block (TB) after triggering of the PHR. In other words, after the triggering of the PHR, the UE may perform the PHR through the uplink transmission scheduled by the first uplink grant or first DCI format from among uplink resources capable of accommodating the MAC entity for the PHR and the subheader therefor. Alternatively, after the triggering of the PHR, the UE may perform the PHR through a configured grant PUSCH transmission capable of accommodating the MAC entity for the PHR and the subheader therefor.

When performing PHR for a specific cell, the UE may select, calculate, and report one of two types of power headroom information. A first type is actual PHR and is power headroom information calculated based on transmit power of an actually transmitted uplink signal (for example, PUSCH). A second type is virtual PHR (or a reference format) and is power headroom information calculated based on a transmit power parameter configured in a higher layer despite that there is no actually transmitted uplink signal (for example, PUSCH). After the PHR is triggered, the UE may calculate the actual PHR based on higher layer information for periodic/semi-persistent SRS transmission or configured grant transmission, and DCI received up to a time point including a PDCCH monitoring occasion where a first DCI format scheduling a PUSCH for transmitting an MAC CE including the PHR is received. When the UE receives the DCI after the PDCCH monitoring occasion where the first DCI format is received, or determines the periodic/semi-persistent SRS transmission or configured grant transmission, the UE may calculate the virtual PHR for a corresponding cell.

Alternatively, after the PHR is triggered, the UE may calculate the actual PHR based on the higher layer information for the periodic/semi-persistent SRS transmission or configured grant transmission, and the DCI received up to a time point before $T'_{proc,2} = T_{proc,2}$ corresponding to a PUSCH preparation procedure time described above, based on a first uplink symbol of a configured grant PUSCH capable of transmitting the power headroom information. When the UE receives the DCI after a time point before $T'_{proc,2}$ based on the first uplink symbol of the configured grant PUSCH or determines the periodic/semi-persistent SRS transmission or configured grant transmission, the UE may calculate the virtual PHR for the corresponding cell.

When the UE calculates the actual PHR based on an actual PUSCH transmission, the power headroom information at a supporting cell c, carrier f, BWP b, and PUSCH transmission occasion i may be represented as Equation 7 below:

$$PH_{type1,b,f,c}(i,j,q_d,l) = P_{CMAX,f,c}(i) - \{P_{O\_PUSCH,b,f,c}(j) + 10 \log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\} \text{ [dB]} \quad \text{[Equation 7]}$$

When the UE calculates the virtual PHR based on a transmit power parameter configured in a higher layer, the power headroom information at the supporting cell c, carrier f, BWP b, and PUSCH transmission occasion i may be represented as Equation 8 below:

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \text{ [db]} \quad \text{[Equation 8]}$$

In Equation 7, the power headroom information may be configured by calculating a difference between maximum output power and transmit power for the PUSCH transmission occasion i. In Equation 8, the power headroom information may be configured by calculating a difference between maximum output power $\tilde{P}_{CMAX,f,c}(i)$ when a parameter related to MPR (for example, MPR, additional MPR (A-MPR), or power management MPR (P-MPR)) and $\Delta T_c$ are assumed to be 0 and reference PUSCH transmit power using a default transmit power parameter (for example, $P_{O\_NOMINAL\_PUSCH,f,c}(0)$, p0 and alpha of P0-PUSCH-AlphaSet that is p0-PUSCH-AlphaSetId=0, $PL_{b,f,c}(q_d)$ corresponding to pusch-PathlossReferenceRS-Id=0, and a closed loop power adjustment value in which a closed loop index l=0). Descriptions on variables of Equation 6 may be referred to for descriptions on variables of Equations 7 and 8.

The A-MPR is MPR satisfying an additional emission requirement indicated by a base station through higher layer signaling (for example, when additionalSpectrumEmission indicated through RRC signaling and NR frequency band are combined (TS 38.101-1 in Table 6.2.3.1-1A), a network signaling label is determined and a respective A-MPR value is defined according to TS 38.101-1 in Table 6.2.3.1-1). The P-MPR is maximum allowed UE output power reduction for a serving cell c, and is MPR satisfying applicable electromagnetic energy absorption requirements. The 3GPP standard TS 38.101-1 section 6.2 may be referred to for the A-MPR and P-MPR. In a communication system to which the disclosure is applicable, first type power headroom information may denote power headroom information for PUSCH transmit power, second type power headroom information may denote power headroom information for PUCCH transmit power, and third type power headroom information may denote power headroom information for SRS transmit power. However, the disclosure is not limited thereto.

Figure 16:
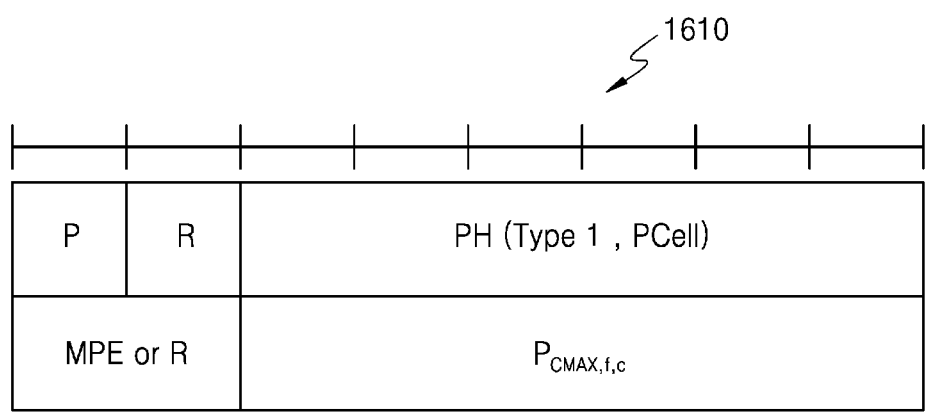
FIG. 16 illustrates a diagram showing an MAC CE structure including a single piece of power headroom report (PHR) information according to an embodiment of the disclosure.

When MR-DC or UL-CA is not supported, the base station configures the UE with "false" for a higher layer parameter "multiplePHR." This may indicate that the UE supports PHR for a primary cell (PCell) through an MAC CE including a single entry, as indicated by a reference numeral 1610 of FIG. 16. Each field of FIG. 16 may be defined as below. However, this is only an example and the disclosure is not limited thereto.

"multiplePHR" so as to perform PHR for each supporting cell. This denotes that the UE supports the PHR for a plurality of supporting cells with an MAC CE having a plurality of entries, as indicated by a reference numeral 1700 or 1702 of FIG. 17. The reference numeral 1700 of FIG. 17 denotes a PHR MAC CE format that is configured with a plurality of serving cells and may be used when a highest value among indexes of the serving cells is smaller than 8.

The reference numeral 1702 of FIG. 17 denotes a PHR MAC CE format that is configured with a plurality of serving cells and may be used when the highest value among the indexes of the serving cells is equal to or greater than 8. Unlike the PHR MAC CE formats 1700 and 1702 shown in FIG. 17, a PHR MAC CE format may have a variable size depending on a group or the number of serving cells. Corresponding information may include second type power headroom information for an SpCell of different MAC entities (for example, LTE), and first type power headroom information for a Pcell. When the highest value among the indexes of the serving cells is smaller than 8, a field indicating serving cell information may include one octet. When the highest value among the indexes of the serving cells is equal to or greater than 8, the field indicating serving cell information may include four octets.

The power headroom information may be included according to an order of the indexes of the serving cells. When the PHR is triggered, the MAC entity may transmit a PHR MAC CE including the power headroom information through a transmittable PUSCH. Here, whether the power headroom information is calculated based on actual transmission (i.e., whether the power headroom information is actual PHR) or calculated based on a transmit power parameter configured by a higher layer (i.e., whether the power headroom information is virtual PHR) may be determined based on DCI and a higher signal received up to a specific time point (a time point including a PDCCH monitoring occasion where a first DCI format is detected or a time point before $T'_{proc,2}$ from a first symbol of an initial PUSCH), as described above. Fields of the PHR MAC CE formats 1700 and 1702 shown in FIG. 17 may have the same meanings

---

P: P including 1 bit is set to 0 in a case where mpe-Reporting-FR2 is configured and P-MPR applied according to TS38.133 when a serving cell operates in FR2 is smaller than P-MPR_00, and is set to 1 otherwise. In a case where mpe-Reporting-FR2 is not configured or the serving cell operates in FR1, P indicates whether power backoff is applied for transmit power adjustment. When a corresponding $P_{CMAX,f,c}$ field has another value because the power backoff is not applied due to power management, a corresponding P region is set to 1.

$P_{CMAX,f,c}$: This field indicates a maximum transmit power value used to calculate power headroom during power headroom reporting. It includes information of 6 bits, and one of total 64 stages of nominal UE transmit power levels may be selected.

MPE: In a case where mpe-Reporting-FR2 is configured and a serving cell operates in FR2, and in a case where a P field is set to 1, an MPE region indicates a power backoff value applied to satisfy maximum permissible exposure (MPE) requirements. It is a field including 2 bits, and indicates one of total four measured P-MPR value stages. In a case where mpe-Reproting-FR2 is not configured or the serving cell operates in FR1, or in a case where the P field is set to 0, it may be present as a reserved bit, such as R.

R: It is a reserved bit and set to 0.

PH: This field indicates a power headroom level. It includes 6 bits and may select one of total 64 power headroom levels.

---

When the UE supports multi-RAT dual connectivity (MR-DC) or uplink carrier aggregation (UL-CA), the base station configures the UE with "true" for a higher layer parameter (definitions) as most fields of the PHR MAC CE format 1610 of FIG. 16, and $C_i$ and V may have following meanings.

$C_i$: This region indicates whether a power headroom region for a supporting cell having servCellIndex i is present. When power headroom for a supporting cell i is reported, a corresponding $C_i$ region is set to 1. When power headroom for the supporting cell i is not reported, the corresponding $C_i$ region is set to 0.
V: This region indicates whether a power headroom value is calculated based on actual transmission or a reference format. When a PUSCH is actually transmitted for first type power headroom information, V is set to 0, and when a reference format for the PUSCH is used, V is set to 1. When an SRS is actually transmitted for third type power headroom information, V is set to 0, and when a reference format for the SRS is used, Vis set to 1. Also, with respect to first, second, and third type power headroom information, when a value of V is 0, respective $P_{CMAX,f,c}$ and MPE fields are present, and when the value of V is 1, respective $P_{CMAX,f,c}$ and MPE fields may be omitted.

[Regarding UE Capability Report]

In LTE and NR systems, a UE may perform a procedure of reporting, to a base station, capability supported by the UE while being connected to a serving base station. Hereinafter, such a procedure will be referred to as a UE capability report.

The base station may transmit, to the UE in a connected state, a UE capability enquiry message requesting a capability report. The UE capability enquiry message may include a UE capability request for each radio access technology (RAT) type of the base station. The UE capability request for each RAT type may include supported frequency band combination information or the like. Also, regarding the UE capability enquiry message, a plurality of UE capabilities for each RAT type may be requested through one RRC message container transmitted by the base station, or the base station may transmit, to the UE, the UE capability enquiry message including the UE capability request for each RAT type a plurality of times. In other words, the UE capability enquiry may be repeated a plurality of times in one message, and the UE may configure a corresponding UE capability information message and report the same a plurality of times. In a next-generation mobile communication system, the UE capability may be requested for MR-DC as well as NR, LTE, and E-UTRA-NR dual connectivity (EN-DC). The UE capability enquiry message is generally transmitted at an initial stage after the UE is connected to the base station, but may be requested in any condition upon necessity by the base station.

Upon receiving a UE capability report request from the base station, the UE configures UE capability according to band information and RAT type requested by the base station. Examples of a method by which the UE configures the UE capability in the NR system will now be described.

1. When the UE receives, from the base station, a list of LTE and/or NR bands as the UE capability request, the UE configures a band combination (BC) regarding EN-DC and NR stand-alone (SA). In other words, the UE configures a candidate list of BCs regarding the EN-DC and NR SA, based on bands requested from the base station by FreqBandList. Priorities of the bands are in an order stated in FreqBandList.

2. When the base station requests the UE capability report by setting an "eutra-nr-only" flag or "eutra" flag in the UE capability enquiry message, the UE completely removes NR SA BCs from the configured candidate list of BCs. Such an operation may be performed only when an LTE base station (eNB) requests "eutra" capability.

3. Then, the UE removes fallback BCs from the configured candidate list of BCs. Here, the fallback BC denotes a BC obtainable by removing a band corresponding to at least one SCell from an arbitrary BC, and this is possible because a BC before removing the band corresponding to the at least one SCell already covers the fallback BC. This operation is also applied to MR-DC, i.e., to LTE bands. The remaining BCs are a final "candidate BC list."

4. The UE selects BCs to be reported by selecting, from the final candidate list of BCs, the BCs according to a requested RAT type. Here, the UE configures supportedBandCombinationList in a determined order. In other words, the UE configures UE capability and BCs to be reported according to an order of pre-set rat-Type. (nr→eutra-nr→eutra). Also, featureSetCombination regarding the configured supportedBandCombinationList is configured, and a list of candidate feature set combinations is configured from the candidate list of BCs from which a list of fallback BCs (including capability of a same or lower level) is removed. The "candidate feature set combination" includes all feature set combinations regarding NR and EUTRA-NR BCs, and may be obtained from feature set combinations of UE-NR-Capabilities and UE-MRDC-Capabilities containers.

5. When the requested rat Type is eutra-nr and has an effect, the featureSetCombinations are included both of the UE-MRDC-Capabilities and UE-NR-Capabilities containers. However, a feature set of NR only includes UE-NR-Capabilities.

After the UE capability is configured, the UE transmits, to the base station, UE capability information message including the UE capability. Based on the UE capability received from the UE, the base station performs, on the UE, appropriate scheduling and transmission/reception management.

[Regarding CA/DC]

Figure 18:
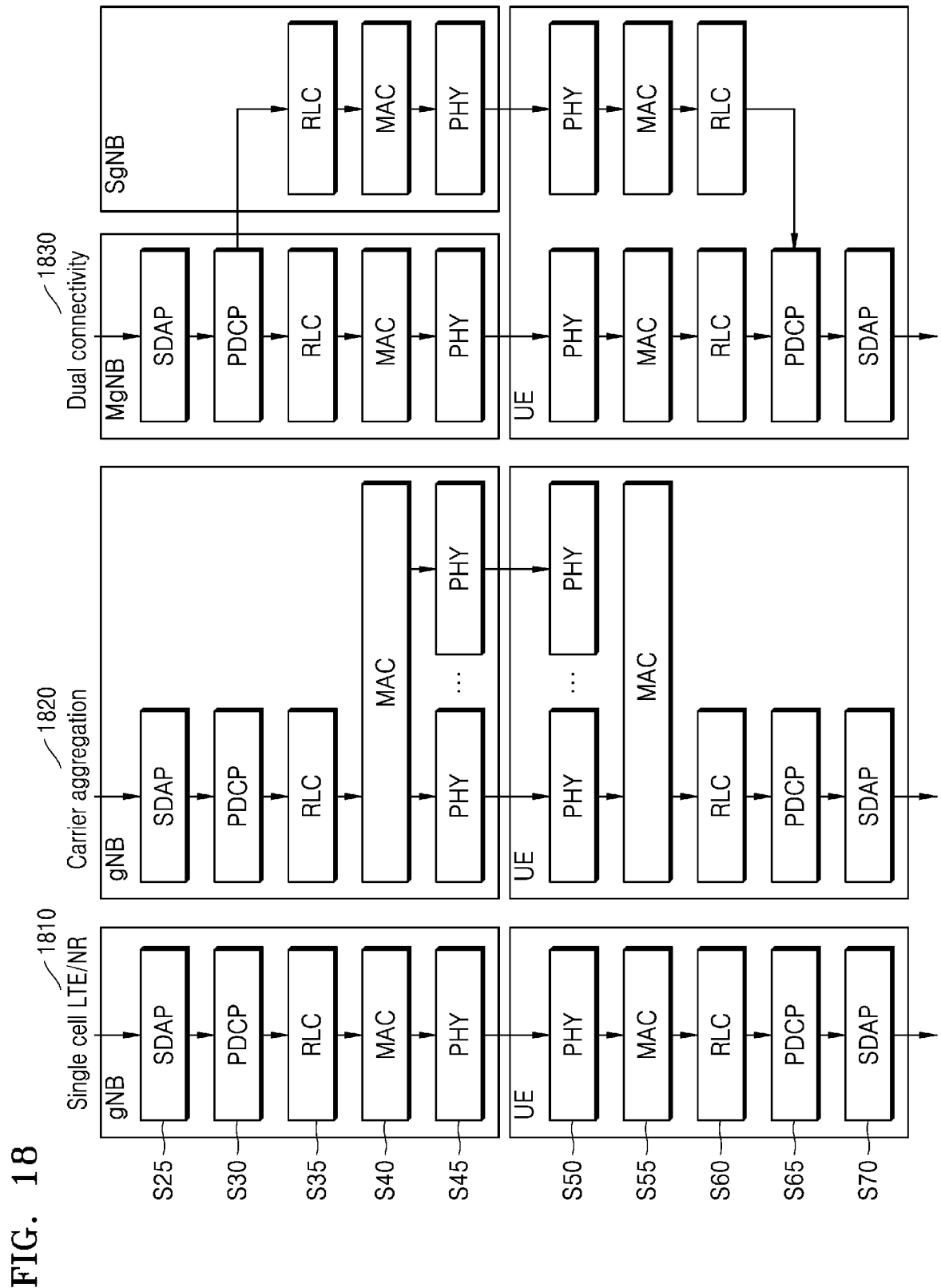
FIG. 18 illustrates a diagram of radio protocol architectures of base stations and UEs in situations of single cell, carrier aggregation, and dual connectivity in a wireless communication system according to an embodiment of the disclosure.

FIG. 18 illustrates a diagram of radio protocol architectures of base stations and UEs in situations of single cell 1810, carrier aggregation 1820, dual connectivity 1830 according to an embodiment of the disclosure.

Referring to FIG. 18, the radio protocol architecture of a next-generation wireless communication system may include NR service data adaptation protocol (SDAP) layers S25 and S70, NR packet data convergence protocol (PDCP) layers S30 and S65, NR radio link control (RLC) layers S35 and S60, and NR media access control (MAC) layers S40 and S55, respectively for a UE and an NR base station (gNB). In the descriptions below, each entity may be understood as a functional block in charge of each layer.

Main functions of the NR SDAP layers S25 and S70 and 1470 may include some of the following functions:

Transfer of user plane data;
Mapping between QoS flow and a data radio bearer (DRB) for both downlink (DL) and uplink (UL);
Marking QoS flow ID in both DL and UL packets; and
Reflective QoS flow to DRB mapping for the UL SDAP PDUs.

Regarding the NR SDAP layer S25 and S70, the UE may be configured with, by an RRC message, whether to use a header of the NR SDAP layer S25 or S70 or whether to use a function of the NR SDAP layer S25 or S70 for each NR PDCP layer S30 or S65, for each bearer, or for each logical channel, and when an SDAP header is configured, an NAS reflective QoS configuration 1-bit indicator and AS reflective QoS configuration 1-bit indicator of the SDAP header may indicate the UE to update or reconfigure mapping information between a QoS flow and a data bearer for UL and DL. The SDAP header may include QoS flow ID indicating QoS. QoS information may be used as data processing priority information, scheduling information, or the like for supporting a smooth service.

Main functions of the NR PDCP layer S30 or S65 may include some of the following functions:
  Header compression and decompression: Robust header compression (ROHC) only;
  Transfer of user data;
  In-sequence delivery of upper layer PDUs;
  Out-of-sequence delivery of upper layer PDUs;
  PDCP PDU reordering for reception;
  Duplicate detection of lower layer SDUs;
  Retransmission of PDCP SDUs;
  Ciphering and deciphering; and
  Timer-based SDU discard in uplink.

A reordering function of the NR PDCP layer S30 or S65 may denote a function of reordering PDCP PDUs received from a lower layer, based on a PDCP sequence number (SN), and may include a function of delivering data to a higher layer in a reordered order. Alternatively, the reordering function of the NR PDCP layer S30 or S65 may include a function of immediately delivering the data without considering an order, a function of recording missing PDCP PDUs by reordering the order, a function of reporting a status regarding the missing PDCP PDUs to a transmitter, and a function of requesting to retransmit the missing PDCP PDUs.

The main functions of the NR RLC layer S35 or S60 may include at least some of the following functions.
  Transfer of upper layer PDUs;
  In-sequence delivery of upper layer PDUs;
  Out-of-sequence delivery of upper layer PDUs;
  Error correction through ARQ;
  Concatenation, segmentation and reassembly of RLC SDUs;
  Re-segmentation of RLC data PDUs;
  Reordering of RLC data PDUs;
  Duplicate detection;
  Protocol error detection;
  RLC SDU discard; and
  RLC re-establishment.

The in-sequence delivery function of the NR RLC layer S35 or S60 may denote a function of delivering RLC SDUs received from a lower layer, to a higher layer in order. The in-sequence delivery function of the NR RLC layer S35 or S60 may include a function of reassembling RLC SDUs segmented from an RLC SDU and delivering the RLC SDUs when the segmented RLC SDUs are received, a function of reordering received RLC PDUs on an RLC SN or PDCP SN basis, a function of recording missing RLC PDUs by reordering the order, a function of reporting a status of the missing RLC PDUs to a transmitter, and a function of requesting to retransmit the missing RLC PDUs. The in-sequence delivery function of the NR RLC layer S35 or S60 may include a function of delivering only RLC SDUs previous to a missing RLC SDU, to a higher layer in order, when the missing RLC SDU exists, or a function of delivering all RLC SDUs received before a timer is started, to a higher layer in order, even when a missing RLC SDU exists, when a certain timer is expired.

Alternatively, the in-sequence delivery of the NR RLC layer S35 or S60 may include a function of delivering all RLC SDUs currently received to the higher layer in order, when a certain timer is expired despite of a missing RLS SDU. Further, the RLC PDUs may be processed in order of reception (in order of arrival regardless of sequence numbers) and the RLC PDUs may be delivered to the NR PDCP layer S30 or S65 out of order (out-of sequence delivery), and segments to be received or stored in a buffer may be reassembled into a whole RLC PDU and processed, the RLC PDU may be delivered to the NR PDCP layer S30 or S65. The NR RLC layer S35 or S60 may not have the concatenation, and the concatenation may be performed by the NR MAC layer S40 or S55 or be replaced with multiplexing of the NR MAC layer S40 or S55.

The out-of-sequence delivery of the NR RLC layer S35 or S60 denotes a function of delivering RLC SDUs received from a lower layer immediately to a higher layer regardless of order, and may include a function of reassembling and delivering segmented and received RLC SDUs when one RLC SDU is segmented into several RLC SDUs, and a function of recording missing RLC PDUs by storing RLC SN or PDCP SN and reordering received RLC PDUs.

The NR MAC layer S40 or S55 may be connected to multiple NR RLC layers S35 or S60 configured for a single UE, and main functions of the NR MAC layer S40 or S55 may include at least some of the following functions.
  Mapping between logical channels and transport channels;
  Multiplexing/demultiplexing of MAC SDUs;
  Scheduling information reporting;
  Error correction through HARQ;
  Priority handling between logical channels of one UE;
  Priority handling between UEs by means of dynamic scheduling;
  MBMS identification;
  Transport format selection; and
  Padding.

PHY layer S45 or S50 may channel-code and modulate higher layer data into OFDM symbols and transmit the OFDM symbols through a radio channel, or demodulate OFDM symbols received through a radio channel and channel-decode and deliver the OFDM symbols to a higher layer.

The radio protocol architecture may have various detailed structures depending on a carrier (or cell) operating scheme. For example, when the base station transmits data to the UE based on a single carrier (or cell), the base station and the UE use a protocol architecture having a single structure per layer, as indicated by a reference numeral 1810 of FIG. 18. On the other hand, when the base station transmits data to the UE based on CA using multiple carriers in a single transmission and reception point (TRP), the base station and the UE use a protocol architecture of having a single structure up to an RLC layer but multiplexing a PHY layer via an MAC layer, as indicated by a reference numeral 1820. As another example, when the base station transmits data to the UE, based on DC using multiple carriers in multi-TRP, the base station and the UE use a protocol architecture of having a single structure up to an RLC layer but multiplexing a PHY layer via an MAC layer, as indicated by a reference numeral 1830.

Referring to the descriptions about the PDCCH and beam configuration, the current Rel-15 and Rel-16 NR do not support PDCCH repetitive transmission, and thus it is difficult to achieve required reliability in a scenario that requires high reliability, such as ultra reliable low latency communications (URLLC). In the disclosure, PDCCH reception reliability of a UE may be increased by providing a PDCCH repetitive transmission method through multi-TRP. Details thereof will be described in following embodiments of the disclosure.

The content of the disclosure may be applied to at least one of a frequency division duplex (FDD) system or a time division duplex (TDD) system. However, this is only an example, and the content of the disclosure may also be applied to a cross division duplex system in which the FDD and TDD systems are combined. Hereinafter, higher signaling (o higher layer signaling) in the disclosure denotes a method of transmitting a signal from a base station to a UE by using a downlink data channel of a physical layer or from a UE to a base station by using an uplink data channel of a physical layer, and may be referred to as RRC signaling, PDCP signaling, or MAC CE.

In the disclosure, a UE may determine whether to apply cooperative communication based on whether PDCCH(s) for allocating a PDSCH to which cooperative communication is applied have a specific format, whether the PDCCH(s) for allocating the PDSCH to which cooperative communication is applied include a specific indicator indicating whether to apply cooperative communication, or whether the PDCCH(s) for allocating the PDSCH to which cooperative communication are scrambled with a specific RNTI, or by using various methods, such as assuming cooperative communication application in a specific occasion indicated by a higher layer. Hereinafter, for convenience of description, a case where a UE receives a PDSCH to which cooperative communication is applied based on similar conditions as above will be referred to as non-coherent joint transmission (NC-JT) case.

Hereinafter, determining a priority between A and B in embodiments of the disclosure may be variously described as selecting a higher priority according to a pre-determined priority rule and performing an operation corresponding to the higher priority, or omitting or dropping an operation having a lower priority.

Hereinafter, the above examples will be described in through a plurality of embodiments of the disclosure, but the embodiments of the disclosure are not independent and one or more embodiments of the disclosure may be applied simultaneously or in combination.

[Regarding NC-JT]

According to an embodiment of the disclosure, NC-JT may be used for a UE to receive a PDSCH from multi-TRP.

Unlike an existing communication system, a 5G wireless communication system may support not only a service requiring a high data rate, but also both a service having a very short transmission latency and a service requiring high connection density. Cooperative communication (coordinated transmission) between cells, TRPs, and/or beams in a wireless communication network including a plurality of cells, TRPs, or beams may satisfy various service requirements by efficiently performing inter-cell, TRP, and/or beam interference control or by increasing strength of a signal received by the UE.

JT is one of representative transmission technologies for the cooperative communication, and is a technology for increasing the strength or throughput of signal received by the UE, by transmitting the signal to the UE via a plurality of different cells, TRPs, and/or beams. Characteristics of channels between the UE and each cell, TRP, and/or beam may largely vary, and in particular, NC-JT supporting non-coherent precoding between cells, TRPs and/or beams may require individual precoding, MCS, resource allocation, or TCI indication, according to channel characteristics for each link between the UE and cell, TRP, and or beam.

NC-JT may be applied to at least one channel from among PDSCH, PDCCH, PUSCH, and PUCCH. During PDSCH transmission, transmission information, such as precoding, MCS, resource allocation, and TCI, is indicated through downlink DCI, and for NC-JT, the transmission information is independently indicated for each cell, TRP, and/or beam. This is a main factor for increasing payload required for downlink DCI transmission, and may adversely affect reception performance of a PDCCH transmitting DCI. Accordingly, in NC-JT, it is necessary to carefully design tradeoff between a DCI amount and control information reception performance for JT support of a PDSCH.

Figure 19:
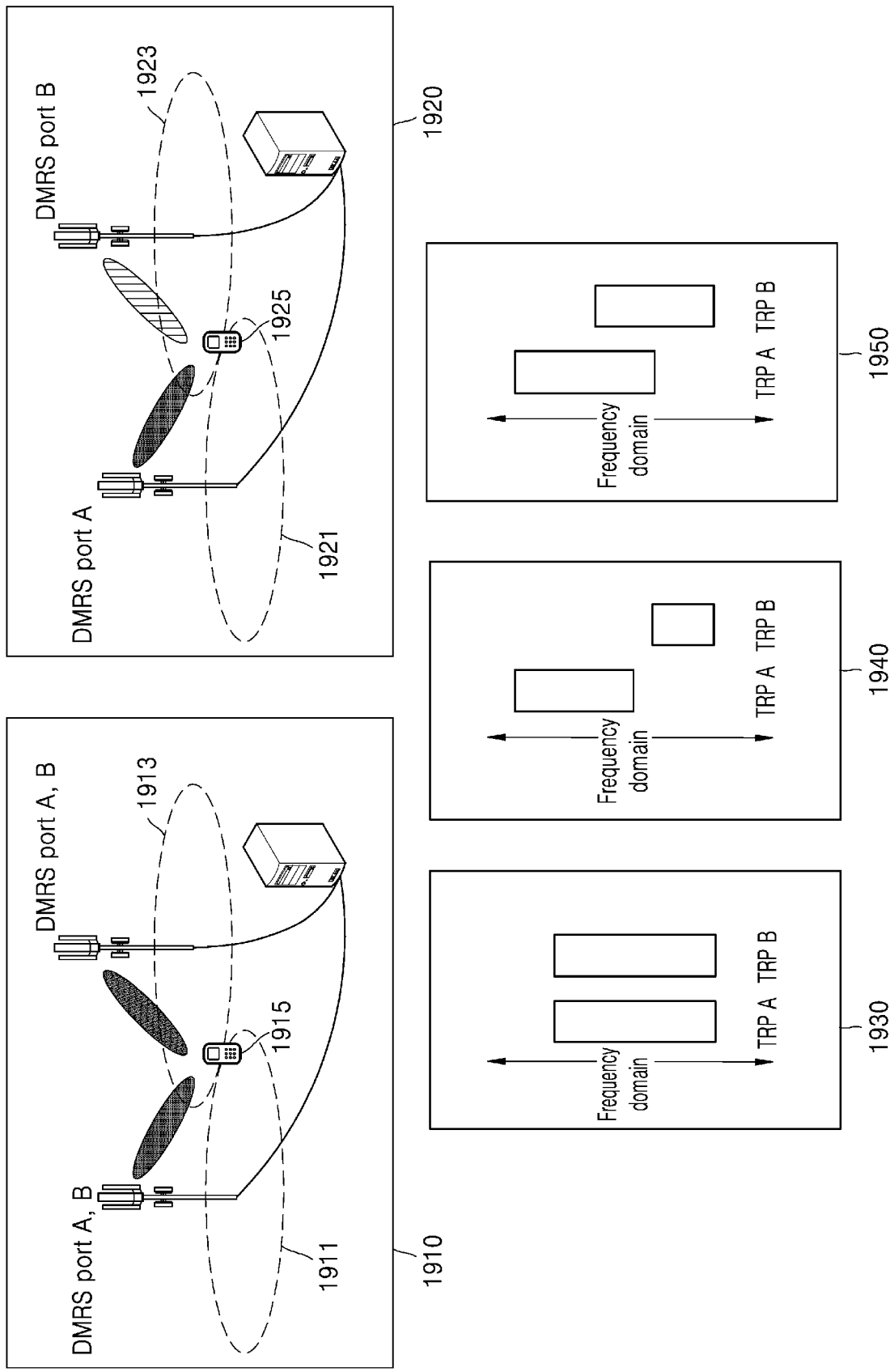
FIG. 19 illustrates a diagram of an example of an antenna port configuration and resource allocation for cooperative communication in a wireless communication system according to an embodiment of the disclosure.

FIG. 19 illustrates a diagram of an example of an antenna port configuration and resource allocation for transmitting PDSCH by using cooperative communication in a wireless communication system according to an embodiment of the disclosure.

Referring to FIG. 19, examples for PDSCH transmission are described for each scheme of JT, and examples for allocating a radio resource for each TRP are illustrated.

In FIG. 19, an example 1910 of coherent-JT (C-JT) supporting coherent precoding between cells, TRPs, and/or beams is illustrated.

In C-JT, single piece of data (PDSCH) is transmitted from a TRP A 1911 and a TRP B 1913 to a UE 1915, and a plurality of TRPs perform joint precoding. This may indicate that a DMRS is transmitted through same DMRS ports for the TRP A 1911 and TRP B 1913 to transmit a same PDSCH. For example, the TRP A 1911 and TRP B 1913 may each transmit the DMRS to the UE 1915 through a DMRS port A and a DMRS port B. In this case, the UE 1915 may receive one piece of DCI for receiving one PDSCH demodulated based on the DMRS transmitted through the DMRS ports A and B.

Also, FIG. 19 illustrates an example 1920 of NC-JT supporting NC precoding between cells, TRPs, and/or beams to for PDSCH transmission. This may indicate that a DMRS is transmitted through different DMRS ports for a TRP A 1921 and TRP B 1923 to transmit different PDSCHs. For example, the TRP A 1921 may transmit the DMRS to a UE 1925 through a DMRS port A, and the TRP B 1923 may transmit the DMRS to the UE 1925 through a DMRS port B. The UE 1925 may receive DCI for receiving each PDSCH demodulated based on the DMRS transmitted through the DMRS ports A and B.

In NC-JT, a PDSCH is transmitted to the UE 1925 for each cell, TRP, and/or beam, and individual precoding may be applied to each PDSCH. Each cell, TRP, and/or beam may transmit, to the UE 1925, different PDSCHs or different PDSCH layers to improve throughput relative to single cell, TRP, and/or beam transmission. Also, each cell, TRP, and/or beam may repeatedly transmit the same PDSCH to the UE 1925 to improve reliability relative to the single cell, TRP, and/or beam transmission. For convenience of description, a cell, TRP, and/or beam will be collectively referred to as a TRP below.

In FIG. 19, various radio resource allocations may be considered for the PDSCH transmission, for example, a case 1930 where frequency and time resources used by a plurality of TRPs are all same, a case 1940 where frequency and time resources used by a plurality of TRPs do not overlap, and a case 1950 where frequency and time resources used by a plurality of TRPs partially overlap.

To support NC-JT, pieces of DCIs of various forms, structures, and relationships may be considered to simultaneously allocate a plurality of PDSCHs to one UE.

Figure 20:
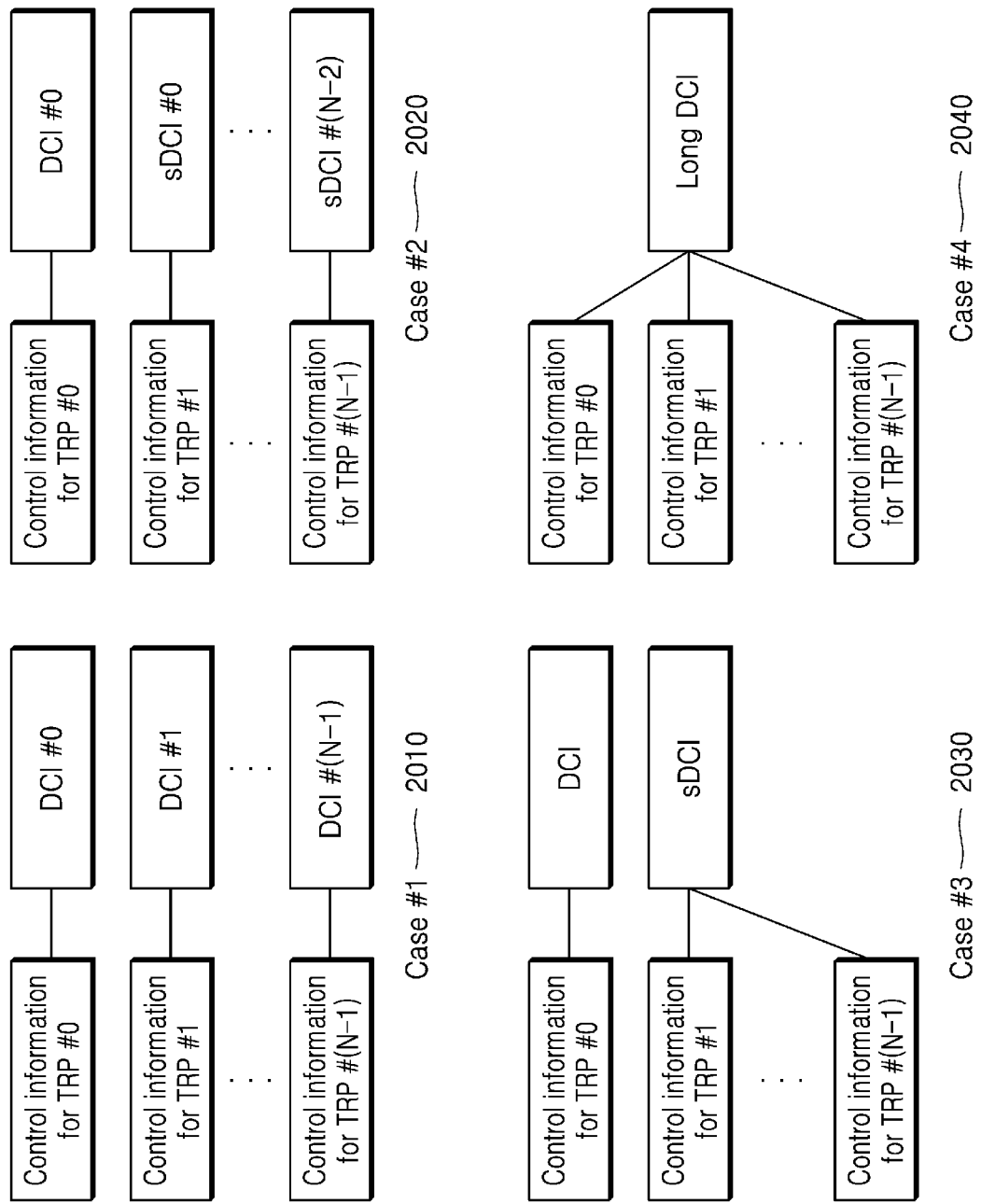
FIG. 20 illustrates a diagram of an example of a configuration of downlink control information (DCI) for cooperative communication in a wireless communication system according to an embodiment of the disclosure.

FIG. 20 illustrates a diagram of an example of a configuration of DCI for NC-JT, in which each TRP transmits, to a UE, different PDSCHs or different PDSCH layers, in a wireless communication system, according to an embodiment of the disclosure.

Referring to FIG. 20, a case #1 2010 is an example in which, while different N−1 PDSCHs are transmitted from additional N−1 TRPs (TRS #1 to TRP #N−1) except a serving TRP (TRP #0) used during single PDSCH transmission, control information regarding the PDSCHs transmitted from the additional N−1 TRPs is transmitted independently from control information regarding the PDSCH transmitted from the serving TRP. In other words, the UE may obtain the control information regarding the PDSCHs transmitted from the different TRPs (TRP #0 to TRP #N−1), via independent pieces of DCI (DCI #0 to DCI #N−1. Formats of the independent pieces of DCI may be the same or different from each other, and payloads of the pieces of DCI may be the same or different from each other. In the case #1 2010, each PDSCH control or a degree of freedom of allocation may be fully guaranteed, but reception performance may deteriorate due to an occurrence of coverage difference for each piece of DCI when the pieces of DCI are transmitted from different TRPs.

A case #2 2020 is an example in which, while the different N−1 PDSCHs are transmitted from the additional N−1 TRPs (TRS #1 to TRP #N−1) except the serving TRP (TRP #0) used during the single PDSCH transmission, the pieces of control information (DCI) regarding the PDSCHs transmitted from the additional N−1 TRPs are each transmitted and each piece of DCI (sDCI #0 through sDCI #(N−2)) is dependent on the control information (DCI #0) regarding the PDSCH transmitted from the serving TRP.

For example, the DCI #0 that is the control information regarding the PDSCH transmitted from the serving TRP (TRP #0) includes all information elements of a DCI format 1_0, a DCI format 1_1, and a DCI format 1_2, but shortened DCI (sDCI) (sDCI #0 to sDCI #N−2) that is control information regarding the PDSCHs transmitted from the cooperative TRPs (TRP #1 to TRP #N−1) may include some of the information elements of the DCI format 1_0, the DCI format 1_1, and the DCI format 1_2. Accordingly, because the sDCI transmitting the control information regarding the PDSCHs transmitted from the cooperative TRPs has a small payload compared to normal DCI (nDCI) transmitting the control information regarding the PDSCH transmitted from the serving TRP, it is possible for the sDCI to include reserved bits compared to the nDCI.

The case #2 2020 may have limited PDSCH control or degree of freedom of allocation according to content of the information elements included in the sDCI, but may have a low probability of an occurrence of a coverage difference for each piece of DCI because reception performance of the sDCI is superior compared to the nDCI.

In FIG. 20, a case #3 2030 is an example in which, while the different N−1 PDSCHs are transmitted from the additional N−1 TRPs (TRS #1 to TRP #N−1) except the serving TRP (TRP #0) used during the single PDSCH transmission, one piece of control information ((secondary DCI (sDCI)) regarding the PDSCHs of the additional N−1 TRPs is transmitted and the DCI is dependent on the control information (DCI) regarding the PDSCH transmitted from the serving TRP.

For example, the DCI #0 that is the control information regarding the PDSCH transmitted from the serving TRP (TRP #0) includes all information elements of the DCI format 1_0, the DCI format 1_1, and the DCI format 1_2, and for the control information regarding the PDSCHs transmitted from the cooperative TRPs (TRP #1 to TRP #N−1), it is possible to gather some of the information elements of the DCI format 1_0, the DCI format 1_1, and the DCI format 1_2 to one piece of sDCI. For example, the sDCI may include at least one piece of information of the cooperative TRPs, from among frequency domain resource assignment, time domain resource assignment, and HARQ-related information, such as MSC. In addition, information not included in the sDCI, such as a BWP indicator or a carrier indicator, may follow the DCI (DCI #0, normal DCI, nDCI) of the serving TRP.

The case #3 2030 of FIG. 20 may have limited PDSCH control or degree of freedom of allocation according to content of the information elements included in the sDCI, but reception performance of the sDCI may be controlled and complexity of DCI blind decoding of the UE may be low compared to the case #1 2010 and case #2 2020.

In FIG. 20, a case #4 2040 is an example in which, while the different N−1 PDSCHs are transmitted from the additional N−1 TRPs (TRS #1 to TRP #N−1) except the serving TRP (TRP #0) used during the single PDSCH transmission, the control information regarding the PDSCHs transmitted from the additional N−1 TRPs is transmitted on a same DCI (long DCI) as the control information regarding the PDSCH transmitted from the serving TRP. In other words, the UE may obtain, via single DCI, the control information regarding the PDSCHs transmitted from the different TRPs (TRP #0 to TRP #N−1). In the case #4 2040, complexity of DCI blind decoding of the UE may not be high, but PDSCH control or a degree of freedom of allocation may be low, for example, the number of cooperative TRPs may be limited, according to long DCI payload limitation.

In the description and embodiments of the disclosure below, the sDCI may denote various types of auxiliary DCI, such as shortened DCI, secondary DCI, and normal DCI (the DCI format 1_0 to 1_1 described above) including PDSCH control information transmitted from a cooperative TRP, and unless a limitation is specifically stated, the description may be similarly applied to the various types of auxiliary DCI.

In the description and embodiments of the disclosure below, the case #1 2010, the case #2 2020, and the case #3 2030 using one or more pieces of DCI (PDCCHs) to support NC-JT may be distinguished as multiple PDCCH-based NC-JT, and the case #4 2040 using a single piece of DCI (PDCCH) to support NC-JT may be distinguished as single PDCCH-based NC-JT. In multiple PDCCH-based PDSCH transmission, a CORESET scheduling DCI of the serving TRP (TRP #0) and a CORESET scheduling DCI of the cooperative TRPs (TRP #1 to TRP #N−1) may be distinguished. To distinguish the CORESETs, a method of distinguishing the CORESETs via a higher layer indicator for each CORESET, a method of distinguishing the CORESETs through a beam configuration for each CORESET, or the like may be used. Also, in the single PDCCH-based NC-JT, instead of scheduling a plurality of PDSCHs by a single piece of DCI, a single PDSCH including a plurality of layers is scheduled, and the plurality of layers may be transmitted from a plurality of TRPs. Here, a connection relationship between the layer and the TRP transmitting the layer may be indicated through a TCI indication regarding the layer.

In embodiments of the disclosure, a "cooperative TRP" may be replaced by any one of various terms, such as "cooperative panel," a "cooperative beam," or the like, when actually applied.

In the embodiments of the disclosure, "when NC-JT is applied" may be variously interpreted according to situations, for example, "when a UE receives one or more PDSCHs simultaneously from one BWP," "when a UE receives a PDSCH based on two or more TCIs simultaneously from one BWP," and "when a PDSCH received by a UE is associated with one or more demodulation reference signal (DMRS) port groups," but is used in one expression for convenience of description.

In the disclosure, a radio protocol architecture for NC-JT may vary depending on a TRP deployment scenario. For example, when there is no or small backhaul delay between the cooperative TRPs, a method (CA-like method) using a structure based on MAC layer multiplexing as indicated by the reference numeral 1820 of FIG. 18 may be used. On the other hand, when the backhaul delay between the cooperative TRPs is too large to be ignored (for example, at least 2 ms is required to exchange information, such as CSI, scheduling, and HARQ-acknowledgement (ACK), between the cooperative TRPs), a method (DC-like method) of securing a robust characteristic regarding a delay by using an independent structure for each TRP from an RLC layer, as indicated by the reference numeral 1830 of FIG. 18, may be used.

The UE supporting C-JT/NC-JT may receive, from a higher layer configuration, C-JT/NC-JT-related parameters or setting values, and set an RRC parameter of the UE, based thereon. For the higher layer configuration, the UE may use a UE capability parameter, for example, tci-StatePDSCH. Here, the UE capability parameter, for example, tci-StatePDSCH, may define TCI states for a purpose of PDSCH transmission. The number of TCI states may be configured to be 4, 8, 16, 32, 64, or 128 in a frequency range 1 (FR1), and may be configured to be 64 or 128 in FR2, and among the configured number, up to 8 states indicatable by 3 bits of a TCI field of DCI may be configured via an MAC CE message. The maximum number 128 denotes a value indicated by maxNumberConfiguredTCIstatesPerCC in the tci-StatePDSCH parameter included in capability signaling of the UE. As such, a series of configuration processes from a higher layer configuration to an MAC CE configuration may be applied to a beamforming indication or beamforming change command for at least one PDSCH in one TRP.

[Multi-DCI-Based Multi-TRP]

According to an embodiment of the disclosure, a multi-DCI-based multi-TRP transmission method will be described. The multi-DCI-based multi-TRP transmission method may configure a downlink control channel for NC-JT based on multiple PDCCHs.

NC-JT based on multiple PDCCHs may include CORESETs or search spaces distinguished according to TRPs, when DCI for scheduling a PDSCH of each TRP is transmitted. The CORESET or search space for each TRP may be configured according to at least one of following cases.

In one example of configuration of a higher layer index for each CORESET, CORESET configuration information configured through a higher layer may include an index value, and a TRP transmitting a PDCCH from a corresponding CORESET may be distinguished by the configured index value for each CORESET. In other words, in a group of CORESETs having a same higher layer index value, it may be considered that a same TRP transmits a PDCCH or that a PDCCH scheduling a PDSCH of a same TRP is transmitted. An index for each CORESET may be referred to as CORESETPoolIndex, and it may be considered that a PDCCH is transmitted from a same TRP for CORESETs in which a same value of CORESETPoolIndex is configured. For a CORESET in which a value of CORESETPoolIndex is not configured, it may be considered that a reference value is configured for CORESETPoolIndex, wherein the reference value may be 0.

In the disclosure, when types of CORESETPoolIndex included in a plurality of CORESETs included in PDCCH-Config that is higher layer signaling exceed 1, i.e., when the CORESETs have different CORESET-PoolIndex, a UE may determine that a base station may use the multi-DCI-based multi-TRP transmission method.

One the other hand, in the disclosure, when types of CORESETPoolIndex included in a plurality of CORESETs included in PDCCH-Config that is higher layer signaling is 1, i.e., when all CORESETs have CORESETPoolIndex of 0 or 1, the UE may determine that the base station does use the multi-DCI-based multi-TRP transmission method, but uses a single TRP.

In another example of configuration of a plurality of PDCCH-Config: A plurality of PDCCH-Config is configured in one BWP, and each PDCCH-Config may include a PDCCH configuration for each TRP. In other words, a list of CORESETs for each TRP and/or a list of search spaces for each TRP may be configured in one PDCCH-Config, and one or more CORESETs and one or more search spaces included in one PDCCH-Config may correspond to a specific TRP.

In yet another example of configuration of CORESET beam/beam group: A TRP corresponding to a CORESET may be distinguished through a beam or beam group configured for each CORESET. For example, when a same TCI state is configured for a plurality of CORESETs, it may be considered that the CORESETs are transmitted through a same TRP or that a PDCCH scheduling a PDSCH of a same TRP is transmitted in the CORESETs.

In yet another example of configuration of search space beam/beam group: A beam or beam group is configured for each search space, and a TRP for each search space may be distinguished through the beam or beam group. For example, when a same beam/beam group or TCI state is configured for a plurality of search spaces, it may be considered that a same TRP transmits a PDCCH in a search space or that a PDCCH scheduling a PDSCH of a same TRP is transmitted in the search space.

By distinguishing the CORESET or search space for each TRP as described above, it is possible to classify PDSCH and HARQ-ACK information for each TRP, and accordingly, it is possible to generate an independent HARQ-ACK codebook for each TRP and use an independent PUCCH resource.

The above configurations may be independent for each cell or BWP. For example, two different values of CORESETPoolIndex may be configured for a PCell, while a value of CORESETPoolIndex may not be configured for a specific SCell. In this case, NC-JT is configured for the PCell, while NC-JT is not configured for the SCell in which the value of CORESETPoolIndex is not configured.

Figure 21:
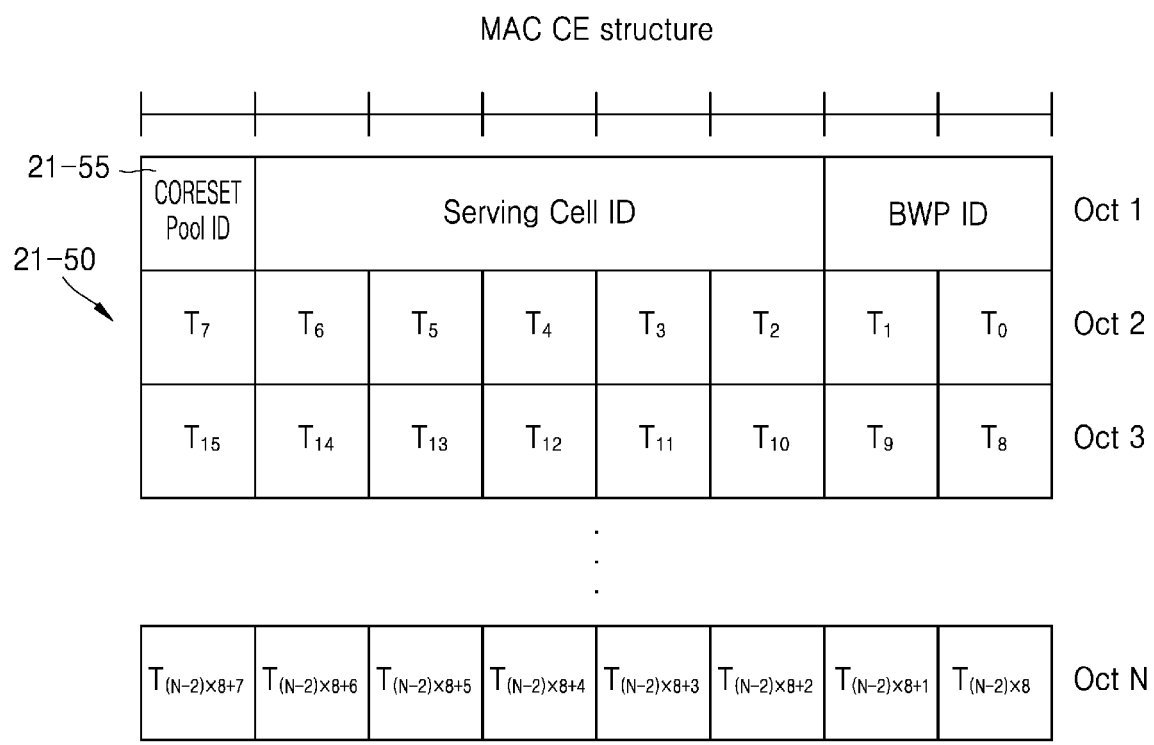
FIG. 21 illustrates a diagram for describing an MAC CE for beam activation of a PDSCH according to an embodiment of the disclosure.

A PDSCH TCI state activation/deactivation MAC-CE applicable to the multi-DCI-based multi-TRP transmission method may be as FIG. 21. Here, a meaning of each field in the MAC CE and a value configurable in each field are as follows.

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;
$T_i$ (TCI state ID): If there is a TCI state with TCI-StateId i as specified in TS 38.331 [5], this field indicates the activation/deactivation status of the TCI state with TCI-StateId i, otherwise MAC entity may ignore the Ti field. The Ti field is set to 1 to indicate that the TCI state with TCI-StateId i may be activated and mapped to the codepoint of the DCI Transmission Configuration Indication field, as specified in TS 38.214 [7]. The Ti field is set to 0 to indicate that the TCI state with TCI-StateId i may be deactivated and is not mapped to the codepoint of the DCI Transmission Configuration Indication field. The codepoint to which the TCI State is mapped is determined by its ordinal position among all the TCI States with Ti field set to 1, i.e., the first TCI State with $T_i$ field set to 1 may be mapped to the codepoint value 0, second TCI State with Ti field set to 1 may be mapped to the codepoint value 1 and so on. The maximum number of activated TCI states is 8;
CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE may be applied for the DL transmission scheduled by CORESET with the CORESET pool ID equal to 1, otherwise, this MAC CE may be applied for the DL transmission scheduled by CORESET pool ID equal to 0. If the coresetPoolIndex is not configured for any CORESET, MAC entity may ignore the CORESET Pool ID field in this MAC CE when receiving the MAC CE. If the Serving Cell in the MAC CE is configured in a cell list that contains more than one Serving Cell, the CORESET Pool ID field may be ignored when receiving the MAC CE.

When a UE is not configured with CORESETPoolIndex for each of all CORESETs in higher layer signaling PDCCH-Config, the UE may ignore a CORESET Pool ID field 21-55 in an MAC CE 21-50. When the UE is capable of supporting the multi-DCI-based multi-TRP transmission method, i.e., when the CORESETs have different CORESETPoolIndex in the higher layer signaling PDCCH-Config, the UE may activate a TCI state in DCI included in a PDCCH transmitted from CORESETs having CORESETPoolIndex that has a same value as the CORESET Pool ID field 21-55 in the MAC CE 21-50. For example, when a value of the CORESET Pool ID field 21-55 in the MAC CE 21-50 is 0, the TCI state in the DCI included in the PDCCH transmitted from the CORESETs having CORESETPoolIndex of 0 may follow activation information of the MAC CE 21-50.

When a base station configures the UE to use the multi-DCI-based multi-TRP transmission method, i.e., when types of CORESETPoolIndex included in the plurality of CORESETs included in the higher layer signaling PDCCH-Config exceed 1, or when the CORESETs have different CORESETPoolIndex, the UE may determine that following restrictions exist for PDSCHs scheduled by the PDCCHs in two CORESETs having different CORESETPoolIndex.

1) When the PDSCHs indicated by the PDCCHs in the two CORESETs having different CORESETPoolIndex completely or partially overlap, the UE may apply TCI states indicated by the PDCCHs to different code division multiplexing (CDM) groups. In other words, two or more TCI states may not be applied to one CDM group.

2) When the PDSCHs indicated by the PDCCHs in the two CORESETs having different CORESETPoolIndex completely or partially overlap, the UE may expect that the actual numbers of front loaded DMRS symbols of each PDSCH, the actual numbers of additional DMRS symbols, actual locations of DMRS symbols, and DMRS types are not different from each other.

3) The UE may expect that BWPs indicated by the PDCCHs in the two CORESETs having different CORESETPoolIndex are the same, and that subcarrier spacings are also the same.

4) The UE may expect pieces of information on the PDSCHs scheduled by the PDCCHs in the two CORESETs having different CORESETPoolIndex are completely included in the respective PDCCHs.

[Single-DCI-Based Multi-TRP]

According to an embodiment of the disclosure, a single-DCI-based multi-TRP transmission method will be described. The single-DCI-based multi-TRP transmission method may configure a downlink control channel for NC-JT based on a single PDCCH.

In the single-DCI-based multi-TRP transmission method, a PDSCH transmitted by a plurality of TRPs may be scheduled by one piece of DCI. Here, the number of TCI states may be used to indicate the number of TRPs transmitting the PDSCH. In other words, when the number of TCI states indicated by the DCI scheduling the PDSCH is 2, single PDCCH-based NC-JT may be performed, and when the number thereof is 1, single TRP transmission may be performed. The TCI states indicated by the DCI may correspond to one or two of TCI states activated through an MAC CE. When the TCI states of the DCI correspond to two TCI states activated through the MAC CE, a correlation between a TCI codepoint indicated by the DCI and the TCI states activated through the MAC CE is established, and there may be two TCI states activated through the MAC CE, which correspond to the TCI codepoint.

As another example, at least one of all codepoints in a TCI state field in the DCI indicate two TCI states, the UE may consider that the base station may perform transmission based on the single-DCI-based multi-TRP transmission method. Here, the at least one codepoint indicating the two TCI states in the TCI state field may be activated through an enhanced PDSCH TCI state activation/deactivation MAC CE.

Figure 22:
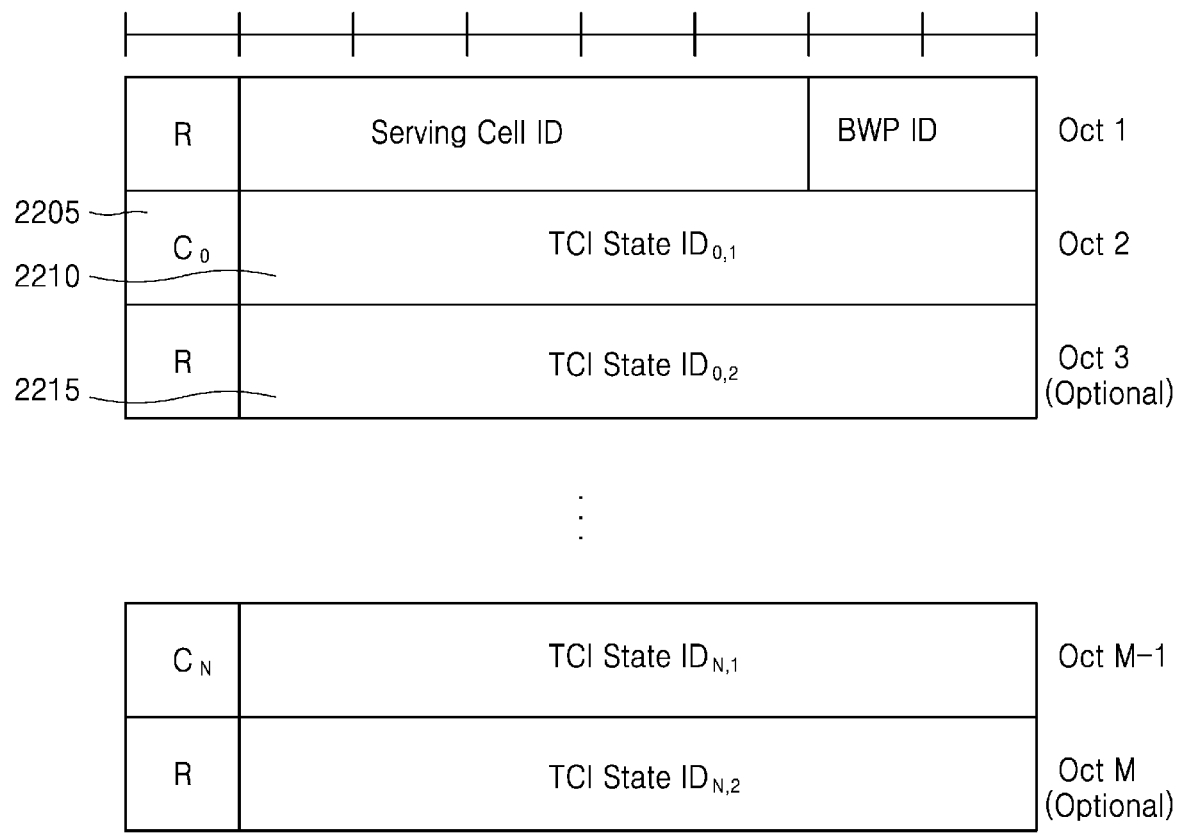
FIG. 22 illustrates a diagram of an enhanced PDSCH TCI state activation/deactivation MAC CE structure according to an embodiment of the disclosure.

FIG. 22 illustrates a diagram of an enhanced PDSCH TCI state activation/deactivation MAC CE structure. A meaning of each field in an MAC CE and a value configurable in each field are as follows.

Serving Cell ID: This field indicates the identity of the Serving Cell for which the MAC CE applies. The length of the field is 5 bits. If the indicated Serving Cell is configured as part of a simultaneousTCI-UpdateList1 or smultaneousTCI-UpdateList2 as specified in TS 38.331 [5], this MAC CE applies to all the Serving Cells configured in the set simultaneoasTCI-UpdatList1 or smultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits;

$C_i$: This field indicates whether the octet containing TCI state ID,2 is present. If this field is set to "1", the octet containing TCI state $ID_{i,2}$ is present, If this field is set to "0", the octet containing TCI state $ID_{i,2}$ is not present;

TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{1,2}$ is optional based on the indication of the Ci field. The maximum number of activated TCI codepoint is 8 and the maximum number of TCI states mapped to a TCI codepoint is 2.

R: Reserved bit, set to "0".

In FIG. 22, when a value of a Co field 2205 is 1, a corresponding MAC CE may include, in addition to a TCI state $ID_{0,1}$ field 2210, a TCI state $ID_{0,2}$ 2215. This indicates that a TCI state $ID_{0,1}$ and a TCI state $ID_{0,2}$ are activated for a $0^{th}$ codepoint of a TCI state field included in DCI, and when a base station indicates the corresponding codepoint to a UE, the UE may receive an indication of two TCI states. When the value of the Co field 2205 is 0, the MAC CE is unable to include the TCI state $ID_{0,2}$ field 2215, and this indicates that one TCI state corresponding to the TCI state $ID_{0,1}$ is activated for the $0^{th}$ codepoint of the TCI state field included in the DCI.

The above configuration may be independent for each cell or BWP. For example, there may be up to two activated TCI states corresponding to one TCI codepoint in a PCell, whereas there may be up to one activated TCI state corresponding to one TCI codepoint in a specific SCell. In this case, it may be considered that NC-JT is configured in the PCell, but NC-JT is not configured in the SCell.

[Single-DCI-based Multi-TRP PDSCH Repetitive Transmission Scheme (time division multiplexing (TDM)/frequency division multiplexing (FDM)/space division multiplexing (SDM)) Distinguishing Method]

Next, a method of distinguishing single-DCI-based multi-TRP PDSCH repetitive transmission schemes will be described. A UE may receive, from a base station, an instruction of different single-DCI-based multi-TRP PDSCH repetitive transmission schemes (for example, TDM, FDM, and SDM), according to a value indicated by a DCI field and a higher layer signaling configuration. Table 32 below indicates a method of distinguishing between single or multi-TRP-based schemes indicated to the UE, according to a value of a specific DCI field and a higher layer signaling configuration.

TABLE 32

| Combination | Number of TCI States | Number of CDM Groups | repetitionNumber Configuration and Indication Condition | Regarding repetitionScheme Configuration | Transmission Scheme indicated to UE |
|---|---|---|---|---|---|
| 1 | 1 | >1 | Condition 2 | Not configured | Single-TRP |
| 2 | 1 | >1 | Condition 2 | Configured | Single-TRP |
| 3 | 1 | >1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

In Table 32, each column may be described as below.

Number of TCI states (second column): Denotes the number of TCI states indicated by a TCI state field in DCI, and may be one or two.

Number of CDM groups (third column): Denotes the number of different CDM groups of DMRS ports indicated by an antenna port field in the DCI. The number may be 1, 2, or 3.

repetitionNumber configuration and indication condition (fourth column): There may be three conditions depending on whether repetitionNumber is configured for all time domain resource allocation (TDRA) entries indicated by a time domain resource allocation field in the DCI, and whether an actually indicated TDRA entry includes a configuration of repetitionNumber.

Condition 1: When at least one of all TDRA entries indicated by the time domain resource allocation field includes the configuration for repetitionNumber, and the TDRA entry indicated by the time domain resource allocation field in the DCI includes the configuration for repetitionNumber greater than 1.

Condition 2: When at least one of all TDRA entries indicated by the time domain resource allocation field includes the configuration for repetitionNumber, and the TDRA entry indicated by the time domain resource allocation field in the DCI does not include the configuration for repetitionNumber.

Condition 3: When all TDRA entries indicated by the time domain resource allocation field do not include the configuration for repetitionNumber.

Regarding repetitionScheme configuration (fifth column): Denotes whether higher layer signaling repetitionScheme is configured. The higher layer signaling repetitionScheme may be configured with one of "tdmSchemeA," "fdmSchemeA," and "fdmSchemeB".

Transmission scheme indicated to UE (sixth column): Denotes single or multi-TRP schemes indicated according to combinations (first column) in Table 32.

Single-TRP: Denotes single TRP-based PDSCH transmission. When the UE is configured with pdsch-AggegationFactor in a higher layer signaling PDSCH-config, the UE may be scheduled with single TRP-based PDSCH repetitive transmission by the configured number of times. Otherwise, the UE may be scheduled with single TRP-based PDSCH single transmission.

Single-TRP TDM scheme B: Denotes PDSCH repetitive transmission based in time resource division in single TRP. According to Condition 1 above regarding repetitionNumber, the UE repeatedly transmits a PDSCH on a time resource (by the number of slots of the number of times of repetitionNumber greater than 1 configured in the TDRA indicated by the time domain resource allocation field. Here, a starting symbol and symbol length of the PDSCH indicated by the TDRA entry are equally applied for each slot by the number of times of repetitionNumber, and a same TCI state is applied for each PDSCH repetitive transmission. This scheme is similar to a slot aggregation scheme in that the PDSCH repetitive transmission is performed between slots on a time resource, but is different from the slot aggregation scheme in that whether to indicate repetitive transmission is dynamically determined based on the time domain resource allocation field in the DCI.

Multi-TRP SDM: Denotes a multi-TRP-based spatial resource division PDSCH transmission scheme. This is a method of dividing and receiving a layer from each TRP, and although the multi-TRP SDM is not a repetitive transmission scheme, reliability of PDSCH transmission may be increased as the number of layers is increased to decrease a coding rate. The UE may apply two TCI state indicated through the TCI state field in the DCI respectively to two CDM groups indicated by the base station to receive the PDSCH.

Multi-TRP FDM scheme A: Denotes a multi-TRP-based frequency resource division PDSCH transmission scheme, and although this scheme is not repetitive transmission like the multi-TRP SDM because there is one PDSCH transmission location (occasion), a frequency resource amount is increased to decrease a coding rate, and thus transmission reliability may be high. In the multi-TRP FDM scheme A, two TCI states indicated through the TCI state field in the DCI may be respectively applied to frequency resources that do not overlap each other. When a PRB bundling size is determined to be wideband and in a case where the number of RBs indicated by a frequency domain resource allocation field is N, the UE applies a first TCI state to first ceil(N/2) RBs, and applies a second TCI state to remaining floor(N/2) RBs. Here, ceil(.) and floor(.) are each an operator indicating rounding up or rounding down of a first decimal point. When the PRB bundling size is determined to be 2 or 4, the first TCI state is applied to even PRGs and the second TCI state is applied to odd$^{th}$ PRGs.

Multi-TRP FDM scheme B: Denotes a multi-TRP-based frequency resource division PDSCH repetitive transmission scheme, and a PDSCH may be repeatedly transmitted at each of two PDSCH transmission locations (occasions). In the multi-TRP FDM scheme B, like the multi-TRP FDM scheme A, two TCI states indicated through the TCI state field in the DCI may be respectively applied to frequency resources that do not overlap each other. When a PRB bundling size is determined to be wideband and in a case where the number of RBs indicated by a frequency domain resource allocation field is N, the UE applies a first TCI state to first ceil(N/2) RBs, and applies a second TCI state to remaining floor(N/2) RBs. Here, ceil(.) and floor(.) are each an operator indicating rounding up or rounding down of a first decimal point. When the PRB bundling size is determined to be 2 or 4, the first TCI state is applied to even$^{th}$ PRGs and the second TCI state is applied to odd$^{th}$ PRGs.

Multi-TRP TDM scheme A: Denotes a PDSCH repetitive transmission scheme in a multi-TRP-based time resource division slot. The UE has two PDSCH transmission locations (occasions) in one slot, and a first reception location may be determined based on a starting symbol and symbol length of the PDSCH indicated through the time domain resource allocation field in the DCI. A starting symbol at a second reception location of the PDSCH may be a location to which a symbol offset is applied by higher layer signaling StartingSymbolOffsetK from a last symbol of the first transmission location, and the transmission location may be determined by a symbol length indicated therefrom. When the higher layer signaling StartingSymbolOffsetK is not configured, the symbol offset may be considered to be 0.

Multi-TRP TDM scheme B: Denotes a PDSCH repetitive transmission scheme between multi-TRP-based time resource division slots. The UE has one PDSCH transmission location (occasion) in one slot, and may receive repetitive transmission based on a starting symbol and symbol length of a same PDSCH during slots equal to the number of times of repetitionNumber indicated through the time domain resource allocation field in the DCI. When repetitionNumber is 2, the UE may receive PDSCH repetitive transmissions of first and second slots by applying first and second TCI states, respectively. When repetitionNumber is greater than 2, the UE may use different TCI state application methods depending on how higher layer signaling tciMapping is configured. When tciMapping is configured to cyclicMapping, the first and second TCI states are respectively applied to first and second PDSCH transmission locations, and such a TCI state application method is identically applied to remaining PDSCH transmission locations. When tciMapping is configured to sequenticalMapping, the first TCI state is applied to first and second PDSCH transmission locations and the second TCI state is applied to third and fourth PDSCH transmission locations, and such a TCI state application method is identically applied to remaining PDSCH transmission locations.

Referring to the descriptions about the PDCCH transmission and reception configuration and transmission beam configuration, the current Rel-15/16 NR does not support PDCCH repetitive transmission, and thus it may be difficult to achieve required reliability in a scenario that requires high reliability, such as URLLC. Meanwhile, in Rel-17 FeMIMO, a method of improving reception reliability of PDCCH through repetitive transmission of PDCCH is being standardized. Representative PDCCH repetitive transmission methods include a non-single frequency network (non-SFN) method of separating time or frequency resources and repeatedly transmitting CORESETs respectively connected to a plurality of search spaces explicitly connected through a higher layer signaling, through different TRPs, and an SFN method of repeatedly transmitting one CORESET by configuring a plurality of TCI states. Regarding the non-SFN method, different CORESETs may be respectively connected to the plurality of search spaces explicitly connected through higher layer signaling, or a same CORESET may be connected to all search spaces.

As described above with reference to the operation related to power headroom, a type (actual PHR or virtual PHR) of calculating power headroom information is determined by a UE according to a PDCCH monitoring occasion where a first DCI format scheduling a PUSCH for PHR is detected. However, when repetitive transmission is performed to improve reception reliability of a PDCCH, there may be a plurality of PDCCH monitoring occasions. It may be vague whether the first DCI format is based on simply a PDCCH received by the UE a first time, based on an operation of receiving all PDCCH repetitive transmissions, or based on an operation of successfully decoding a PDCCH. Also, for activated supporting cells, DCI for uplink signal transmission of each supporting cell may also be repeatedly transmitted. Here, a method of determining a power headroom calculation type of the UE may be required depending on whether all PDCCH repetitive transmissions are received or some of PDCCH repetitive transmissions are received before a timeline for determining the power headroom calculation type. Thus, in the disclosure, a method for PHR according to PDCCH repetitive transmission considering multi-TRP will be described in detail.

Hereinafter, for convenience of description, higher layer/L1 parameters, such as a TCI state and spatial relation information, or cells, transmission points, panels, beams, and/or transmission directions distinguishable by indicators, such as cell ID, TRP ID, and panel ID, may be collectively described as TRPs. Accordingly, for actual application, the TRP may be suitably replaced by one of the above terms.

In the disclosure, a UE may determine whether to apply cooperative communication based on whether PDCCH(s) for allocating a PDSCH to which cooperative communication is applied have a specific format, whether the PDCCH(s) for allocating the PDSCH to which cooperative communication is applied include a specific indicator indicating whether to apply cooperative communication, or whether the PDCCH(s) for allocating the PDSCH to which cooperative communication are scrambled with a specific RNTI, or by using various methods, such as assuming cooperative communication application in a specific occasion indicated through higher layer signaling. Hereinafter, for convenience of description, a case where a UE receives a PDSCH to which cooperative communication is applied based on similar conditions as above will be referred to as an NC-JT case.

Hereinafter, while describing embodiments of the disclosure, higher layer signaling may be signaling corresponding to at least one of or a combination of signaling methods below:

Master information block (MIB);
System information block (SIB) or SIB X (X=1, 2, . . . );
Radio resource control (RRC); and
Medium access control (MAC) control element (CE).

Also, L1 signaling may be signaling corresponding to at least one of or a combination of signaling methods using following physical layer channels or signaling:

Physical downlink control channel (PDCCH);
Downlink control information (DCI);
UE-specific DCI;
Group common DCI;
Common DCI;
Scheduling DCI (for example, DCI used to schedule downlink or uplink data);
Non-scheduling DCI (for example, DCI not for scheduling downlink or uplink data);
Physical uplink control channel (PUCCH); and
Uplink control information (UCI).

Hereinafter, determining a priority between A and B in embodiments of the disclosure may be variously described as selecting a higher priority according to a pre-determined priority rule and performing an operation corresponding to the higher priority, or omitting or dropping an operation having a lower priority.

Hereinafter, the above examples will be described in through a plurality of embodiments of the disclosure, but the embodiments of the disclosure are not independent and one or more embodiments of the disclosure may be applied simultaneously or in combination.

First Embodiment of Disclosure: Multi-TRP-Based PDCCH Repetitive Transmission

According to an embodiment of the disclosure, PDCCH repetitive transmission considering multi-TRP will be described. There may be various methods for the PDCCH repetitive transmission considering multi-TRP, depending on how each TCI state to be applied during PDCCH transmission is applied to various parameters described above used for the PDCCH transmission. For example, the various parameters used for the PDCCH transmission, to which different TCI states are to be applied, may include CCE, a PDCCH candidate group, a CORESET, and a search space. During the PDCCH repetitive transmission considering multi-TRP, soft combining, selection, or the like may be considered as a reception method of a UE.

There may be five methods as below for the PDCCH repetitive transmission through multi-TRP, and a base station may configure the UE with at least one of the five methods through higher layer signaling, indicate at least one of the five methods to the UE through L1 signaling, or configure and indicate at least one of the five methods to the UE through a combination of higher layer signaling and L1 signaling.

[Method 1-1] Plurality of PDCCH Repetitive Transmissions Having Same Payload

Method 1-1 is a method of repeatedly transmitting a plurality of pieces of control information having a same DCI format and payload. Each piece of control information may include information for scheduling a PDSCH that is repeatedly transmitted, for example, {PDSCH #1, PDSCH #2, PDSCH #Y} that are repeatedly transmitted over a plurality of slots. The same payload of the pieces of control information, which are repeatedly transmitted, may indicate that pieces of PDSCH scheduling information of the pieces of control information, for example, the numbers of PDSCH repetitive transmissions, time axis PDSCH resource allocation information, i.e., a slot offset K_0 between control information and PDSCH #1 and the number of PDSCH symbols, frequency axis PDSCH resource allocation information, DMRS port allocation information, PDSCH-to-HARQ-ACK timing, and a PUCCH resource indicator are the same. A UE may perform soft combining on the pieces of repeatedly transmitted control information having the same payload to improve reception reliability of the control information.

For the soft combining, the UE may need to be pre-aware of a resource location and the number of repetitive transmissions of the control information to be repeatedly transmitted. In this regard, the base station may pre-indicate resource configurations of a time domain, frequency domain, spatial domain of the repeatedly transmitted control information. When the control information is repeatedly transmitted in the time domain, the control information may be repeatedly transmitted over different CORESETs, repeatedly transmitted over different search space sets in one CORESET, or repeatedly transmitted over different PDCCH monitoring occasions in one search space set. Units of resources repeatedly transmitted in the time domain (CORESET units, search space set units, or PDCCH monitoring occasion units) and a location of repeatedly transmitted resource (PDCCH candidate index) may be indicated through a higher layer configuration of the base station. Here, the number of repetitive transmissions of the PDCCH and/or a list and transmission pattern of TRPs participating in the repetitive transmission may be explicitly indicated, and a higher layer indication or MAC-CE/L1 signaling may be used for the explicit indication. Here, the list of TRPs may be indicated in a form of TCI state or QCL assumption.

When the control information is repeatedly transmitted in the frequency domain, the control information may be repeatedly transmitted over different CORESETs, repeatedly transmitted over different PDCCH candidates in one CORESET, or repeatedly transmitted for each CCE. Units of resources in which the control information is repeatedly transmitted in the frequency domain and locations of the resources in which the control information is repeatedly transmitted may be indicated through a higher layer configuration of the base station. Also, the number of repetitive transmissions of the control information and/or a list and transmission pattern of TRPs participating in the repetitive transmission may be explicitly indicated, and a higher layer indication or MAC-CE/L1 signaling may be used for the explicit indication. Here, the list of TRPs may be indicated in a form of TCI state or QCL assumption.

When the control information is repeatedly transmitted in the spatial domain, the control information may be repeatedly transmitted over different CORESETs, or repeatedly transmitted as one or more TCI states are configured in one CORESET.

According to an embodiment of the disclosure, a method by which a base station repeatedly transmits a PDCCH will be described. In a wireless communication system, DCI including scheduling information regarding a PUSCH or PDSCH may be transmitted from the base station to a UE through the PDCCH.

Figure 23:
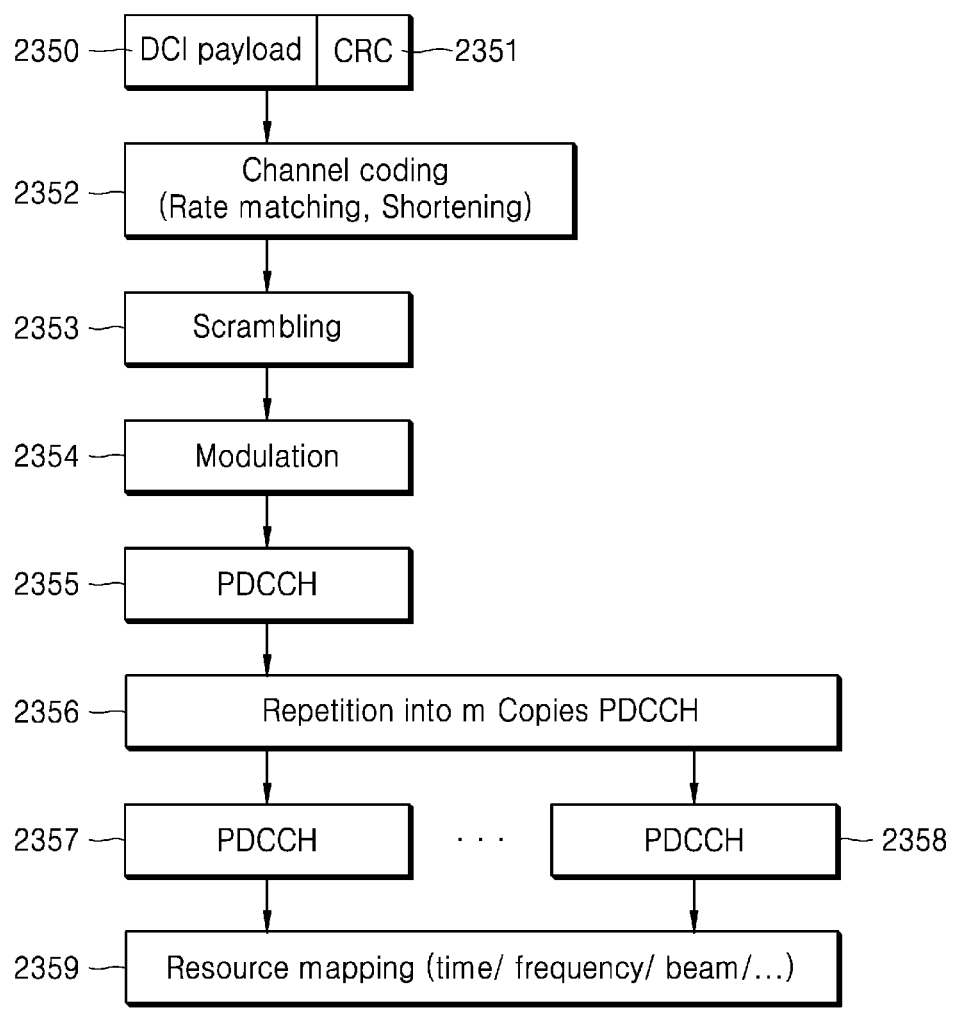
FIG. 23 illustrates a diagram showing processes of generating a PDCCH that is repeatedly transmitted through two TRPs according to an embodiment of the disclosure.

FIG. 23 illustrates a diagram showing processes of generating a PDCCH that is repeatedly transmitted through two TRPs, according to an embodiment of the disclosure. A base station may generate a DCI payload in operation 2350, attach a CRC to the DCI payload in operation 2351, perform channel coding on the DCI payload to which the CRC is attached in operation 2352, and perform scrambling in operation 2353 and modulation in operation 2354, thereby generating a PDCCH in operation 2355. Then, the base station may copy the generated PDCCH a plurality of times in operations 2356, 2357, and 2358, and transmit the same by using a specific resource (for example, a time, a frequency, a transmission beam, or the like), in operation 2359. In other words, coded bits for the PDCCHs that are repeatedly transmitted from TRPs may be the same. For the coded bits to be the same as such, information values for DCI fields in the PDCCHs may also be configured to be the same. For example, all fields (TDRA, FDRA, TCI, antenna ports, and the like) included in DCI may be configured to have the same value. Here, the same value may be generally interpreted in one meaning, but according to a special configuration, may be interpreted in a plurality of meanings when the same value includes or corresponds to a plurality of values (for example, 2) Details thereof will be described below.

As shown in FIG. 23, for example, when the base station repeatedly transmits the PDCCH two times (for example, m=2), the base station may respectively map the PDCCHs to a TRP A and a TRP B, and repeatedly transmit the PDCCHs based on same or different beams in a spatial domain. Here, the base station may perform PDCCH repetitive transmission based on CORESETs respectively connected to two search spaces explicitly connected to each other through higher layer signaling, perform PDCCH repetitive transmission based on a single TRP when IDs of CORESETs connected to a search space are the same or TCI states of the CORESET are the same, or perform PDCCH repetitive transmission based on multi-TRP when the IDs of CORESETs connected to the search space are all different or the TCI states of the CORESETs are all different. When the base station repeatedly transmits the PDCCH four times, the base station may map the PDCCHs to the TRP A and TRP B two each, and at this time, the two PDCCHs of each TRP may be distinguishably transmitted in a time domain. The PDCCH repetitive transmissions distinguished in the time domain may be repeated in slot-based, subslot-based, or mini-slot-based time units.

However, the above method is only an example and is not limited thereto. In the disclosure, the UE and the base station may consider following methods for PDCCH repetition described above:
- PDCCH repetition in terms of a time/frequency/spatial domains in a same slot in a same CORESET;
- PDCCH repetition in terms of time/frequency/spatial domains in different slots in a same CORESET;
- PDCCH repetition in terms of a time/frequency/spatial domain in a same slot between different CORESETs; and
- PDCCH repetition in terms of time/frequency/spatial domains in different slots between different CORESETs.

Also, when CORESETPoolindex is configured, PDCCH repetition may be considered for each CORESETPoolIndex, in addition to the CORESET described above. The number of PDCCH repetitions may independently increase, and accordingly, the above methods may be simultaneously considered in combination.

The base station may pre-configure the UE with information about a domain through which the PDCCH is repeatedly transmitted, through an RRC message. For example, when the PDCCH is repeatedly transmitted in terms of the time domain, the base station may pre-configure the UE with information about which one of the slot-based, subslot-based, or mini-slot-based time units is used for repetition. When the PDCCH is repeatedly transmitted in terms of the frequency domain, the base station may pre-configure the UE with information about which one of CORESET, BWP, or component carrier (CC) is used for repetition. When the PDCCH is repeatedly transmitted in terms of the spatial domain, the base station may pre-configure the UE with information related to a beam for PDCCH repetitive transmission through a configuration for each QCL type. Alternatively, the base station may transmit, to the UE, the information listed above through the RRC message. Accordingly, the base station may repeatedly transmit the PDCCH according to the information pre-configured through the RRC message, and the UE may repeatedly receive the PDCCH according to the information pre-configured through the RRC message.

[Method 1-2] Repetitive Transmission of Plurality of Pieces of Control Information that May have Different Formats and/or Payloads Method 1-2 is a method of repeatedly transmitting a plurality of pieces of control information that may have different formats and/or payloads. The control information schedules repeatedly transmitted PDSCHs, and the number of PDSCH repetitive transmissions indicated by each piece of control information may vary. For example, PDCCH #1 may indicate information of scheduling {PDSCH #1, PDSCH #2, PDSCH #Y}, whereas PDCCH #2 may indicate information of scheduling {PDSCH #2, PDSCH #Y}, and PDCCH #X may indicate information of scheduling {PDSCH Y}. Such a method of repeatedly transmitting the control information may have a small total delay time required for control information and PDSCH repetitive transmission compared to Method 1-1. However, payloads of the pieces of control information that are repeatedly transmitted may be different from each other, and thus reliability may be low compared to Method 1-1 because soft combining of the pieces of control information that are repeatedly transmitted is impossible.

In Method 1-2, a UE may not need to be pre-aware of a resource location of the control information to be repeatedly transmitted and the number of repetitive transmissions, and may independently decode and process the pieces of control information that are repeatedly transmitted. When the UE decodes a plurality of pieces of repeatedly transmitted control information scheduling a same PDSCH, the UE may process only first repeatedly transmitted control information and ignore remaining repeatedly transmitted control information. Alternatively, a base station may pre-indicate the resource location of the control information to be repeatedly transmitted and the number of repetitive transmissions, and an indication method may be the same as that described with reference to Method 1-1.

[Method 1-3] Repetitive Transmission of Each of Plurality of Pieces of Control Information that May have Different Formats and/or Payloads Method 1-3 is a method of repeatedly transmitting each of a plurality of pieces of control information that may have different formats and/or payloads. The pieces of control information that are repeatedly transmitted have a same DCI format and payload. In Method 1-2, the plurality of pieces of control information are unable to be soft-combined, and thus the reliability may be low compared to Method 1-1, and in Method 1-1, the total delay time required for the control information and PDSCH repetitive transmission may be long. Method 1-3 uses advantages of Methods 1-1 and 1-2, and may reduce the total delay time required for the control information and PDSCH repetitive transmission compared to Method 1-1, while transmitting the control information with high reliability compared to Method 1-2.

In Method 1-3, the soft combining of Method 1-1 and the individual decoding of Method 1-2 may be used to decode and soft-combine the repeatedly transmitted control information. For example, regarding repetitive transmissions of the plurality of pieces of control information that may have different DCI formats and/or payloads, control information that is transmitted first may be decoded as Method 1-2, and repetitive transmission of the decoded control information may be soft-combined as Method 1-2.

A base station may select one of Methods 1-1, 1-2, or 1-3, for control information repetitive transmission. The control information repetitive transmission may be explicitly indicated by the base station to a UE through higher layer signaling. Alternatively, the control information repetitive transmission may be indicated in combination with another configuration information. For example, a higher layer configuration indicating PDSCH repetitive transmission may be combined with an indication of the control information repetitive transmission. When a PDSCH is indicated to be repeatedly transmitted in an FDM manner, it may be interpreted that the control information is repeatedly transmitted only by using Method 1-1. This is because there is no delay time reduction effect according to Method 1-2 when the PDSCH is repeatedly transmitted in the FDM manner. For a similar reason, when the PDSCH is indicated to be repeatedly transmitted in an intra-slot TDM manner, it may be interpreted that the control information is repeatedly transmitted by using Method 1-1. On the other hand, when the PDSCH is indicated to be repeatedly transmitted in an inter-slot TDM manner, Method 1-1, 1-2, or 1-3 for the control information repetitive transmission may be selected through higher layer signaling or L1 signaling.

The base station may explicitly indicate, to the UE, control information repetitive transmission units through a higher layer signaling configuration or L1 signaling indication. Alternatively, the control information repetitive transmission units may be indicated in combination with another configuration information. For example, a higher layer signaling configuration indicating the PDSCH repetitive transmission may be combined with the control information repetitive transmission units. When the PDSCH is indicated to be repeatedly transmitted in the FDM manner, it may be interpreted that the control information is repeatedly transmitted in the FDM or SDM manner because when the control information is repeatedly transmitted in the inter-slot TDM manner, there is no delay time reduction effect according to the PDSCH repetitive transmission in the FDM manner.

For a similar reason, when the PDSCH is indicated to be repeatedly transmitted in the intra-slot TDM manner, it may be interpreted that the control information is repeatedly transmitted in the intra-slot TDM, FDM, or SDM manner. Meanwhile, when the PDSCH is indicated to be repeatedly transmitted in the inter-slot TDM manner, higher layer signaling or L1 signaling may be used to select the inter-slot TDM manner or intra-slot TDM, FDM, or SDM manner such that the control information is repeatedly transmitted.

[Method 1-4] PDCCH Transmission Applying TCI State for Different CCEs in Same PDCCH Candidate Group According to Method 1-4, to improve a reception performance of a PDCCH without PDCCH repetitive transmission, a base station may transmit control information by applying, on different CCEs in a PDCCH candidate group, different TCI states indicating transmission from multi-TRP. Such a scheme is not PDCCH repetitive transmission, but because the different TCI states are applied to the different CCEs in the PDCCH candidate group and transmission is performed from each TRP, spatial diversity may be obtained within the PDCCH candidate group. The different CCEs to which the different TCI states are applied may be separated in time or frequency resources, and a UE may need to be pre-aware of resource locations to which different TCI states are applied. The UE may receive the different CCEs to which the different TCI states are applied from the same PDCCH candidate group, and decode the same independently or at the same time.

[Method 1-5] PDCCH Transmission Applying Plurality of TCI States for all CCEs in Same PDCCH Candidate Group (SFN Manner)

In Method 1-5, to improve a PDCCH reception performance without PDCCH repetitive transmission, a plurality of TCI states are applied for all CCEs in a PDCCH candidate group, and transmit the same in an SFN manner. Such a scheme is not PDCCH repetitive transmission, but spatial diversity may be obtained through SFN transmission at a same CCE location in the PDCCH candidate group. A UE may receive CCEs at a same location to which different TCI states are applied from a same PDCCH candidate group, and decode the same independently or at the same time by using some or all of the plurality of TCI states.

Second Embodiment of Disclosure: Reporting of UE Capability Related to Soft Combining During PDCCH Repetitive Transmission A UE may report, to a base station, UE capability related to soft combining during PDCCH repetitive transmission, and there may be several methods in this regard. Specific methods will now be described.

[UE Capability Reporting Method 1] A UE may report, to a base station, information about whether soft combining is possible during PDCCH repetitive transmission. For example, the UE may report UE capability in a form of possibility or impossibility only regarding whether the soft combining is possible.

For example, when the UE reported, to the base station, information that the soft combining is possible during the PDCCH repetitive transmission as the UE capability, the base station may determine the possibility of soft combining of the UE to be most flexible (for example, the soft combining is possible for the UE in a log-likelihood ratio (LLR) level, and notify, to the UE, a PDCCH repetitive transmission-related configuration as flexible as possible during a PDCCH transmission-related configuration. Here, as an example related to a PDCCH repetitive configuration, the base station may notify a corresponding configuration to the UE under an assumption that soft combining between CORESETs or search spaces having different configurations is possible, soft combining between PDCCH candidates in a same AL is possible, or soft combining between PDCCH candidates in different ALs is possible.

As another example, when the UE reported, to the base station, the information that the soft combining is possible during the PDCCH repetitive transmission as the UE capability, the base station may determine a level of the soft combining of the UE to be most conservative (for example, the soft combining is possible for the UE in an OFDM symbol level), and notify, to the UE, the PDCCH repetitive transmission-related configuration as restrictive as possible during the PDCCH transmission-related configuration. Here, as an example related to the PDCCH repetitive configuration, the base station may notify a corresponding configuration to the UE under an assumption soft combining between a plurality of CORESETs having a same configuration is possible, or soft combining between PDCCH candidates in a same AL is possible.

[UE capability reporting Method 2] To express soft combining possible for a UE as UE capability in further detail compared to UE Capability Reporting Method 1, the UE may report, to a base station, the UE capability by dividing, into levels, degrees of possibility of the soft combining during PDCCH repetitive transmission. In other words, a signal level to which the UE may apply the soft combining for the PDCCH repetitive transmission may be identified from among signal levels generated during reception operations of the UE, and the UE may report, to the base station, such information as UE capability. For example, the UE may notify that the soft combining is possible in at least one of an OFDM symbol level, a modulation symbol level, or an LLR level, as the signal level to which the soft combining may be applied. According to each signal level reported by the UE, the base station may notify a suitable configuration such that the UE may perform the soft combining according to the reported UE capability.

[UE capability reporting Method 3] A UE may transmit, to a base station, restrictions required to enable soft combining in the UE during PDCCH repetitive transmission, as UE capability. For example, the UE may report, to the base station, that configurations of CORESETs included in two repeated PDCCHs need to be the same. As another example, the UE may report, to the base station, that at least ALs of two repeated PDCCH candidates need to be the same.

[UE capability reporting Method 4] When PDCCH repetitive transmission is received from a base station, a UE may report, through UE capability, which PDCCH repetitive transmission is supported. For example, the UE may report, to the base station, that Method 1-5 (SFN manner) is supported. As another example, the UE may report, to the base station, that an intra-slot TDM manner or an inter-slot TDM or FDM manner is supported from Method 1-1 (a plurality of PDCCH repetitive transmissions having a same payload). In particular, regarding TDM, the UE may report, to the base station, a maximum value of a time interval between two repeated PDCCHs. For example, when the UE reported 4 OFDM symbols as the maximum value of the time interval between two repeated PDCCHs, the base station may need to adjust the time interval between the two repeated PDCCHs to be equal to or less than 4 OFDM symbols, when the base station performs TDM-based PDCCH repetitive transmission based on such information. As another example, regarding FDM, the UE may report, to the base station, a maximum value of a frequency interval between two repeated PDCCHs. The base station may need to adjust the frequency interval between the two repeated PDCCHs to be equal to or less than a reported value, when the base station performs FDM-based PDCCH repetitive transmission based on such information.

[UE capability reporting Method 5] A UE may report, to a base station, the number of blind decodings consumed when the UE receives PDCCH repetitive transmission from the base station, as UE capability. For example, the UE reports, to the base station, the number of blind decodings consumed when the PDCCH repetitive transmission is received to be 1, 2, or 3, regardless of a reception method of the UE (for example, individual decoding, soft combining, another reception method, or a combination thereof), and the base station assumes that the UE consumes the reported number of blind decodings when the PDCCH repetitive transmission is received, and transmit, to the UE, configurations regarding a search space and CORESET such that the maximum number of blind decodings available to the UE does not exceed in a slot or span.

It is possible to configure a combination of two or more of the above UE capability reporting methods for actual application. For example, the UE may report that soft combining is possible in an LLR level according to UE Capability Reporting Method 2 and at the same time, report that at least ALs of two repeated PDCCH candidates need to be the same according to UE Capability Reporting Method 3, and may support PDCCH repetitive transmission in a TDM manner according to UE Capability Reporting Method 4 and report a maximum value of a time interval between the two repeated PDCCHs to be 4 OFDM symbols. In addition, applications based on combinations of various UE capability reporting methods are possible, and detailed descriptions thereof will be omitted.

Third Embodiment of Disclosure: Configuration Method Related to PDCCH Repetitive Transmission and Explicit Connectivity According to an embodiment of the disclosure, a configuration method of PDCCH repetitive transmission, which enables soft combining during the PDCCH repetitive transmission, will be described. When a base station performs PDCCH repetitive transmission to a UE based on, for example, Method 1-1 (a plurality of PDCCH repetitive transmissions having a same payload), from among various PDCCH repetitive transmissions, the base station may configure, through higher layer signaling, indicate, through L1 signaling, or configure and indicate, through a combination of higher layer signaling or L1 signaling, information that there is an explicit connection (linkage or association) between repeated PDCCH candidates, such that the number of blind decodings is reduced in consideration of a soft combining possibility of the UE. In detail, various connection methods may exist as below.

There may be various methods as below for a configuration method related to PDCCH repetitive transmission and explicit connectivity through higher layer signaling.

[PDCCH Repetition Configuration Method 1] when Configuration Information is Present in Higher Layer Signaling PDCCH-Config.

For configuration related to PDCCH repetitive transmission and explicit connectivity, a base station may configure a UE with PDCCH-repetition-config in the higher layer signaling PDCCH-Config, and PDCCH-repetition-config may include following pieces of information:
  PDCCH repetitive transmission—One of TDM, FDM, or SFN;
  Combination(s) of CORESET-search space to be used for PDCCH repetitive transmission:
    CORESET index(es)—Optional, and
    Search space index(es)—Optional;
  AL(s) for explicit connectivity—Optional;
  PDCCH candidate index(es) for explicit connectivity—Optional; and
  Frequency resource for explicit connectivity—Optional.

The base station may configure the UE with the PDCCH repetitive transmission through the higher layer signaling, based on the above pieces of information. For example, when the PDCCH repetitive transmission is configured to be SFN, a CORESET index 1 is configured as a combination of CORESET-search space to be used during the PDCCH repetitive transmission, and a search space index is not configured, the UE may expect a PDCCH to be repeatedly transmitted from a CORESET having an index 1, through Method 1-5 (SFN manner). Here, the configured CORESET may receive a configuration of one or a plurality of different TCI states through higher layer signaling, receive an indication thereof through L1 signaling or MAC-CE signaling, or receive the configuration and indication through a combination of higher layer signaling and L1 or MAC-CE signaling. When the PDCCH repetitive transmission is configured to be SFN, the UE may not expect the search space index to be configured in the combination of CORESET-search space to be used during the PDCCH repetitive transmission.

In another example, when the PDCCH repetitive transmission is configured to be TDM or FDM, total two combinations of CORESET-search space to be used during the PDCCH repetitive transmission are configured, and a CORESET index 1 and a search space index 1 are configured for a first combination and a CORESET index 2 and a search space index 2 are configured for a second combination, the UE may expect the PDCCH to be repeatedly transmitted in a TDM or FDM manner through Method 1-1 by using the two combinations of CORESET-search space. Here, each configured CORESET may receive a configuration of a plurality of same or different TCI states through higher layer signaling, receive an indication thereof through L1 signaling or MAC-CE signaling, or receive the configuration and indication through a combination of higher layer signaling and L1 or MAC-CE signaling. Also, when the PDCCH repetitive transmission is configured to be TDM or FDM, the UE may expect up to two combinations of CORESET-search space to be used during the PDCCH repetitive transmission to be configured, and expect that all of CORESET index and search space index in each combination to be configured.

Values of the above five pieces of information may be updated without RRC reconfiguration, based on MAC CE. When the base station does not configure the UE with PDCCH-repetition-config, the UE may not expect the PDCCH to be repeatedly transmitted, but may expect only PDCCH single transmission. None or at least one of AL for the explicit connectivity, a PDCCH candidate index, or frequency resources may be configured according to an explicit connection method described below.

[PDCCH Repetition Configuration Method 2] when Configuration Information is Present in Higher Layer Signaling for a Search Space.

A base station may add higher layer signaling in higher layer signaling searchSpace regarding a search space for PDCCH repetitive transmission, and notify the same to a UE. For example, a parameter called repetition that is additional higher layer signaling may be configured to be on or off in the higher layer signaling searchSpace, and thus a corresponding search space may be configured to be used for repetitive transmission. There may be one or two search spaces, in which repetition is configured to be on, per BWP. For example, when searchSpaceId is configured to be 1 in higher layer signaling searchSpace, controlResourceSetId is configured to be 1, and repetition is configured to be on for a search space index 1, the UE may expect PDCCH repetitive transmission to be performed according to Method 1-5 (SFN manner) from a CORESET 1 connected to a search space 1. As another example, when searchSpaceId is configured to be 1 in higher layer signaling searchSpace, controlResourceSetId is configured to be 1, and repetition is configured to be on for a search space index 1, and searchSpaceId is configured to be 2 in higher layer signaling searchSpace, controlResourceSetId is configured to be 2, and repetition is configured to be on for a search space index 2, the UE may determine that PDCCH repetitive transmission is performed through TDM or FDM by using Method 1-1 between a combination of CORESET 1+search space 1 and a combination of CORESET 2+search space 2. The TDM and the FDM may be distinguished according to time and frequency configurations through higher layer signaling of CORESETs 1 and 2 and search spaces 1 and 2. Also, AL or PDCCH candidate indexes for explicit connectivity described in PDCCH Repetition Configuration Method 1 may be configured in higher layer signaling for a search space in which repetition is configured to be 0, and none, one, or both of the AL and the PDCCH candidate index may be configured according to an explicit connection method described below.

Fourth Embodiment of Disclosure: PHR Method Considering Multi-TRP-Based Repeatedly Transmitted PDCCH A method of performing PHR considering a PDCCH repeatedly transmitted based on multi-TRP, according to a fourth embodiment of the disclosure, will be described. In the NR release 15/16, when scheduling an uplink resource for PHR, a PUSCH capable of accommodating PHR MAC CE is scheduled based on a single PDCCH or based on configured grant. However, in the NR release 17, a plurality of PDCCH repetitive transmissions are supported considering multi-TRP, to improve reliability of a PDCCH. Accordingly, the PDCCH scheduling the PUSCH capable of accommodating the PHR MAC CE may also be repeatedly transmitted considering the multi-TRP, and a UE may receive the repeatedly transmitted PDCCH and decode the same. However, a general method of determining a PUSCH to which power headroom information is reported, a method of determining a power headroom calculation type based on a PDCCH monitoring occasion where a PDCCH scheduling a PUSCH to which power headroom is reported is detected, and the like are defined based on single PDCCH reception. When the method of determining a PUSCH to which power headroom information is reported, and the method of determining a power headroom calculation type based thereon in the NR release 15/16 in an environment supporting a repeatedly transmitted PDCCH are applied, there may be ambiguity in definition on first DCI and ambiguity in a power headroom calculation type determination timeline due to a plurality of PDCCH monitoring occasions.

Thus, in the disclosure, a method of determining a PUSCH to which power headroom is reported considering a multi-TRP-based repeatedly transmitted PDCCH, and a method of defining a timeline for determining a power headroom calculation type will be described in Fourth-1 and Fourth-2 embodiments of the disclosure. Also, a method of determining a power headroom calculation type for an activated supporting cell aside from a cell reporting power headroom according to a condition of a PDCCH received by a UE within a timeline defined in the Fourth-2 embodiment of the disclosure, when multi-TRP-based PDCCH repetitive transmission is supported even for uplink carrier aggregation (UL-CA) and a plurality of carriers, will be described in detail in a Fourth-3 embodiment of the disclosure. In addition, whether a specific trigger event occurs may be changed according to a multi-TRP-based repeatedly transmitted PDCCH, from among a plurality of trigger events determining performing, by a UE, of PHR. In a Fourth-4 embodiment of the disclosure, a method of triggering PHR according to such a PDCCH repetitive transmission will be described in detail.

Operations described with reference to the Fourth-1 through Fourth-4 embodiments of the disclosure may operate independently or operate in combination to determine a PHR method according to a repeatedly transmitted PDCCH.

Fourth-1 Embodiment of Disclosure: Method of Determining PUSCH to which Power Headroom Considering Multi-TRP-Based Repeatedly Transmitted PDCCH is Reported In the Fourth-1 embodiment of the disclosure, a method of determining a PUSCH to which power headroom is reported during PUSCH transmission for a plurality of supporting cells, considering a PDCCH that is repeatedly transmitted based on multi-TRP, will be described.

In the NR release 15/16, a UE performs PHR on a PUSCH scheduled by a first DCI format capable of accommodating a PHR MAC CE. Here, the first DCI format denotes a format of DCI received the earliest in a time domain. However, in the NR release 17, a PDCCH including DCI is repeatedly transmitted, and thus an operation of the UE receiving DCI the earliest may be vague. Accordingly, the PUSCH to which the power headroom is reported may be determined through following criteria, according to a time point when the UE receives the repeatedly transmitted PDCCH or an operation of the UE decoding the PDCCH.

[Criterion 1] After PHR is triggered, the PHR is performed through a PUSCH scheduled by DCI received by a UE first: According to Criterion 1, in an environment in which the UE receives a plurality of PDCCH repetitive transmissions, the UE may determine a PUSCH to which power headroom is reported, based on a PDCCH received first, regardless of receiving all PDCCH repetitive transmissions. For detailed description about Criterion 1, an example of Case 1 of FIG. 24 may be considered. FIG. 24 is a diagram for describing a case where PDCCH repetitive transmission is performed in each of two carriers.

In the example of Case 1 of FIG. 24, a UE receives, in operation 2411, a PDCCH repetitive transmission including DCI first in a first carrier CC1, and thus even when a time point when reception of all repetitive transmissions is completed is later than a second carrier CC2, the UE performs PHR on a PUSCH scheduled by a PDCCH received in the first carrier CC1. Here, reference numerals 2411 and 2412 denote PDCCH repetitive transmissions received from TRP #1 and TRP #2 for the first carrier CC1, respectively, and reference numerals 2421 and 2422 denote PDCCH repetitive transmissions received from TRP #1 and TRP #2 for the second carrier CC2, respectively. TRP #1 and TRP #2 are used to describe one specific example, and various TRP configurations, for example, PDCCH repetitive transmissions from two TRPS having different transmission orders, such as TRP #2 and TRP #1, or from a same TRP, may be applied. Als, during the PDCCH repetitive transmissions for the first carrier CC1 and the second carrier CC2, an example of transmission to the same TRP #1 and TRP #2 is illustrated, but the PDCCH repetitive transmissions may be received from different TRPs (for example, TRP #3 and TRP #4) may be received for different carriers.

[Criterion 2] After PHR is triggered, a UE performs the PHR through a PUSCH scheduled by DCI included in a PDCCH that has received all repetitive transmissions the earliest: Criterion 2 is a method of determining a PUSCH to which power headroom is reported, according to whether the UE received all PDCCH repetitive transmissions, in an environment in which the UE receives a plurality of PDCCHs. In other words, regardless of a PDCCH that is first received, the UE performs the PHR on the PUSCH scheduled by the PDCCH that has received all PDCCH repetitive transmission the earliest. In Case 1 of FIG. 24, even when the UE first receives the PDCCH including the DCI in the first carrier CC1, the UE receives all PDCCH repetitive transmissions the earliest in the second carrier CC2, and thus the UE may perform the PHR on the PUSCH scheduled by the PDCCH received in the second carrier CC2.

[Criterion 3] After PHR is triggered, a UE performs the PHR through a PUSCH scheduled by DCI included in a PDCCH that has been successfully decoded the earliest: Criterion 3 is a method of determining a PUSCH to which power headroom is reported, according to whether the received PDCCH has been successfully decoded, in an environment in which the UE receives a plurality of PDCCHs. The UE may perform PDCCH decoding even when only some of PDCCHs are received from among PDCCH repetitive transmissions or perform PDCCH decoding after all PDCCH repetitive transmissions are received, according to UE implementation. When the PDCCH decoding is successfully performed, the UE is able to obtain scheduling information of the PUSCH according to DCI included in the PDCCH, the UE may determine whether to report power headroom to the PUSCH scheduled by the PDCCH that has been successfully decoded. When the PDCCH that has been successfully decoded first is unable to accommodate a PHR MAC CE, the UE may determine the scheduled PUSCH capable of accommodating the PHR MAC CE by identifying DCI included in a PDCCH that has been successfully decoded next.

Criteria 1 through 3 all assume that a UE has successfully received all PDCCH repetitive transmissions. However, the UE may not be able to successfully receive a PDCCH when some PDCCHs are dropped during the PDCCH repetitive transmission, according to an operation of NR release 15/16, a temporary channel state, or a state of the UE. Examples of some PDCCHs being dropped due to an operation of NR release 15/16 include a case where an SSB and a PDCCH overlap, a case where a rate matching resource and a PDCCH overlap, a collision related to TDD downlink/uplink configurations, a low priority according to a QCL-TypeD priority rule for a plurality of CORESETs, overbooking that exceeds a limit on monitored PDCCH candidates, and pre-emption of a PRB and OFDM symbol by DCI format 2_1. When some PDCCHs are dropped as above examples during the PDCCH repetitive transmission, the UE may: operation 1) monitor a PDCCH that is not dropped; or operation 2) not monitor a PDCCH that is not dropped, for other PDCCHs. When some PDCCHs are dropped, a PUSCH to which power headroom is reported according to Criteria 1 through 3 may be variously determined according to operation 1) or operation 2). In detail, when the PHR is performed through the PUSCH scheduled by the DCI received first by the UE according to Criterion 1, and the UE does not monitor a second PDCCH repetitive transmission 2432 of a first carrier CC1 as in Case 2 of FIG. 24, the UE may or may not monitor a first PDCCH repetitive transmission 2431 of the first carrier CC1 according to operation 1) or operation 2). When operation 1) is performed, the UE may be able to decode the DCI scheduling the PUSCH by monitoring the first PDCCH repetitive transmission, and because the first PDCCH repetitive transmission received in the first carrier CC1 according to Criterion 1 is a first received DCI format, the UE may report power headroom information on the PUSCH scheduled by the corresponding PDCCH. When operation 2) is performed, the first PDCCH repetitive transmission is also dropped, and thus the UE is unable to receive DCI transmitted in the first carrier CC1.

Accordingly, the UE may report power headroom information through the PUSCH scheduled by the PDCCH repetitive transmission received in a second carrier CC2. When the first PDCCH repetitive transmission 2431 of the first carrier CC1 is dropped, a DCI format received first according to Criterion 1 is a first PDCCH repetitive transmission 2441 of the second carrier CC2 regardless of operation 1) or operation 2), and thus the UE may report power headroom information through a PUSCH scheduled by a PDCCH received in the second carrier CC2. Similarly, when some PDCCHs are dropped for Criterion 2 or 3, a PUSCH to which power headroom is reported may vary according to operation 1) or operation 2).

Fourth-2 Embodiment of Disclosure: Method of Defining Timeline for Determining Power Headroom Calculation Type Considering Multi-TRP-Based Repeatedly Transmitted PDCCH In the Fourth-2 embodiment of the disclosure, a method of configuring a timeline in a plurality of PDCCH monitoring occasions to determine a power headroom calculation type, when a PUSCH to which power headroom is reported is determined considering a repeatedly transmitted PDCCH based on multi-TRP, will be described.

In the Fourth-2 embodiment of the disclosure, a method of determining a PUSCH to which power headroom information is reported has been described. A UE may determine a calculation type of power headroom information for each reported supporting cell, based on a PDCCH monitoring occasion where DCI scheduling the PUSCH to which power headroom is reported has been detected. As described above, in the NR release 15/16, only a single PDCCH reception is considered, and thus there is only one PDCCH monitoring occasion where the DCI scheduling the PUSCH to which power headroom is reported is detected. However, in the NR release 17, PDCCH repetitive transmission considering multi-TRP is supported, and thus there are a plurality of PDCCH monitoring occasions. Accordingly, it is required to define one timeline for determining the calculation type of power headroom information from among the plurality of PDCCH monitoring occasions. The timeline for determining the calculation type of the power headroom information from among the plurality of PDCCH monitoring occasions may be defined according to a following method. Here, a first DCI format denotes DCI included in a PDCCH scheduling the PUSCH to which power headroom is reported, which is determined according to Criteria 1 through 3 of the Fourth-1 embodiment of the disclosure, and the corresponding PUSCH is scheduled for initial transmission of TB.

Figure 25:
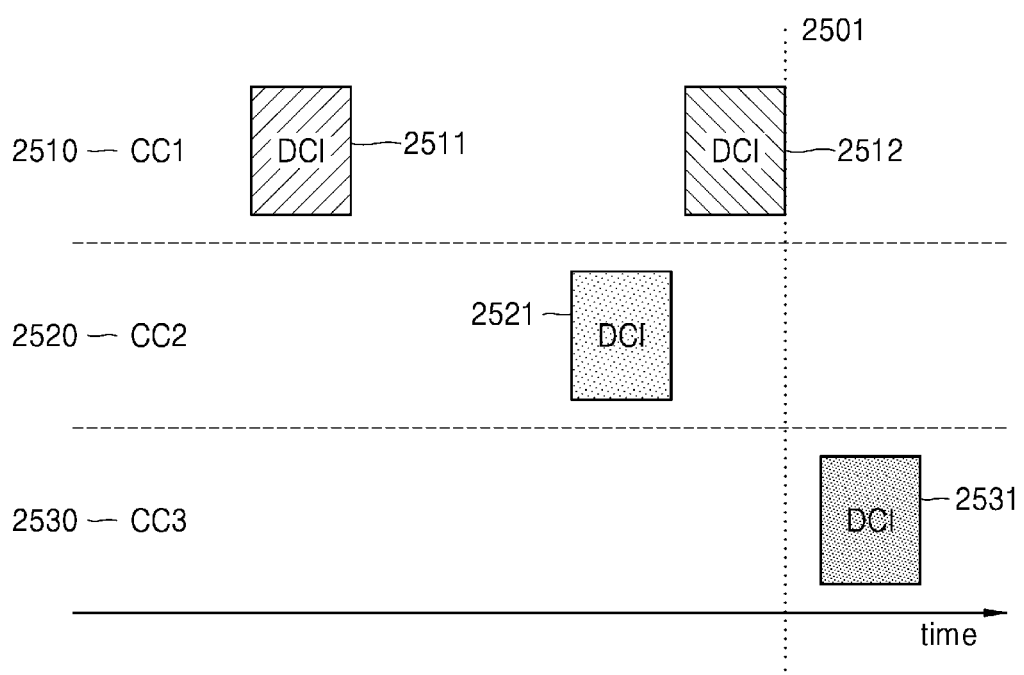
FIG. 25 illustrates a diagram of an example in which a timeline for determining a calculation type of power headroom information is configured based on a last PDCCH monitoring occasion from among a plurality of PDCCH monitoring occasions according to an embodiment of the disclosure.

[Method 1] After PHR is triggered, a UE configures, as a timeline for determining a calculation type of power headroom information, an occasion up to and including the last PDCCH monitoring occasion from among a plurality of PDCCH monitoring occasions where a first DCI format is detected: The UE determines the calculation type of power headroom information based on the last PDCCH monitoring occasion from among the plurality of PDCCH monitoring occasions where the first DCI format is detected. Referring to FIG. 25 for more detailed operations, DCI received in a first carrier CC1 is a first DCI format, and a UE assumes that PHR is performed through a PUSCH scheduled by the DCI. According to Method 1, a PDCCH monitoring occasion for a last PDCCH repetitive transmission 2512 from among two PDCCH repetitive transmissions 2511 and 2512 may be defined as a timeline 2501. In FIG. 25, the UE may calculate and report actual PHR according to actual transmission, such as actual transmit power indicated by the DCI, when calculating power headroom of an uplink signal scheduled by DCI of a second carrier CC2 received before the timeline 2501. However, the UE may calculate and report virtual PHR based on a reference format including a transmit power parameter configured in a higher layer instead of the actual transmit power indicated by the DCI, when calculating power headroom of an uplink signal scheduled by DCI of a third carrier CC3 received after the timeline 2501.

Figure 26:
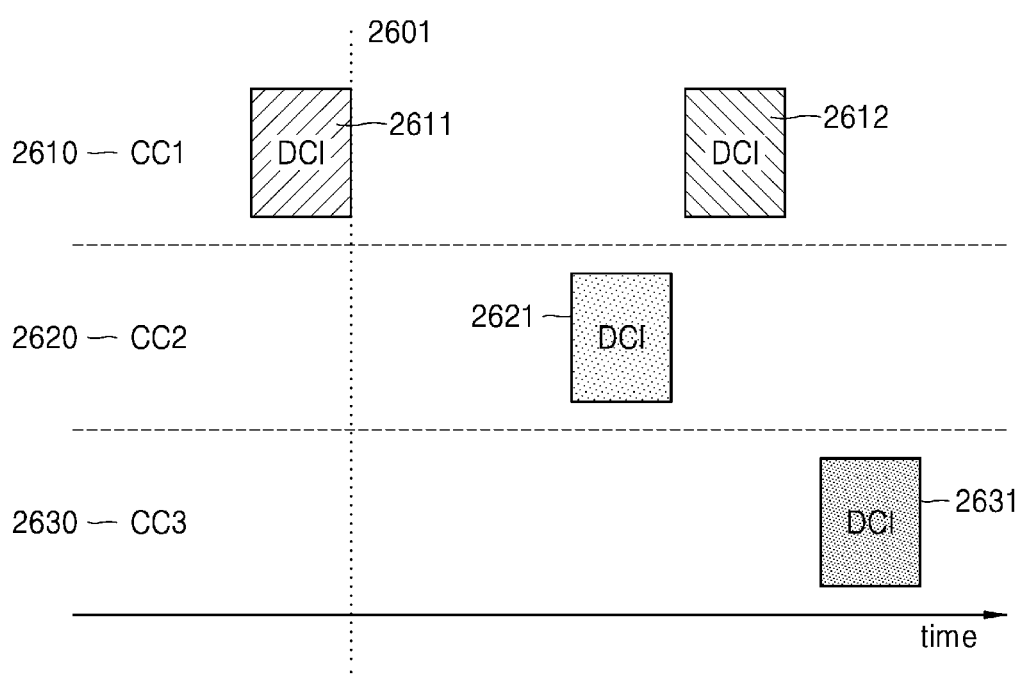
FIG. 26 illustrates a diagram of an example in which a timeline for determining a calculation type of power headroom information is configured based on a first PDCCH monitoring occasion from among a plurality of PDCCH monitoring occasions according to an embodiment of the disclosure.

[Method 2] After PHR is triggered, a UE configures, as a timeline for determining a calculation type of power headroom information, an occasion up to and including the first PDCCH monitoring occasion from among a plurality of PDCCH monitoring occasions where a first DCI format is detected: The UE determines the calculation type of power headroom information based on the first PDCCH monitoring occasion from among the plurality of PDCCH monitoring occasions where the first DCI format is detected. Referring to FIG. 26 for more detailed operations, DCI received in a first carrier CC1 is a first DCI format, and a UE assumes that PHR is performed through a PUSCH scheduled by the DCI. According to Method 2, a PDCCH monitoring occasion for a first PDCCH repetitive transmission 2611 from among two PDCCH repetitive transmissions 2611 and 2612 may be defined as a timeline 2601. Because pieces of DCI of a second carrier CC2 and third carrier CC3 are received after the timeline 2601, the UE may calculate and report each of virtual PHRs for uplink signals scheduled by the pieces of DCI received in the second carrier CC2 and third carrier CC3, based on a transmit power parameter configured in a higher layer instead of actual transmit power.

[Method 3] After PHR is triggered, a UE configures, as a timeline for determining a calculation type of power headroom information, an occasion up to and including the first successful decoding PDCCH monitoring occasion from among a plurality of PDCCH monitoring occasions where a first DCI format is detected: The calculation type of the power headroom information is determined based on the first successful decoding PDCCH monitoring occasion from among the plurality of PDCCH monitoring occasions where the first DCI format is detected. The UE may perform PDCCH decoding even when only some of PDCCHs are received from among PDCCH repetitive transmissions or perform PDCCH decoding after all PDCCH repetitive transmissions are received, according to UE implementation. When the UE successfully performs the PDCCH decoding, the timeline is configured based on a successful decoding PDCCH monitoring occasion. The last PDCCH monitoring occasion may be the timeline as in FIG. 25 or the first PDCCH monitoring occasion may be the timeline as FIG. 26, according to UE implementation of decoding a PDCCH repeatedly transmitted considering multi-TRP and whether decoding is successful.

Fourth-3 Embodiment of Disclosure: Method of Determining Power Headroom Calculation Type of Cell Other than Cell to which Power Headroom Considering Multi-TRP-Based Repeatedly Transmitted PDCCH is Reported In the Fourth-3 embodiment of the disclosure, a method of determining a power headroom calculation type (actual PHR or virtual PHR) of an activated cell other than a cell to which power headroom is reported, when DCI scheduling an uplink signal transmitted to the activated cell is repeatedly transmitted based on multi-TRP, will be described.

PDCCH repetitive transmission considering multi-TRP may be applied to a PDCCH scheduling a PUSCH to which power headroom is reported, and in addition, the PDCCH repetitive transmission may be applied to a PDCCH received from another carrier (another serving cell) scheduling an uplink signal to which power headroom is not reported. In the examples of FIGS. 25 and 26 above, it is assumed that a PDCCH received from a carrier other than the first carrier CC1 is not repeatedly transmitted, but the PDCCH may be repeatedly transmitted in the NR release 17. Here, when it is assumed that a first DCI format and a corresponding timeline are defined according to the Fourth-1 and Fourth-2 embodiments of the disclosure, PDCCH repetitive transmissions received from the other carrier may all be received before the defined timeline or only some of the PDCCH repetitive transmissions may be received before the timeline. When all PDCCH repetitive transmissions are received before the timeline, a UE may calculate, as actual PHR, power headroom for an uplink signal scheduled by a corresponding PDCCH. However, when only some PDCCH repetitive transmissions are received before the timeline, a method for determining a type of calculating power headroom information of an uplink signal scheduled by the PDCCH is required.

[Detailed Method 1] Even when only some of all PDCCH repetitive transmissions are received before a timeline for determining a calculation type of power headroom information, power headroom for an uplink signal scheduled by a corresponding PDCCH is calculated as actual PHR based on actual transmit power: According to Detailed Method 1, even when a UE receives only some of all PDCCH repetitive transmissions before a defined timeline, power headroom information of an uplink signal scheduled by a corresponding PDCCH may be calculated as actual PHR. Here, whether it is possible to calculate the actual PHR may be determined when at least on of following additional conditions is satisfied.

First additional condition: Even when only some of PDCCH repetitive transmissions are received according to UE implementation, decoding may be attempted, and when decoding is successfully performed by only using the some of PDCCH repetitive transmissions, power headroom of an uplink signal scheduled by a corresponding PDCCH may be calculated as actual PHR.

Figure 27:
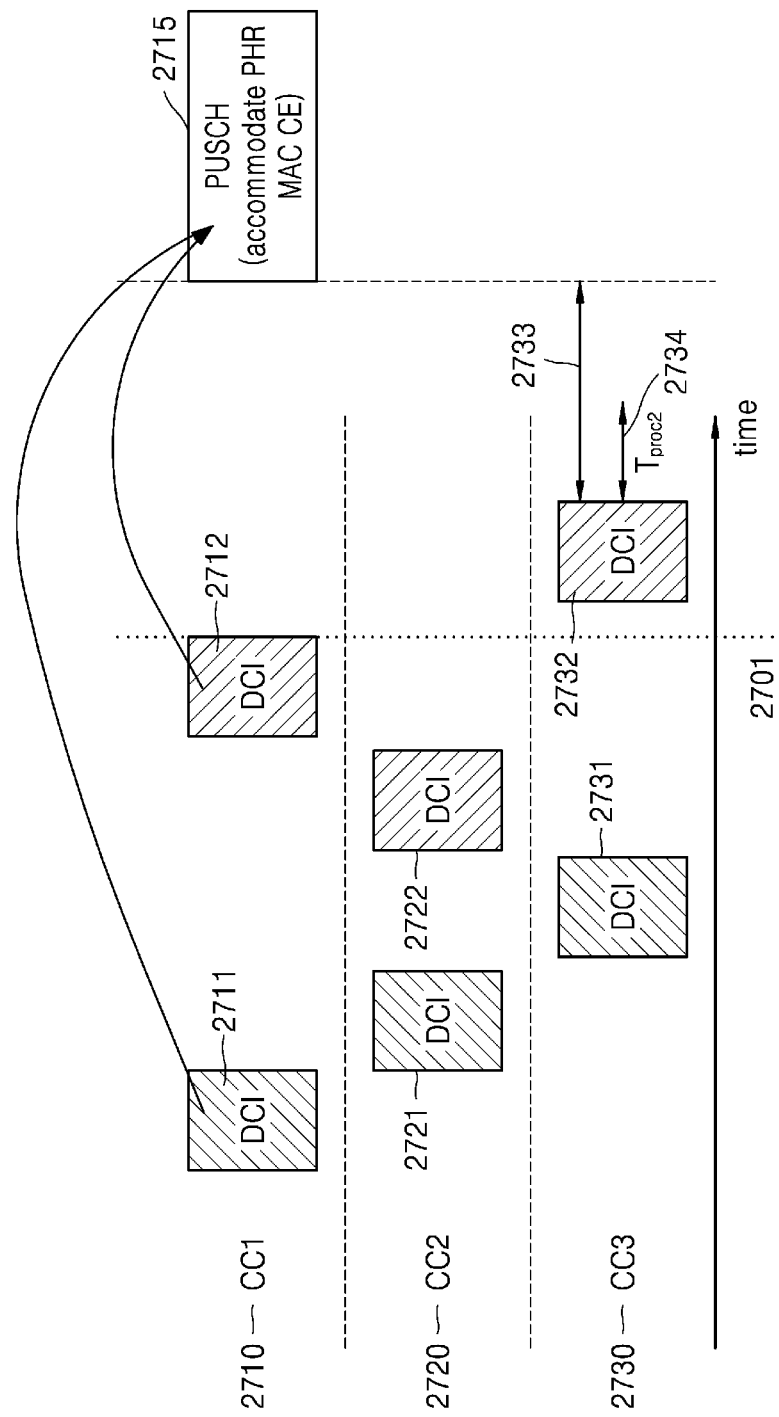
FIG. 27 illustrates a diagram showing an example in which a UE reports power headroom on a PUSCH scheduled by a PDCCH of a first carrier, in a situation where the UE receives the PDCCH repeatedly transmitted on each carrier from multi-TRP according to an embodiment of the disclosure.

Second additional condition: When only some of PDCCH repetitive transmissions are received according to UE implementation, and decoding is attempted but failed, or when decoding is able to be performed only when all PDCCH repetitive transmissions are received according to UE implementation, a calculation type of power headroom information is determined according to a time point when the last PDCCH repetitive transmission is received after a timeline. Referring to FIG. 27 for detailed descriptions, it is assumed that power headroom is reported on a PUSCH scheduled by a PDCCH received on a first carrier CC1, and a timeline 2701 is defined, according to Criterion 1 of the Fourth-1 embodiment of the disclosure and Method 1 of the Fourth-2 embodiment of the disclosure. A first PDCCH repetitive transmission 2731 from among PDCCH repetitive transmissions considering multi-TRP received in a third carrier CC3 is received by a UE before the timeline 2701, and the UE may identify information about next PDCCH repetitive transmission according to explicit or implicit connection (linkage) based thereon. Here, the explicit connection denotes an operation enabling the UE to determine that a PDCCH is repeatedly transmitted considering multi-TRP, through a higher layer configuration or the like, without having to decode the PDCCH repetitive transmission. The implicit connection denotes an operation enabling the UE to decode some of the PDCCH repetitive transmissions and determine that the next PDCCH repetitive transmission will be performed based on decoded PDCCH information.

The implicit connection may enable the UE to determine that the next PDCCH repetitive transmission will be performed by comparing information about the number of control channel elements (CCEs), starting point information of a CCE that attempted decoding, even when decoding on all PDCCHs is not successful. An interval 2733 between an end time point of reception of a last OFDM symbol of PDCCH repetitive transmission received after the timeline 2701 and a first OFDM symbol of a PUSCH to which PH MAC CE is reported need to be greater than PUSCH preparation procedure time $T_{proc,2}$ 2734. This is because a certain period of time or greater needs to be secured for the UE to receive PDCCH repetitive transmissions left after the timeline 2701 and perform following operations. The UE needs to obtain, during the interval 2733, time to 1) decode a PDCCH received after the timeline 2701, 2) obtain scheduling information of an uplink signal from decoded DCI, 3) calculate (actual PHR) power headroom based on actual transmit power of the uplink signal determined from the scheduling information, and 4) generate a PUSCH transmission signal by adding the calculated power headroom to an MAC CE.

When the UE determines, through the first PDCCH repetitive transmission 2731 received on the third carrier CC3 before the timeline 2701, that the interval 2733 between the OFDM symbols is greater than the PUSCH preparation procedure time 2734, the UE may receive a remaining PDCCH repetitive transmission 2732 after the timeline 2701, calculate power headroom of an uplink signal scheduled by a PDCCH received on the third carrier CC3 as actual PHR, and report the same to a base station. When the UE determines, through the first PDCCH repetitive transmission 2731 received in the third carrier CC3 before the timeline 2701, that the interval 2733 between the OFDM symbols is less than the PUSCH preparation procedure time 2734, the UE may start calculation for power headroom information after the timeline 2701, calculate power headroom of uplink transmission for the third carrier CC3 as virtual PHR, and report the same to a base station.

[Detailed Method 2] Power headroom for an uplink signal scheduled by PDCCHs of which repetitive transmissions are all received from among all PDCCH repetitive transmissions before a timeline for determining a calculation type of power headroom information is calculated as actual PHR based on actual transmit power: According to Detailed Method 2, a UE may calculate, as actual PHR, power headroom information of an uplink signal scheduled by PDCCHs of which repetitive transmissions are all received from among all PDCCH repetitive transmissions before a defined timeline. Referring to FIG. 27 for detailed descriptions, it is assumed that the power headroom is reported on the PUSCH scheduled by the PDCCH received on the first carrier CC1, and the timeline 2701 is defined, according to Criterion 1 of the Fourth-1 embodiment of the disclosure and Method 1 of the Fourth-2 embodiment of the disclosure.

The UE receives all PDCCH repetitive transmissions 2721 and 2722 received on a second carrier CC2 before the timeline 2701, power headroom of an uplink signal scheduled by the corresponding PDCCH repetitive transmission 2721 or 2722 may be calculated as actual PHR based on actual transmit power. However, regarding the PDCCH repetitive transmissions 2731 and 2732 received on the third carrier CC3, the UE may receive the PDCCH repetitive transmission 2731 before the timeline 2701 and the remaining PDCCH repetitive transmission 2732 after the timeline 2701. Accordingly, the power headroom of the uplink signal scheduled by the PDCCH received on the third carrier CC3 may be calculated as virtual PHR based on a transmit power parameter configured in a higher layer.

[Detailed Method 3] Power headroom for an uplink signal scheduled by a successfully decoded PDCCH from among PDCCH repetitive transmissions received before a timeline is calculated as actual PHR based on actual transmit power: According to Detailed Method 3, even when a UE receives only some of all PDCCH repetitive transmissions before a defined timeline, when a corresponding PDCCH is successfully decoded, power headroom information of an uplink signal scheduled by the corresponding PDCCH may be calculated as actual PHR. Referring to FIG. 27 for detailed descriptions, it is assumed that the power headroom is reported on the PUSCH scheduled by the PDCCH received on the first carrier CC1, and the timeline 2701 is defined, according to Criterion 1 of the Fourth-1 embodiment of the disclosure and Method 1 of the Fourth-2 embodiment of the disclosure. Because the PDCCH repetitive transmissions 2721 and 2722 received on the second carrier CC2 are all received before the timeline 2701, the UE may decode the same, and calculate the power headroom information of the uplink signal scheduled by the PDCCH received on the second carrier CC2 as actual PHR.

Regarding the PDCCH repetitive transmissions 2731 and 2732 received on the third carrier CC3, the UE may receive only the first PDCCH repetitive transmission 2731 before the timeline 2701 and receive the second PDCCH repetitive transmission 2732 after the timeline 2701. According to UE implementation, even when only some of PDCCH repetitive transmissions are received, PDCCH decoding may be performed, and when the UE has successfully decoded the first PDCCH repetitive transmission 2731 of the third carrier CC3, the power headroom information of the uplink signal scheduled by the PDCCH received on the third carrier CC3 may be calculated as actual PHR. However, when the UE has failed to decode the first PDCCH repetitive transmission 2731 in the third carrier CC3, the power headroom information of the uplink signal scheduled by the PDCCH received on the third carrier CC3 may be calculated as virtual PHR.

Fourth-4 Embodiment of Disclosure: Method of Triggering PHR Considering Multi-TRP-Based Repeatedly Transmitted PDCCH In the Fourth-4 embodiment of the disclosure, a method of triggering PHR considering a PDCCH repeatedly transmitted based on multi-TRP will be described.

Regarding some of trigger events for triggering PHR described above, whether to report power headroom may be determined based on when an MAC entity is allocated with an uplink resource for new transmission, i.e., when a PUSCH is scheduled. For example, regarding Trigger Events 1 through 6 described above, whether to report power headroom is determined based on when PUSCH transmission is scheduled. For example, regarding Trigger Event 1, a UE performs PHR when a variation of a pathloss value used to calculate uplink transmit power of the scheduled PUSCH compared to a pathloss reference value used for PHR performed previously is greater than a higher layer parameter phr-Tx-PowerFactorChange that corresponds to a threshold value. As such, PHR is triggered according to a variation of a pathloss value according to Trigger Event 1 or according to a variation of a power backoff value required according to Trigger Event 6, based on a time point when a PUSCH is scheduled.

Figure 28:
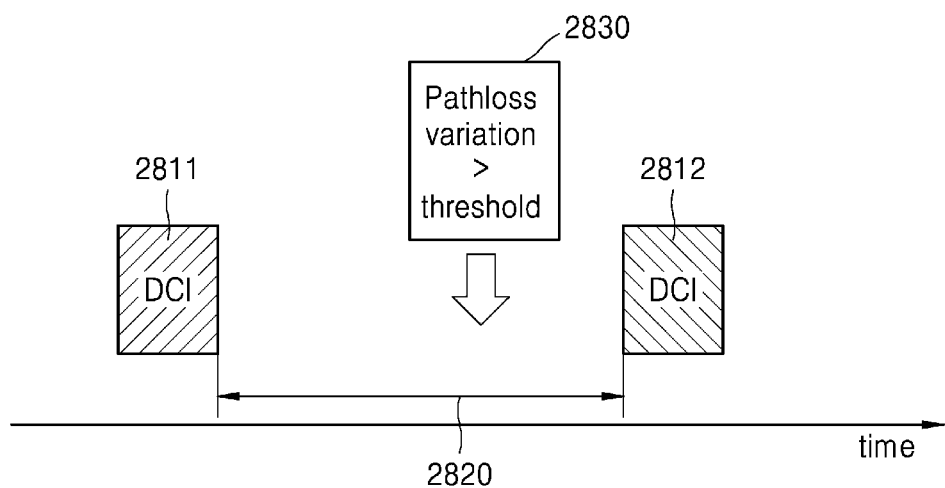
FIG. 28 illustrates a diagram showing a case where a variation occurs in a pathloss value between PDCCH repetitive transmissions according to time points when the PDCCH repetitive transmissions are received according to an embodiment of the disclosure.

When a PDCCH scheduling the PUSCH is repeatedly transmitted, it is required to determine a time point when a trigger event is applied. Details thereof will be described with reference to FIG. 28. FIG. 28 is a diagram showing time points when PDCCH repetitive transmissions are received, and a case where a variation occurs in a pathloss value between the PDCCH repetitive transmissions. In FIG. 28, a pathloss value for determining transmit power of a PUSCH scheduled while a UE receives, during an interval 2820, PDCCH repetitive transmissions 2811 and 2812 scheduling the PUSCH may be changed and the UE may identify, in operation 2830, the change. In other words, a case where the UE updated the pathloss value by receiving a pathloss reference signal after receiving the first PDCCH repetitive transmission 2811, or decoding of the pathloss reference signal received before the first PDCCH repetitive transmission 2811 is received and measurement of the pathloss value are completed during the interval 2820 of the two PDCCH repetitive transmissions 2811 and 2812 may be assumed. In this case, PHR may be triggered or not triggered based on whether the UE generates a trigger event based on the first PDCCH repetitive transmission 2811 or based on the second PDCCH repetitive transmission 2812.

Operation 1: To determine whether to trigger the PHR by reflecting a most recent channel variation, the UE may determine whether to trigger the PHR at a time point when the second PDCCH repetitive transmission 2812 is received. In the example of FIG. 28, the UE triggers the PHR because it is identified, in operation 2830, that a pathloss variation is greater than the threshold value and whether to trigger the PHR is determined before the second PDCCH repetitive transmission 2812 is received.

Operation 2: The UE may determine whether to trigger the PHR based on the first PDCCH repetitive transmission 2811 scheduling the PUSCH. Because the pathloss variation is less than the threshold value at the time point when the first PDCCH repetitive transmission 2811 is received, the UE does not perform PHR when another trigger event is not generated at the time point.

Operation 3: The UE may perform PDCCH decoding by receiving only the first PDCCH repetitive transmission 2811 from among the PDCCH repetitive transmissions 2811 and 2812, according to UE implementation, and assume that the second PDCCH repetitive transmission 2812 is not monitored when the decoding is successful. Here, the UE may determine whether to trigger the PHR based on a time point when the first PDCCH repetitive transmission 2811 is successfully decoded. In other words, in the example of FIG. 28, the UE does not perform the PHR when another trigger event is not generated.

Operation 4: The UE may perform the PDCCH decoding by receiving only the first PDCCH repetitive transmission 2811 from among the PDCCH repetitive transmissions 2811 and 2812, according to UE implementation, and assume that the second PDCCH repetitive transmission 2812 is not monitored when the decoding is successful. Here, because there is an explicit or implicit connection (linkage) between the PDCCH repetitive transmissions 2811 and 2812, the UE may determine that a base station transmits the second PDCCH repetitive transmission 2812 even when the second PDCCH repetitive transmission 2812 is not monitored. Accordingly, the UE may determine whether to trigger the PHR based on a time point when a last PDCCH is received, even when a PDCCH is not monitored. In other words, in the example of FIG. 28, the UE triggers the PHR.

The Fourth-1 through Fourth-4 embodiments of the disclosure have been described based on examples that do not consider cross carrier scheduling. However, a case where cross carrier scheduling is performed to schedule uplink transmission of an activated supporting cell may be included, and at this time, a cell where PHR is performed may be defined as a supporting cell where an uplink signal scheduled by first DCI is transmitted.

Specific examples for describing the Fourth-1 through Fourth-4 embodiments of the disclosure are only one combination of criteria, methods, detailed methods, and operations, and the UE may perform PHR according to repeatedly transmitted DCI through a combination of at least two of the above-described techniques. At this time, the PHR may be performed through a PUSCH specified according to the DCI determined through one of or a combination of at least two of techniques described in the first through third embodiments of the disclosure, from among the repeatedly transmitted DCI.

Figure 29:
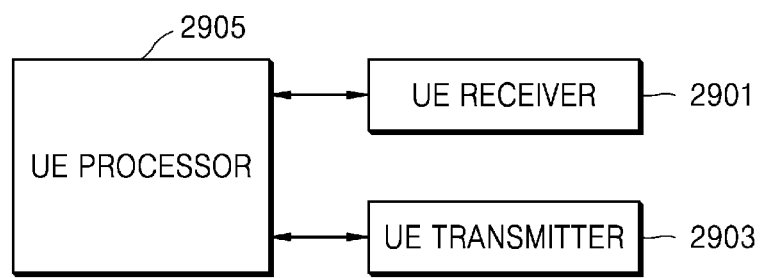
FIG. 29 illustrates a diagram of a structure of a UE in a wireless communication system, according to an embodiment of the disclosure according to an embodiment of the disclosure.

FIG. 29 illustrates a diagram of a structure of a UE in a wireless communication system according to an embodiment of the disclosure.

Referring to FIG. 29, the UE may include a transceiver, which is UE receiver 2901 and a UE transmitter 2903, a memory (not shown), and a UE processor 2905. The UE processor 2905 may include at least one processor, and may also be referred to as a control device or a controller.

Hereinafter, the UE processor 2905 will be described as a processor. The UE processor 2905 may control all operations of the UE such that the UE operates according to not only each embodiment of the disclosure, but also a combination of the embodiments of the disclosure. However, the components of the UE are not limited thereto. For example, the UE may include more or fewer components than those described above. In addition, the transceiver, the memory, and the UE processor 2905 may be implemented as a single chip.

The transceiver may transmit or receive a signal to or from a base station. Here, the signal may include control information and data. In this regard, the transceiver may include an RF transmitter for up-converting and amplifying a frequency of a transmitted signal, and a RF receiver for amplifying low-noise and down-converting a frequency of a received signal. However, this is only an example of the transceiver and components of the transceiver are not limited to the RF transmitter and the RF receiver.

Also, the transceiver may receive and output, to the UE processor 2905, a signal through a radio channel, and transmit a signal output from the UE processor 2905 through the radio channel.

The memory may store a program and data required for operations of the UE. Also, the memory may store the control information or data included in the signal transmitted and received by the UE. The memory may be a storage medium, such as read-only memory (ROM), random access memory (RAM), a hard disk, a CD-ROM, and a DVD, or a combination of storage media. Also, there may be a plurality of the memories.

The UE processor 2905 may control a series of processes such that the UE operates according to an embodiment of the disclosure described above. For example, the UE processor 2905 may control a series of operations of decoding a PDCCH repeatedly transmitted in consideration of multi-TRP and performing PHR, based on configuration information received from the base station. There may be a plurality of UE processors 2905, and the UE processor 2905 may perform operations of controlling the component(s) of the UE by executing a program stored in the memory.

Figure 30:
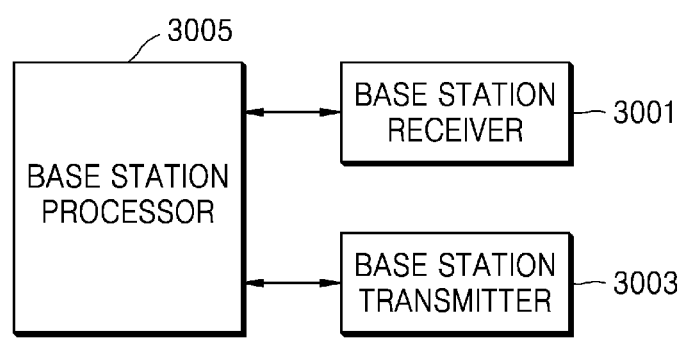
FIG. 30 illustrates a diagram of a structure of a base station in a wireless communication system according to an embodiment of the disclosure.

FIG. 30 illustrates a diagram of a structure of a base station in a wireless communication system according to an embodiment of the disclosure.

Referring to FIG. 30, the base station may include a transceiver, which is a base station receiver 3001 and a base station transmitter 3003, a memory (not shown), and a base station processor 3005. The base station may further include a communication interface (not shown) for wired or wireless communication with another base station through a backhaul link. Hereinafter, the base station processor 3005 will be described as a processor. The base station processor 3005 may include at least one processor, and may also be referred to as a control device or a controller. The base station processor 3005 may control all operations of the base station such that the base station operates according to not only each embodiment of the disclosure, but also a combination of the embodiments of the disclosure. However, the components of the base station are not limited thereto. For example, the base station may include more or fewer components than those described above. In addition, the transceiver, the memory, and the base station processor 3005 may be implemented as a single chip.

The transceiver may transmit or receive a signal to or from a UE. Here, the signal may include control information and data. In this regard, the transceiver may include an RF transmitter for up-converting and amplifying a frequency of a transmitted signal, and a RF receiver for amplifying low-noise and down-converting a frequency of a received signal. However, this is only an example of the transceiver and components of the transceiver are not limited to the RF transmitter and the RF receiver.

Also, the transceiver may receive and output, to the base station processor 3005, a signal through a radio channel, and transmit a signal output from the base station processor 3005 through the radio channel.

The memory may store a program and data required for operations of the base station. Also, the memory may store the control information or data included in the signal transmitted and received by the base station. The memory may be a storage medium, such as read-only memory (ROM), random access memory (RAM), a hard disk, a CD-ROM, and a DVD, or a combination of storage media. Also, there may be a plurality of the memories.

The base station processor 3005 may control a series of processes such that the base station operates according to an embodiment of the disclosure described above. For example, the base station processor 3005 may control a series of operations of transmitting, to the UE, configuration information for repeatedly transmitting a PDCCH in consideration of multi-TRP, and configuration information for configuring an operation of the UE regarding PHR, and receiving the PHR from the UE. There may be a plurality of base station processors 3005, and the base station processor 3005 may perform operations of controlling the component(s) of the base station by executing a program stored in the memory.

The methods according to the embodiments of the disclosure described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In specific embodiments of the disclosure described above, elements included in the disclosure are expressed in a singular or plural form according to the specific embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, a portion of one embodiment of the disclosure and a portion of another embodiment of the disclosure may be combined with each other to enable a base station and a UE to operate. For example, portions of a first embodiment of the disclosure and a second embodiment of the disclosure may be combined with each other to enable a base station and a UE to operate. Also, the embodiments of the disclosure are provided based on a FDD LTE system, but other modifications based on technical ideas of the embodiments of the disclosure may be implemented on other systems, such as a TDD LTE system, a 5G or NR system, and the like.

Meanwhile, in a drawing for describing a method of the disclosure, an order of the description does not necessarily correspond to an order of execution, and the order may be changed or executed in parallel.

Alternatively, in the drawing for describing the method of the disclosure, some components may be omitted and only some components may be included within a range that does not depart from the essence of the disclosure.

Further, the method of the disclosure may be performed in a combination of some or all of content included in each embodiment of the disclosure within a range that does not depart from the essence of the disclosure.

Various embodiments of the disclosure have been described above. The description of the disclosure above is only for illustrative purposes and embodiments of the disclosure are not limited to the above-described embodiments of the disclosure. It will be understood by one of ordinary skill in the art that various changes in form and details may be readily made therein without departing from essential features and the scope of the disclosure as defined by the following claims. The scope of the disclosure is defined by the appended claims rather than the detailed description, and all changes or modifications within the scope of the appended claims and their equivalents will be construed as being included in the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
receiving, from a base station, configuration information associated with a plurality of search spaces for a physical downlink control channel (PDCCH) repetition;
monitoring, based on the configuration information, a plurality of PDCCHs on at least one cell;
identifying, based on the plurality of PDCCHs, a time at which a repetition of PDCCHs including a first downlink control information (DCI) format ends;
determining at least one power headroom report (PHR) for the plurality of PDCCHs based on an actual transmission or a reference format configured from a higher layer signaling according to the identified time; and
transmitting the determined at least one PHR on a physical uplink shared channel (PUSCH) scheduled by the first DCI format.

2. The method of claim 1, wherein the determining of the at least one PHR comprises:
determining, based on the actual transmission, an actual PHR for at least one PDCCH received until the identified time from the plurality of PDCCHs; and
determining, based on the reference format, a virtual PHR for at least one PDCCH received after the identified time from the plurality of PDCCHs.

3. The method of claim 2, wherein, in case that decoding of a PDCCH from among the plurality of PDCCHs fails, the actual PHR is determined based on the at least one PDCCH received until the identified time from the plurality of PDCCHs, excluding the PDCCH in which the decoding failed.

4. The method of claim 1, wherein the first DCI format is determined based on a format of DCI included in a PDCCH repetition that starts earliest than other PDCCH repetitions in the plurality of PDCCHs.

5. The method of claim 1, wherein the first DCI format is determined based on a format of DCI included in a PDCCH repetition that ends earliest than other PDCCH repetitions in the plurality of PDCCHs.

6. The method of claim 1, wherein, in case that partial PDCCH repetition of a cell from the at least one cell is completed until the identified time, whole PDCCH repetitions of the cell are used to determine an actual PHR for the cell.

7. A method performed by a base station in a wireless communication system, the method comprising:
transmitting, to a user equipment (UE), configuration information associated with a plurality of search spaces for a physical downlink control channel (PDCCH) repetition; and
receiving at least one power headroom report (PHR) of the UE on a physical uplink shared channel (PUSCH) scheduled by a first downlink control information (DCI) format,
wherein a plurality of PDCCHs on at least one cell are monitored at the UE based on the configuration information,
a time, from the plurality of PDCCHs, at which a repetition of PDCCHs including the first DCI format ends, is identified at the UE, and
the at least one PHR for the plurality of PDCCHs is determined based on an actual transmission or a reference format configured from a higher layer signaling according to the identified time.

8. A user equipment (UE) in a wireless communication system, the UE comprising:
a transceiver; and
at least one processor operably coupled to the transceiver, the at least one processor configured to:
receive, from a base station, configuration information associated with a plurality of search spaces for a physical downlink control channel (PDCCH) repetition, monitor, based on the configuration information, a plurality of PDCCHs on at least one cell, identify, based on the plurality of PDCCHs, a time at which a repetition of PDCCHs including a first downlink control information (DCI) format ends, determine at least one power headroom report (PHR) for the plurality of PDCCHs, based on an actual transmission or a reference format configured from a higher layer signaling according to the identified time, and transmit the determined at least one PHR on a physical uplink shared channel (PUSCH) scheduled by the first DCI format.

9. The UE of claim 8, wherein the at least one processor is further configured to:

determine, based on the actual transmission, an actual PHR for at least one PDCCH received until the identified time from the plurality of PDCCHs; and determine, based on the reference format, a virtual PHR for at least one PDCCH received after the identified time from the plurality of PDCCHs.

10. The UE of claim 9, wherein, in case that decoding of a PDCCH from among the plurality of PDCCHs fails, the actual PHR is determined based on the at least one PDCCH received until the identified time from the plurality of PDCCHs, excluding the PDCCH in which the decoding failed.

11. The UE of claim 8, wherein the first DCI format is determined based on a format of DCI included in a PDCCH repetition that starts earliest than other PDCCH repetition in the plurality of PDCCHs.

12. The UE of claim 8, wherein the first DCI format is determined based on a format of DCI included in a PDCCH repetition that ends earliest than other PDCCH repetitions in the plurality of PDCCHs.

13. The UE of claim 8, wherein, in case that partial PDCCH repetition of a cell from the at least one cell is completed until the identified time, whole PDCCH repetitions of the cell are used to determine an actual PHR for the cell.

14. A base station in a wireless communication system, the base station comprising:

a transceiver; and at least one processor operably coupled to the transceiver, the at least one processor configured to:

transmit, to a user equipment (UE), configuration information associated with a plurality of search spaces for a physical downlink control channel (PDCCH) repetition, and receive at least one power headroom report (PHR) of the UE on a physical uplink shared channel (PUSCH) scheduled by a first downlink control information (DCI) format, wherein:

a plurality of PDCCHs on at least one cell are monitored at the UE based on the configuration information, a time, from the plurality of PDCCHs, at which a repetition of PDCCHs including the first DCI format ends, is identified at the UE, and the at least one PHR for the plurality of PDCCHs is determined based on an actual transmission or a reference format configured from a higher layer signaling according to the identified time.

* * * * *